(12) United States Patent
Emigholz et al.

(10) Patent No.: US 7,424,395 B2
(45) Date of Patent: *Sep. 9, 2008

(54) APPLICATION OF ABNORMAL EVENT DETECTION TECHNOLOGY TO OLEFINS RECOVERY TRAINS

(75) Inventors: Kenneth F. Emigholz, Chevy Chase, MD (US); Richard B. McLain, Brambleton, VA (US); Robert K. Wang, Vienna, VA (US); Stephen S. Woo, Markham (CA)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/212,434

(22) Filed: Aug. 26, 2005

(65) Prior Publication Data

US 2006/0074599 A1    Apr. 6, 2006

Related U.S. Application Data

(60) Provisional application No. 60/609,179, filed on Sep. 10, 2004.

(51) Int. Cl.
*G06F 15/00* (2006.01)
(52) U.S. Cl. .................................... 702/182; 702/183
(58) Field of Classification Search ................. 700/269; 702/183, 182
See application file for complete search history.

(56) References Cited

U.S. PATENT DOCUMENTS

| | | | |
|---|---|---|---|
| 3,175,968 A | 3/1965 | Berger | |
| 5,023,045 A | 6/1991 | Watanabe et al. | |
| 5,333,240 A | 7/1994 | Matsumoto et al. | |
| 5,351,247 A | 9/1994 | Dow et al. | |
| 5,457,625 A | 10/1995 | Lim et al. | |
| 5,465,321 A | 11/1995 | Smyth | |
| 5,539,877 A | 7/1996 | Winokur et al. | |
| 5,817,958 A * | 10/1998 | Uchida et al. ............... | 73/865.9 |
| 5,859,964 A | 1/1999 | Wang et al. | |

(Continued)

FOREIGN PATENT DOCUMENTS

EP    0 428 135 A2    5/1991

(Continued)

OTHER PUBLICATIONS

Bell, Michael B., NOVA Chemicals; Foslien, Wendy K., Honeywell; "Early Event Detection—Results From A Prototype Implementation", 2005 Spring National Meeting Atlanta GA, Apr. 10-14, 17th Annual Ethylene Producers' Conference Session TA006—Ethylene Plant Process Control.

(Continued)

*Primary Examiner*—John E Barlow, Jr.
*Assistant Examiner*—Douglas N Washburn
(74) *Attorney, Agent, or Firm*—Paul E. Purwin

(57) ABSTRACT

The present invention is a method for detecting an abnormal event for process units of an ethylene processing system. The method compares the operation of the process units to a model developed by principal components analysis of normal operation for these units. If the difference between the operation of a process unit and the normal operation indicates an abnormal condition, then the cause of the abnormal condition is determined and corrected.

95 Claims, 30 Drawing Sheets

U.S. PATENT DOCUMENTS

| | | |
|---|---|---|
| 5,949,677 A | 9/1999 | Ho |
| 5,949,678 A | 9/1999 | Wold et al. |
| 5,950,147 A | 9/1999 | Sarangapani et al. |
| 6,115,656 A | 9/2000 | Sudolsky |
| 6,368,975 B1 | 4/2002 | Balasubramhanya et al. |
| 6,466,877 B1 | 10/2002 | Chen et al. |
| 6,505,145 B1 | 1/2003 | Bjornson |
| 6,521,080 B2 | 2/2003 | Balasubramhanya et al. |
| 6,522,978 B1 | 2/2003 | Chen et al. |
| 6,564,119 B1 | 5/2003 | Vaculik et al. |
| 6,606,580 B1 | 8/2003 | Zedda et al. |
| 6,625,569 B2 | 9/2003 | James et al. |
| 6,636,842 B1 | 10/2003 | Zambrano et al. |
| 6,681,344 B1 | 1/2004 | Andrew |
| 6,735,541 B2 | 5/2004 | Kern et al. |
| 6,760,639 B2 | 7/2004 | Kallela et al. |
| 6,809,837 B1 | 10/2004 | Mestha et al. |
| 6,813,532 B2 | 11/2004 | Eryurck et al. |
| 6,904,386 B2 | 6/2005 | Mylaraswamy |
| 6,907,383 B2 | 6/2005 | Eryurek et al. |
| 6,917,839 B2 | 7/2005 | Bickford |
| 6,925,338 B2 | 8/2005 | Eryurek et al. |
| 6,954,713 B2 | 10/2005 | Eryurek |
| 6,973,396 B1 | 12/2005 | Shah et al. |
| 6,978,210 B1 | 12/2005 | Suter et al. |
| 6,980,938 B2 | 12/2005 | Cutler |
| 7,079,984 B2 | 7/2006 | Eryurek |
| 7,085,610 B2 | 8/2006 | Eryurek et al. |
| 7,096,074 B2 * | 8/2006 | Yulevitch et al. ............. 700/21 |
| 7,181,654 B2 | 2/2007 | Ford, Jr. et al. |
| 7,243,048 B2 | 7/2007 | Foslien et al. |
| 2002/0077792 A1 | 6/2002 | Qiu |
| 2004/0078171 A1 | 4/2004 | Wegerich et al. |
| 2004/0078683 A1 | 4/2004 | Buia et al. |
| 2004/0172229 A1 | 9/2004 | Aragones et al. |
| 2005/0141782 A1 | 6/2005 | Guralnik et al. |
| 2005/0149297 A1 | 7/2005 | Guralnik et al. |
| 2005/0197805 A1 | 9/2005 | Eryurek et al. |
| 2005/0267702 A1 | 12/2005 | Shah et al. |
| 2005/0267710 A1 | 12/2005 | Heavner, III et al. |
| 2006/0020423 A1 | 1/2006 | Sharpe, Jr. |
| 2006/0036403 A1 | 2/2006 | Wegerich et al. |
| 2006/0073013 A1 | 4/2006 | Emigholz et al. |
| 2007/0005266 A1 | 1/2007 | Blevins et al. |
| 2007/0088448 A1 | 4/2007 | Mylaraswamy et al. |
| 2007/0088528 A1 | 4/2007 | Miller |
| 2007/0088534 A1 | 4/2007 | MacArthur et al. |
| 2007/0124113 A1 | 5/2007 | Foslien et al. |

FOREIGN PATENT DOCUMENTS

| | | |
|---|---|---|
| JP | 02-2408 A | 1/1990 |
| JP | 10-143343 A | 5/1998 |

OTHER PUBLICATIONS

Mylaraswamy, Dinkar, Bullemer, Peter, Honeywell Laboratories; Emigholz, Ken, Emre, ExxonMobil, "Fielding a Multiple State Estimator Platform", NPRA Computer Conference, Chicago, IL, Nov. 2000.

* cited by examiner

Fuzzy Network Setup

Probability Distribution of Process Data
Combined Continuous and Disturbed Operations Fuzzy Logic network example for suppression of procedure-induced abnormal conditions.

APPLICATION OF ABNORMAL EVENT DETECTION TECHNOLOGY TO OLEFINS RECOVERY TRAINS

This application claims the benefit of U.S. Provisional application 60/609,179 filed Sep. 10, 2004.

BACKGROUND OF THE INVENTION

The present invention relates to the operation of an ethylene plant. In particular, the present invention relates to determining when the ethylene plant is deviating from normal operation.

In the petrochemical industry, an Olefins Recovery Train (ORT) is a very important process for an ethylene plant. The ORT purifies ethylene and propylene and also recovers by-products of the olefins production plant. Due to the complicated dynamic nature and cryogenic portions of the ORT, abnormal process operations can easily result from many root problems that cause the ORT operation to deviate from the normal operating state. Abnormal operations of the ORT can have significant economic implications and, in many cases, can stop production. These abnormal situations can cause lost production, equipment damage, environmental emissions, injuries and fatalities. A primary job of the console operator is to identify the cause of the abnormal situation and execute compensatory or corrective actions in a timely and efficient manner.

The current commercial practice is to use advanced process control applications to automatically adjust the process in response to minor process disturbances. For moderate to severe abnormal operations, the current practice is to rely on human process intervention. And for very severe abnormal operations, the current practice is to use automatic emergency shutdown (ESD) systems that can have substantial economic consequences for the process equipment.

Currently, the console operator is notified of an abnormal condition via process alarms. These alarms are triggered when key process measurements (temperatures, pressures, flows, levels, compositions, valve positions, etc.) violate a pre-defined set of operating ranges. These operating ranges are often static values from initial designs or frequently adjusted values by console operators to envelop important operating regions. For highly integrated processes, such as ORT, the alarm system effectiveness is an often difficult balance of providing timely alarms during normal operation (early warning) and preventing "alarm floods" during abnormal operation (risk of high priority information being missed). Thus, the current notification technology is challenged to provide sufficient early notifications while generating an acceptable rate (near zero) of false notifications to ensure the alarm system remains effective during severe abnormal operation.

There can be many thousands of process measurements that cover the operation of a typical ORT, of which hundreds are considered key to normal operation. In addition, each process measurement can have as many as 15 different alarms being configured. Under a conventional Distributed Control System (DCS) like Honeywell's TDC3000, the operator must survey this list of sensors and its trends, compare them with mental knowledge of normal ORT operation, and discover the potential problems early enough to intervene before significant disruptions can occur. Due to the very large number of sensors in an operating ORT, abnormalities can be easily missed. With the current DCS based monitoring technology, the only automated detection assistance an operator has is the DCS alarm system which is based on the alarming of each sensor when it violates predetermined limits. Due to the complexity of an ORT, this type of notification often comes in too late to allow the operator to have sufficient time to take preventive action to mitigate a problem. Over-use of the alarm system for early detection can have even worse consequences. The alarms become an annoyance to the operator during normal operation and the operator ignores the alarm system. During abnormal conditions, the operator becomes flooded with alarms and misses critical information. The present invention provides a more effective notification to the operator of the ORT.

SUMMARY OF THE INVENTION

The present invention is a method for detecting an abnormal event for some process units of an ethylene processing system. The system includes a number of process units. The method compares the current operations of some of the process units to a model of normal operation for those units. If the difference between the current operation of the unit and the normal operation indicates an abnormal condition in a process unit, then the cause of the abnormal condition is determined and corrective action can be taken.

DETAILED DESCRIPTION OF THE PREFERRED EMBODIMENTS

The present invention is a method to provide abnormal event detection (AED) to the operator that sections of an ethylene plant are not functioning properly. The present invention will be discussed with specific references to a successful application of the invention for demonstration only but not limitation.

The method uses fuzzy logic (see Appendix 1, Section Deploying PCA Models and Simple Engineering Models for AED) to combine multiple supportive evidence of abnormal situations that contribute to an operational problem and estimates its probability in realtime. The probability is presented in a continuous format to alert the operator using a single trend for a processing area of the plant. This method includes a set of tools that allow the operator to drill down to the root cause of a problem for focused action. This approach has been demonstrated to provide the operator with an advanced warning of the abnormal operation that can be minutes to hours sooner than the alarm system. This advanced warning allows the operator to take corrective action sooner and prevents escalation of the event. This method has been successfully applied to an olefins recovery train (ORT).

Figure 4:
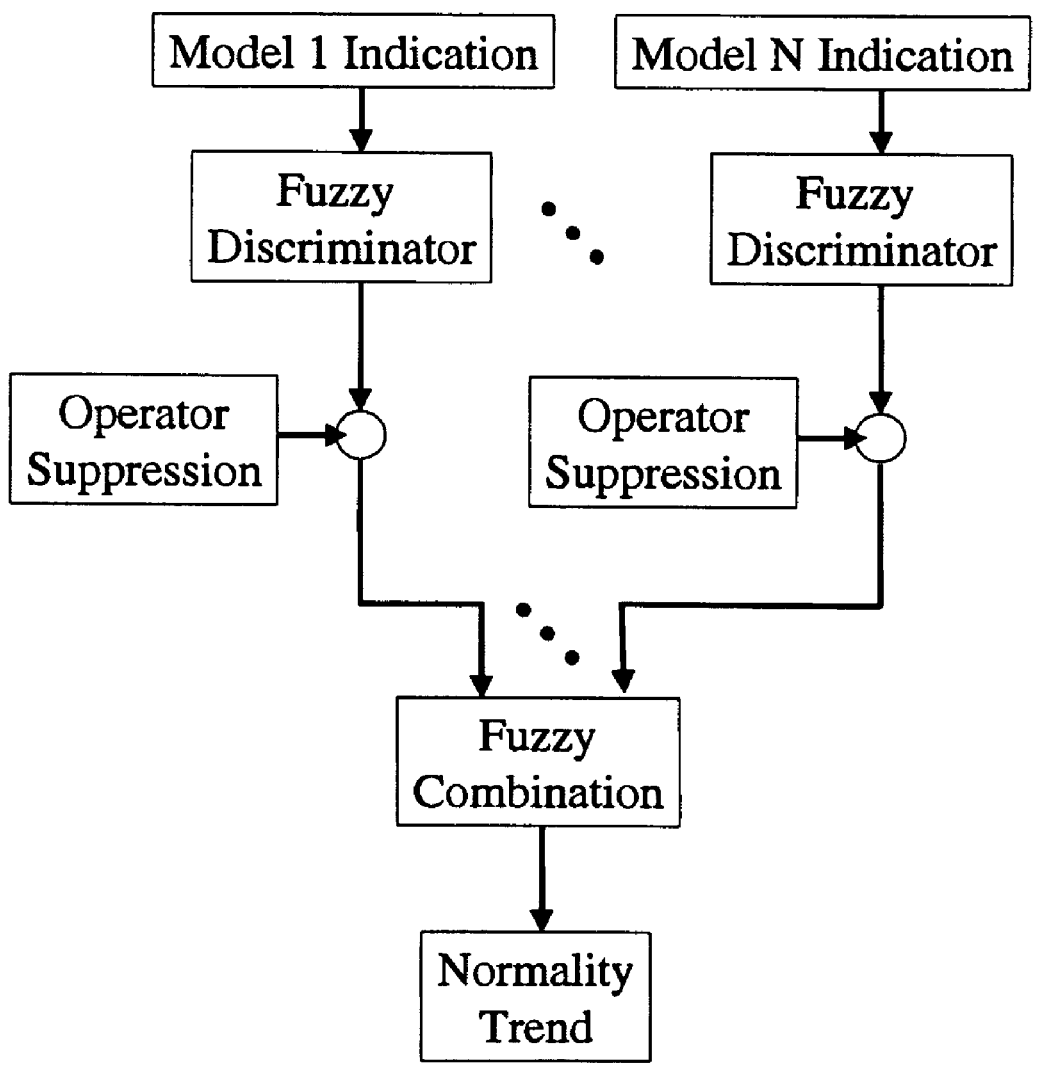
FIG. 4 shows a schematic diagram of a fuzzy network setup.

The ORT application uses specific operational knowledge of ORT operations to combine indications from Principal Component Analysis and engineering models, and relevant sensor readings into a fuzzy logic network as shown in FIG. 4. This fuzzy logic network aggregates the evidence and indicates the confidence level of a potential problem. Therefore, the network can detect a problem with higher confidence at its early stage and provide valuable time for the operator to make compensatory or corrective actions to avoid an ORT operational incident. This is a key advantage over the present commercial practice of monitoring ORT based on single sensor alarming from a DCS system because more often the alarm comes in too late for the operator to mitigate an operational problem due to the complicated dynamic and cryogenic nature of operating an ORT.

The ethylene recovery train is divided into equipment groups (referred to as key functional sections or operational sections). These equipment groups may be different for different ethylene recovery trains depending on its design. The procedure for choosing equipment groups which include specific process units of the ethylene recovery train is described in Appendix 1.

Figure 30:
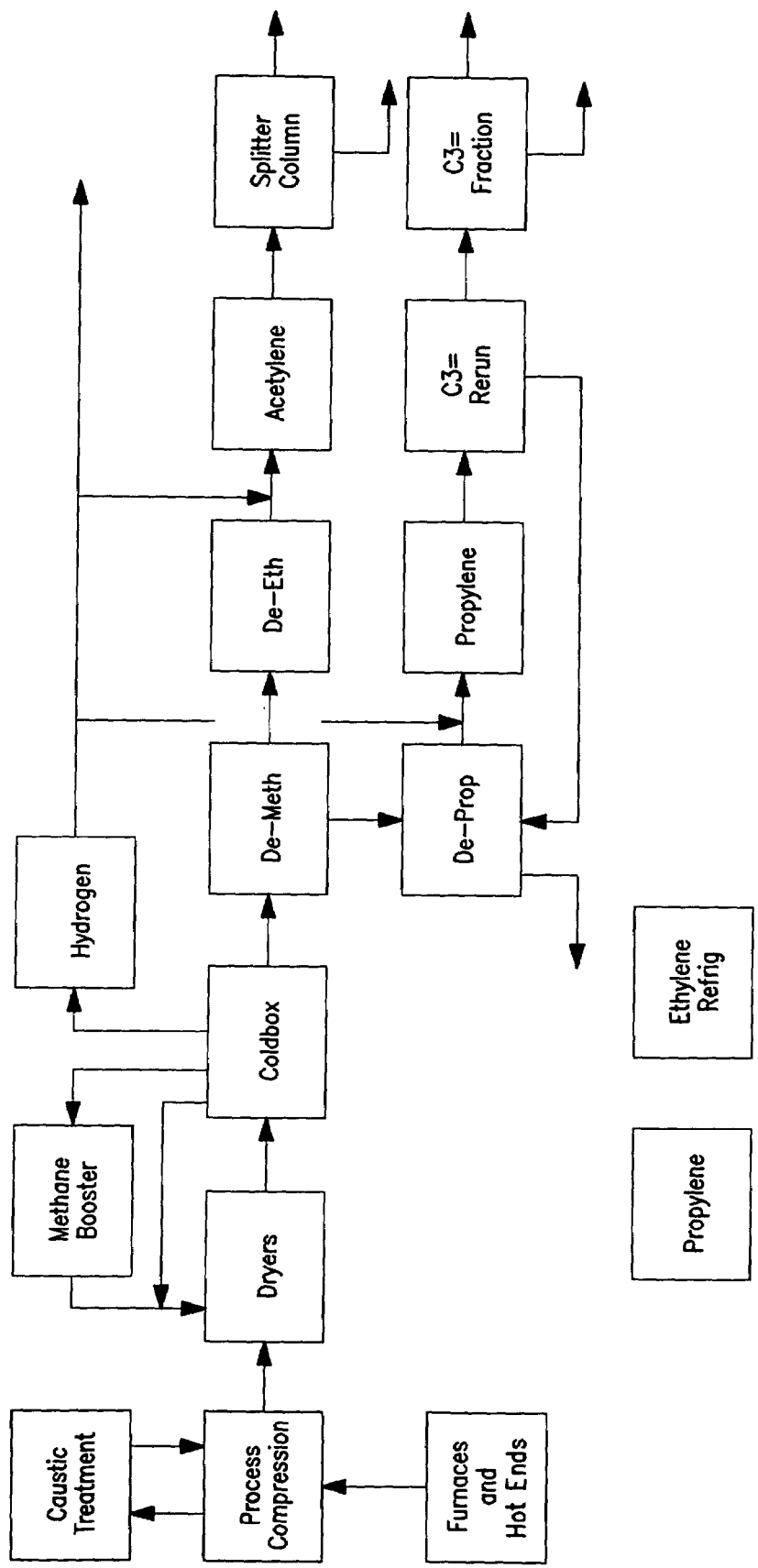
FIG. 30 shows a schematic diagram of a typical ethylene plant.

FIG. 30 shows a schematic diagram of a typical ethylene plant that was used to demonstrate the present invention. In the preferred embodiment for this plant, the present invention divides the ORT operation into key operational sections (see Appendix 1, section Developing PCA Models for AED). The example ethylene plant was divided into eleven sections as follows:

1. Charge Gas Compressor
2. Drier, Cold Box, and Methane Booster
3. Ethylene and Propylene Refrigeration
4. De-Methanizer
5. De-Ethanizer
6. Acetylene Converter
7. C2 Splitter
8. Methanator and H2O Drier
9. De-Propanizer
10. MAPD Hydrofiner
11. C3 Rerun and Propylene Fractionator Besides monitoring the key operational areas, this invention also monitors the consistency between control valve position and flow for a set of key control valves (see Appendix 1, section Simple Engineering Models for AED). This invention also provides suppression of model calculations to eliminate false positives on special cause operations and enables the operator to selectively remove sensors from the models in the event that the sensor is out of service.

A. Operator Interface

The display is intended to give the operator a view of the probability that there is an abnormal event affecting the process unit.

Figure 23:
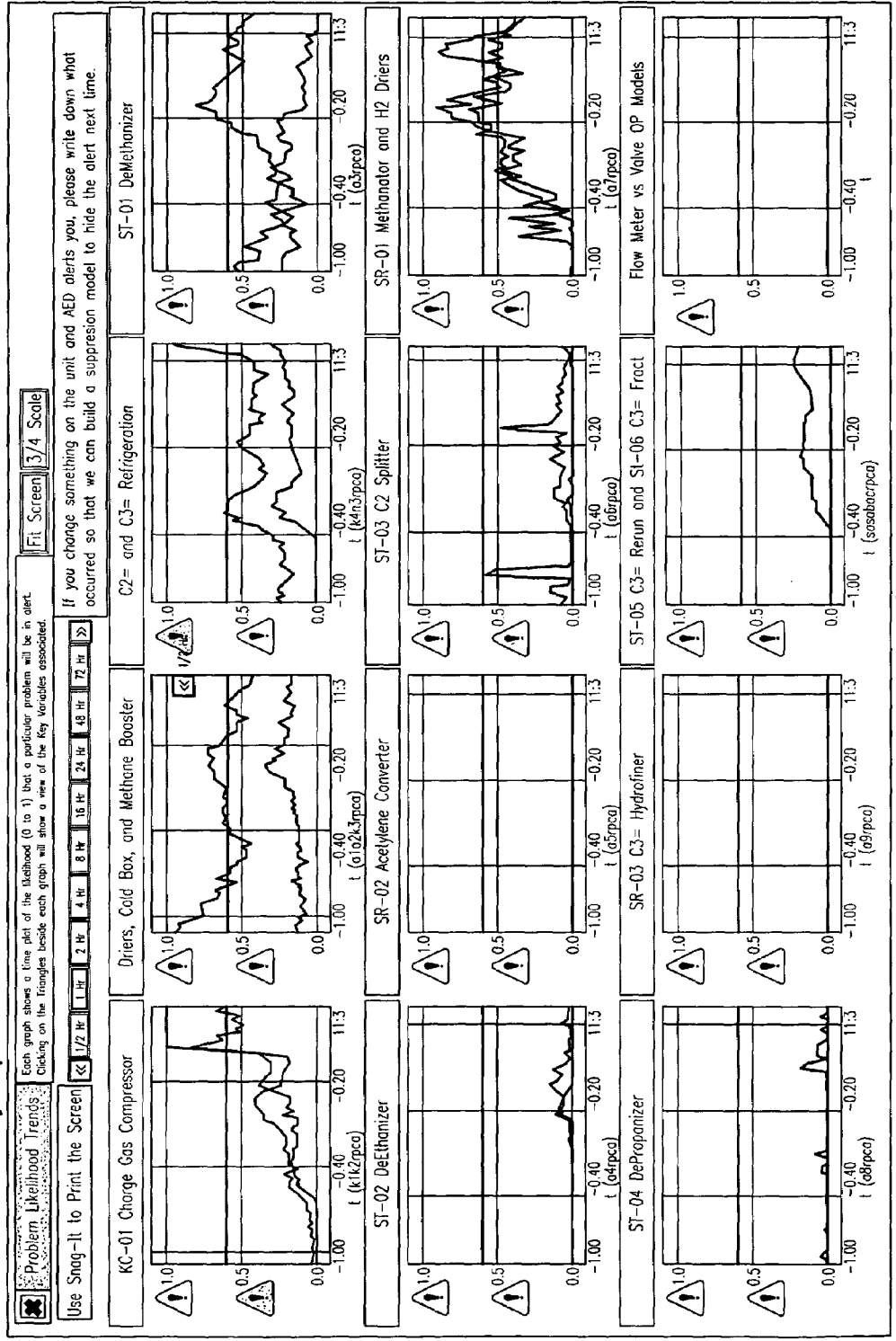
FIG. 23 shows the operator overview of the ORT operation decomposed into 12 individual monitors; 11 key operational sections and a flow versus valve monitor.

FIG. 23 shows the operator display of the decomposition of the ORT operation into eleven key operational sections and a control valve position versus flow monitor. When the probability reaches 0.6, the problem indicator turns yellow (warning) and the indicator turns red (alert) when the probability reaches 0.9 (see Appendix 1, section Deploying PCA Models and Simple Engineering Models for AED).

The invention example includes eleven Principal Component Analysis (PCA) models to cover the entire operation of ORT (see Appendix 1, section Developing PCA Models for AED, subsection I). Based on process knowledge, we overlap key sensors that are affected by interacting sections in PCA models (see Appendix 1, Section Deploying PCA Models and Simple Engineering Models for AED, subsection III). For distillation columns, we transformed the rate dependent variables into ratios to minimize the effect of feedrate changes (see Appendix 1, section Developing PCA Models for AED, subsection IV).

ORT operation has a number of special cause operations, such as Steam Water Decoking at the cracking furnaces and Drier Regeneration for the Cold Box feed. These operations are less frequent routine operations comparing to the moves of advanced control applications and have significant temporary effects on the normality of operation. These special cause operations will give high residuals to some affected sensors in some PCA models. We use our operations knowledge of ORT and detect the onset of these special cause operations and developed suppression methodologies to remove their notifications (see Appendix 1, section Deploying PCA Models and Simple Engineering Models for AED, subsection I).

Often, in routine operations of an ORT, the operator makes setpoint changes to some key controllers in order to steer the ORT to a preferred state. Again, we developed suppression methodologies for the effect of these setpoint changes (see Appendix 1, section Deploying PCA Models and Simple Engineering Models for AED, subsection I).

Figure 24:
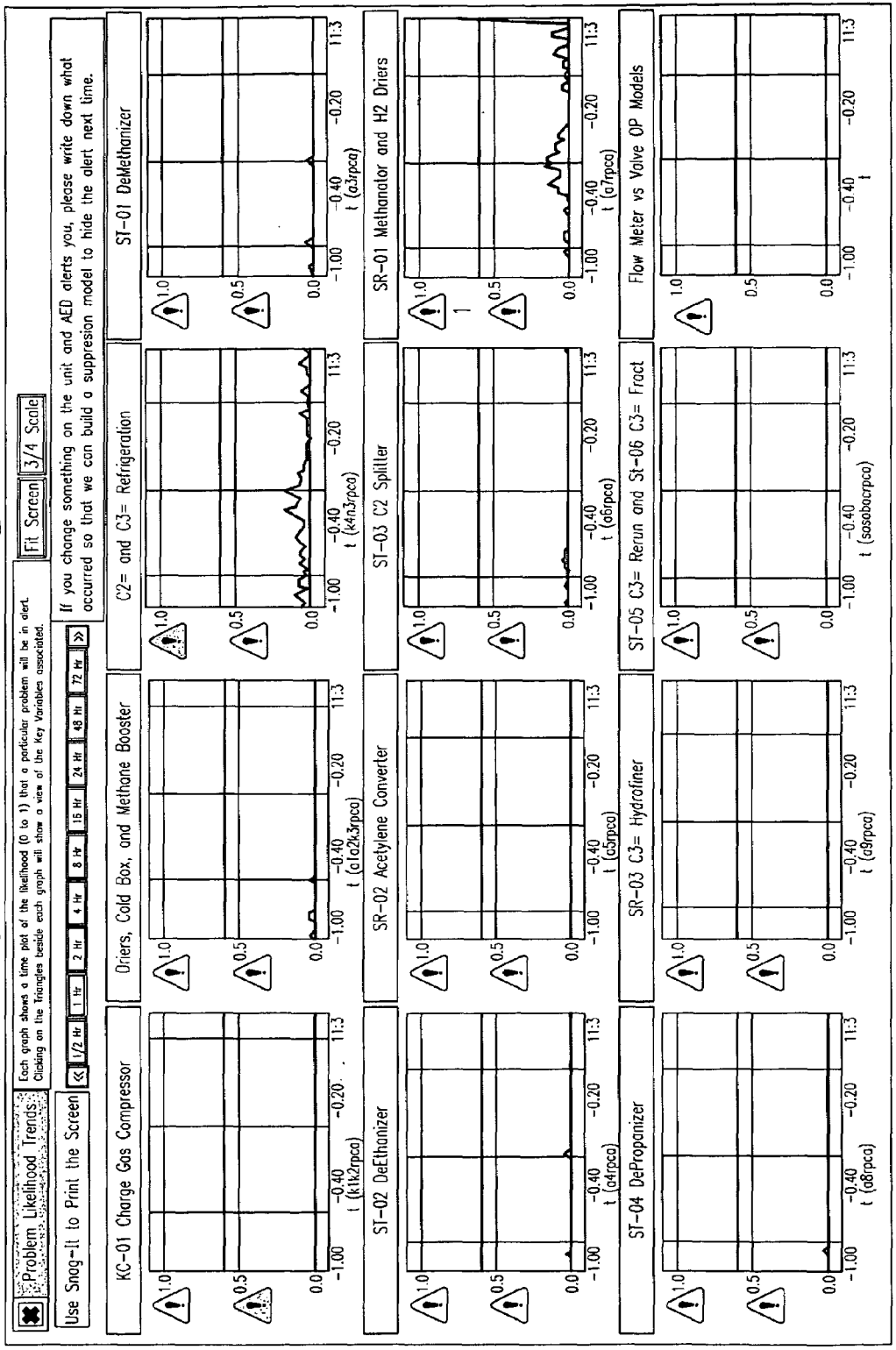
FIG. 24 shows the Methanator and $H_2O$ Driers area monitor has a warning alert.
Figure 25:
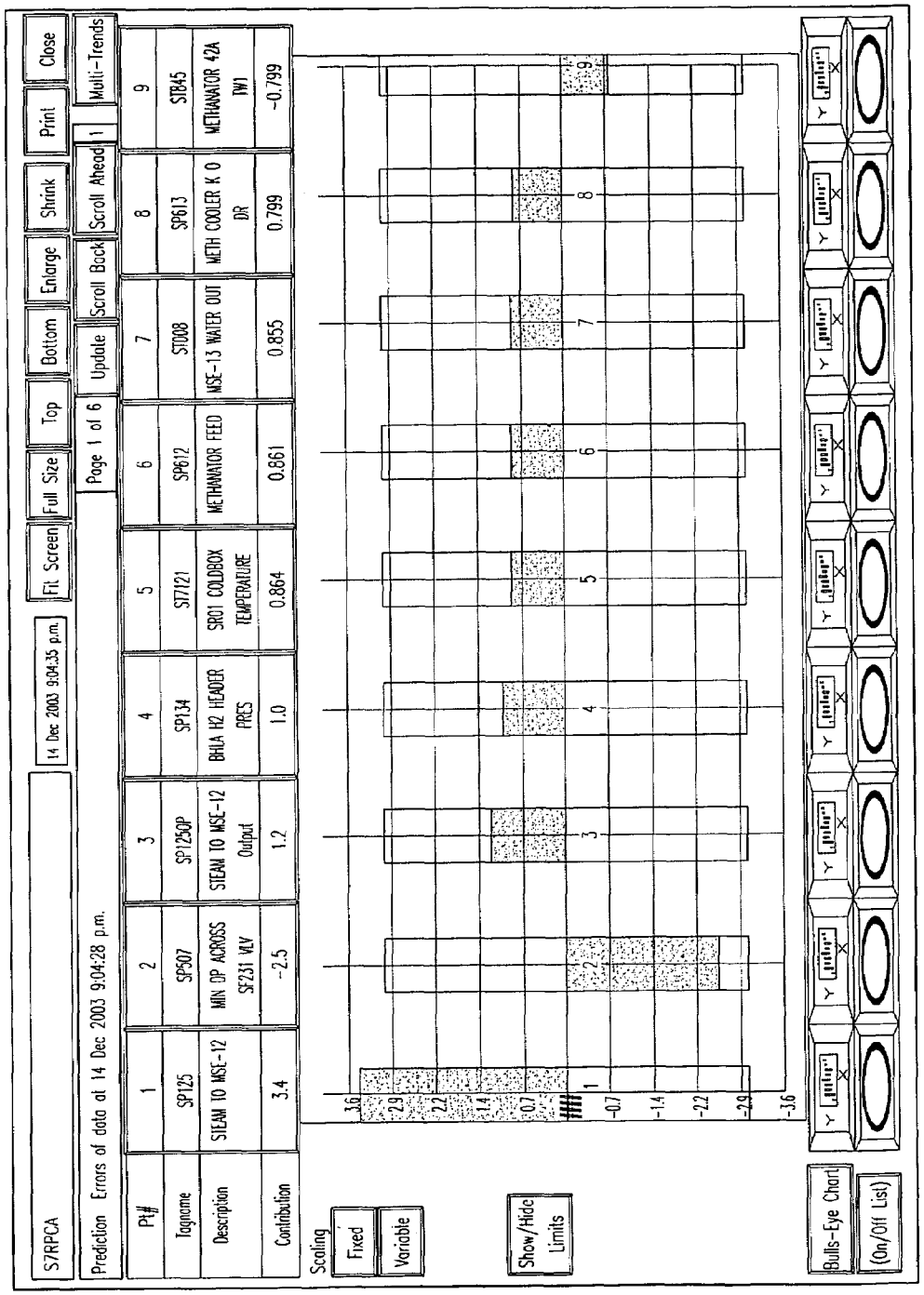
FIG. 25 shows the result of clicking on triangle 1 in FIG. 24; a Pareto chart indicating the residual of sensor SP125 is outside its tolerance limit.

Once the operator receives an indication of an abnormal condition, such as the warning alert indicated by the yellow triangle in FIG. 24, this novel method provides the operator with drill down capabilities to the leading indicator of the problems (see Appendix 1, section Deploying PCA Models and Simple Engineering Models for AED, subsection IV). FIG. 24 shows that the Methanator and $H_2O$ Driers have a warning alert. This assists the operator in isolating and diagnosing the root cause of the condition so that compensatory or corrective actions can be taken. FIG. 25 is the result of clicking on the yellow triangle in FIG. 24. FIG. 25 shows a Pareto chart indicating the residual of sensor SP125 is outside its tolerance limit and is the primary reason for the warning alert.

Figure 26:
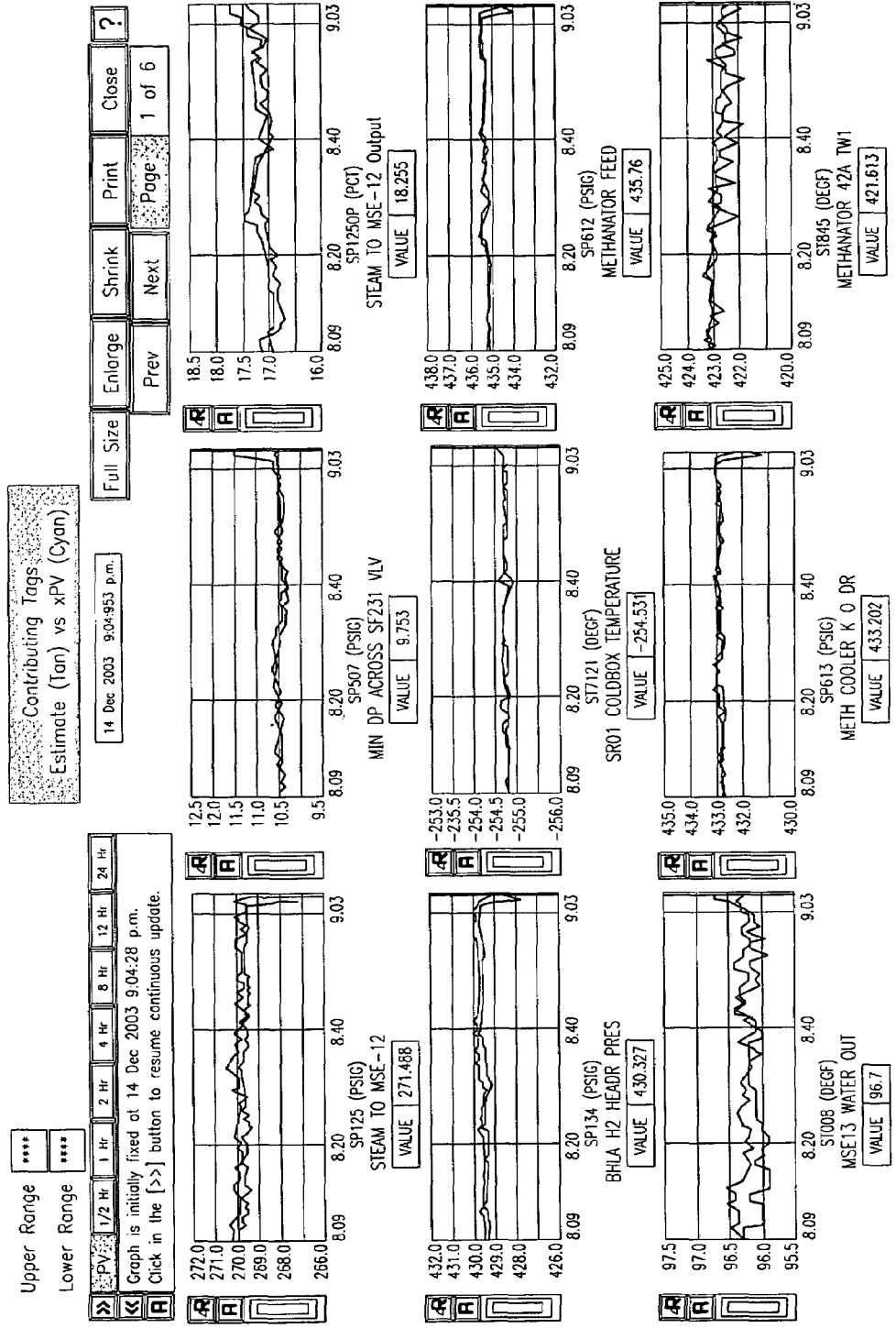
FIG. 26 shows that clicking on the Multi-Trend button brings up the trends of the value and model predictions of the sensors in the Pareto chart of FIG. 25.

This drilldown tool isolates the problem area for the operator. Additional tools, such as calling up the trends of problem sensors, are also available for the operator in this application. For instance, FIG. 26 shows the trends of the value and model predictions of the sensors in the Pareto chart of FIG. 25.

Figure 27:
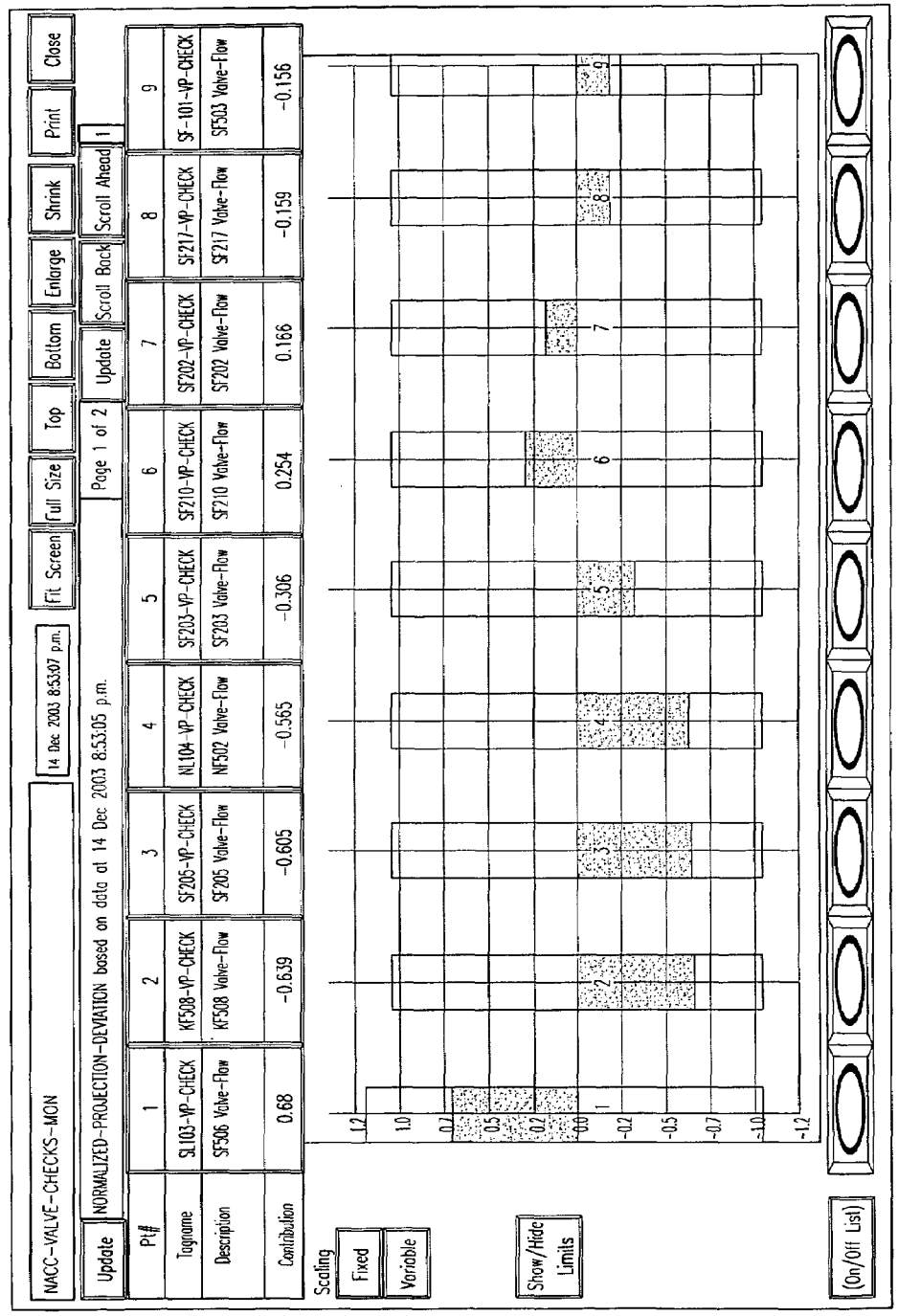
FIG. 27 shows a Pareto ranking of the valve-flow models based on normalized-projection-deviation error.
Figure 28:
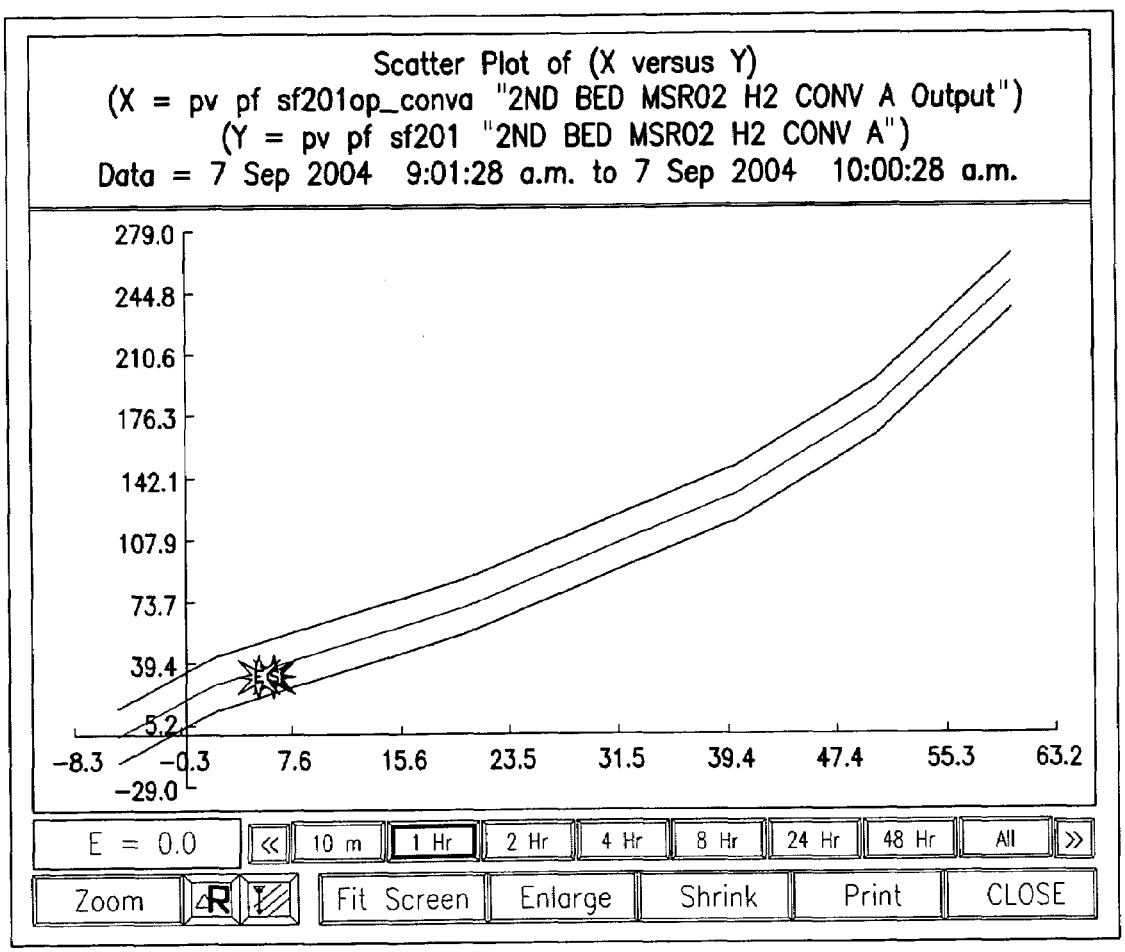
FIG. 28 shows the details of the valve-flow model obtained by clicking on any bars from the bar chart of FIG. 27.

This application also provides a Pareto chart for ranking the valve versus flow engineering models. FIG. 27 shows a Pareto ranking of the valve-flow models based on normalized-projection-deviation error. Clicking on a bar of the Pareto provides an operator drilldown to the details of the valve versus flow model as shown in FIG. 28.

Figure 29:
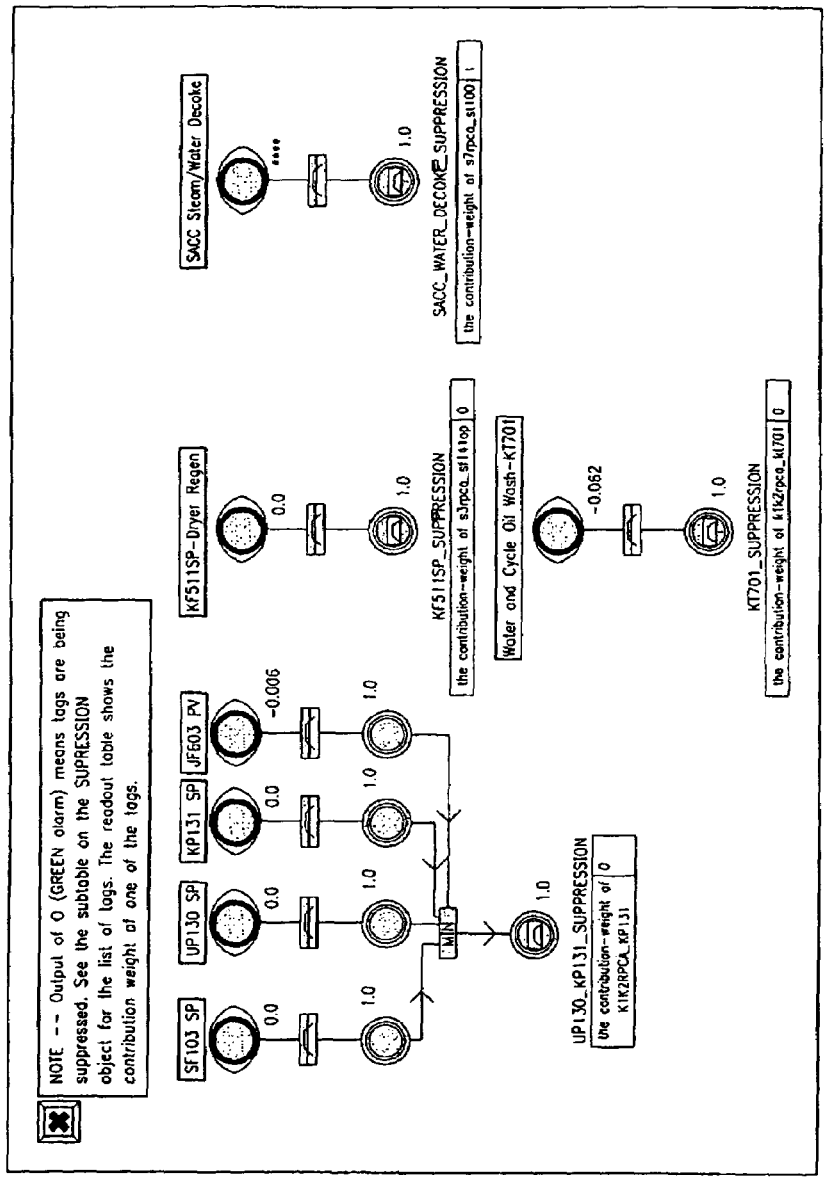
FIG. 29 shows the Fuzzy Logic networks for several procedural-induced abnormal conditions.

Based on our operational knowledge of ORT, this application detects the onset of special cause operations such as steam-water decoking of the furnace and provides suppression to sensors that are affected by this operation. FIG. 29 shows the fuzzy logic network for steam-water decoking at the cracking furnaces.

In summary, the advantages of this invention include:
1. Decomposing the entire ORT operation into key operational areas, which reduces thousands of individual measurements and alerts into a small number of easily monitored trends.
2. The operational problems of the entire ORT are summarized into eleven single alerts for the example plant.
3. The PCA models provide predictions of the 1300+ sensors in the example ORT.
4. The abnormal deviations of these 1300+ sensors are summarized by the 11 alerts based on the Sum of Square Error of the 11 PCA models.
5. Events resulting from special cause operation are suppressed to eliminate the false positives. It clearly indicates the dimensionality reduction is almost 2 order of magnitude, i.e. from 1300+ sensors to 11 indicators. Besides this tremendous dimensionality reduction, the high false positive rate of a single sensor alarm is resolved by the PCA modeling.

B. Development of Abnormal Event Detection Models for an ORT

The methodology for detecting abnormal events is described generally in Appendix 1. The steps for developing ethylene plant models are described below using the successful ORT application as an example.

The application at an ethylene plant is intended to monitor a broad portion of the process operations (about 80% of the console operator's area), provide an early warning of unexpected abnormal events and provide information on the measurements initially involved. The operator or the engineer would then rely on their process knowledge to diagnose the cause. Each event is expected to be unique or rare, and primarily the result of problems with the instruments and valves.

The following problem characteristics should be considered when selecting an abnormal event detection problem. Infrequent abnormalities (every 3-4 months) may not justify the effort to create an abnormal event detector. Also, when a particular abnormality occurs only every 3 or 4 months, an individual operator may go for years without seeing the event. As a consequence, he/she would not know what to do once the event finally occurs. Therefore the problem identification should be broad enough that the operator would be regularly interacting with the application.

When scoping the problem, it is common to get the wrong impression from site personnel that there would not be a sufficient number of abnormal events to justify an abnormal event detection application. In general, an overly low estimate of how frequently abnormal events affect the process occurs because:
  Abnormal events are often not recorded and analyzed. Only those that cause significant losses are tracked and analyzed.
  Abnormal events are often viewed as part of normal operations since operators deal with them daily.

Unless there is a regularly repeating abnormal event, the application should cover a large enough portion of the process to "see" abnormal events on a regular basis (e.g. more than 5 times each week). The abnormal event detectors are not meant to replace a solution that may be the preferred alternative (see Appendix 1, section Developing PCA Models for AED, subsection I.C).

AED Applications Do Not Replace the Alarm System

Whenever a process problem occurs quickly, the alarm system will identify the problem as quickly as an abnormal event detection application. The sequence of events (e.g. the order in which measurements become unusual) may be more useful than the order of the alarms for helping the operator diagnose the cause. This possibility should be investigated once the application is on-line.

However, abnormal event detection applications can give the operator advanced warning when abnormal events develop slowly (longer than 15 minutes). These applications are sensitive to a change in the pattern of the process data rather than requiring a large excursion by a single variable. Consequently alarms can be avoided. If the alarm system has been configured to alert the operator when the process moves away from a small operating region (not true safety alarms), this application may be able to replace these alarms.

C. Example of Development of AED Model for an Ethylene Plant

Preliminary Application Design

Application design requires two decisions: which process units should be covered by the application, and which measurements should be included in the model. In the present example, one model will be developed that incorporates several process units of the ethylene plant to maximize the dimensionality reduction of the data.

The specific process units included requires an understanding of the process integration/interaction. Similar to the design of a multivariable constraint control (MVCC such as DMC) application, the boundary of the application should encompass all significant process interactions and key upstream indications of process changes and disturbances. FIG. 30 shows the major process units included in this ethylene plant application. These units encompass a highly energy-integrated portion of a typical ORT. Often these same process units might be grouped together under one or two MVCC controllers.

Within these selected process units, there will be a substantial number of process measurements. For the preliminary design:

Select all controller PVs, SPs and Outputs (including all intermediate cascade controllers) on these units Select key measurements used by the console operator to monitor the process Select any measurements used by the contact engineer to measure the performance of the process Select any upstream measurement of feedrate, feed temperature or feed quality changes Select extra redundant measurements for measurements that are felt to be important Select measurements that may be needed to calculate non-linear transformations Select any external measurement of a disturbance (e.g. ambient temperature)

Select any other measurements which the process experts regard as important measures of the process condition Exclude from this list any known erratic or problem measurements.

Following this list, about ½ of the available process measurements will be preliminarily considered for the application. These will be later trimmed down during the data analysis.

Initial Model Development

The model development strategy is to start with a very rough model (the consequence of a questionable training data set) then use the model to gather a high quality training data set. This data is then used to improve the model, which is then used to continue to gather better quality training data. This process is repeated until the model is satisfactory (see Appendix 1, section Developing PCA Models for AED).

Historical Data Collection

Developing a good model of normal operations requires a training data set of normal operations. This data set should:

Span the normal operating range

Only include normal operating data

Because it is very rare to have a complete record of the abnormal event history at a site, historical data can only be used as a starting point for creating the training data set. Operating records such as Operator logs, Operator Change Journals, Alarm Journals, Instrument Maintenance records provide a partial record of the abnormal process history.

The developer should gather several months of process data using the site's process historian, preferably getting one minute spot values. If this is not available, the highest resolution data, with the least amount of averaging should be used. The various operating journals for this time period should also be collected. Often setpoints and outputs are not historized in the plant historian, but that deficiency will be taken care of during later data gathering.

Data and Process Analysis

Initial Rough Data Analysis

Using the operating logs, the historical data is divided into periods with known abnormal operations and periods with no identified abnormal operations. The data with no identified abnormal operations will be the preliminary training data set.

Now each measurement needs to be examined over its history to see whether it is a candidate for the training data set. Measurements which should be excluded are:

Those with many long periods of time as "BAD PV"

Those with many long periods of time pegged to their EUHigh or EULow values

Those which show very little variability (except those which are tightly controlled to their setpoints)

Those which continuously show very large variability relative to their operating range Those which show little or no cross correlation with any other measurements in the data set Those with poor signal to noise ratios While examining the data, those time periods where measurements are briefly indicating "BAD PV" or are briefly pegged to their EUHigh or EULow limits should also be excluded.

Once these exclusions have been made the first rough PCA model should be built as discussed in Appendix 1. Since this is going to be a very rough model the exact number of principal components to be retained is not important.

The training data set should now be run through this preliminary model to identify time periods where the data does not match the model. These time periods should be examined to see whether an abnormal event was occurring at the time. If this is judged to be the case, then these time periods should also be flagged as times with known abnormal events occurring. These time periods should be excluded from the training data set and the model rebuilt with the modified data.

Examine the Need for Dynamic Transformations

The developer should consider the need for this technique whenever there is a significant dynamic separation between variables used in the model. This will be especially true for those independent variables such as setpoints, which might be changed in large steps by the operator. Also the measurements which are upstream of the main process units being modeled may need to be dynamically reconciled.

Remove Operating Point Changes

There are continual operating point changes in process operations. These can be intentional, where the operator makes a change to a key setpoint or they can be due to process changes such as heat exchanger fouling or catalyst deactivation. To prevent these changes from appearing as abnormal events, those process measurements, which are affected by these changes, should be converted to deviation variables (see Appendix 1, section Developing PCA Models for AED, subsection IV,F).

Subtracting the exponentially filtered value of a measurement from its raw value and using this difference in the model accomplishes the operating point removal. The time constant for the exponential filter should be about the same size as the major time constant of the process. For the ethylene plant this was a time constant of about 45 minutes.

D. Creating the Initial PCA Model

Once the specific measurements have been selected and the training data set has been built, the PCA model can be built quickly using standard tools.

The engineering approach to selecting the correct number of principal components is to stop when the groups of variables, which are the primary contributors to the principal component no longer make engineering sense. This is discussed in Appendix 1, section Developing PCA Models for AED, subsection V,B. In the present case, Appendix 2 lists the named principal components for each PCA model and the number of principal components ranges from 4 to 15 for each PCA model.

Additional Engineering Models

The valve-flow consistency monitor was derived from a comparison of the measured flow (compensated for the pressure drop across the valve) with a model estimate of the flow. The model estimate of the flow is obtained from historical data by fitting coefficients to the valve curve equation (assumed to be either linear or parabolic). In the initial application, 27 valve-flow consistency models were developed. This type of model was developed to monitor the main process manipulation points. Several models were also developed for control loops that historically exhibited unreliable performance.

A time-varying drift term was added to the model estimate to compensate for long term sensor drift. The operator can also request a reset of the drift term after a sensor calibration or when a manual bypass valve has changed. A time-varying drift term was added to the model estimate to compensate for a long-term sensor drift. The operator can and has changed position. This modification to the flow estimator significantly improved the robustness for implementation within an online detection algorithm. The valve-flow consistency monitors also notify the operator in the event that a control valve is fully opened or closed.

Appendix 1

Events and disturbances of various magnitudes are constantly affecting process operations. Most of the time these events and disturbances are handled by the process control system. However, the operator is required to make an unplanned intervention in the process operations whenever the process control system cannot adequately handle the process event. We define this situation as an abnormal operation and the cause defined as an abnormal event.

A methodology and system has been developed to create and to deploy on-line, sets of models, which are used to detect abnormal operations and help the operator isolate the location of the root cause. In a preferred embodiment, the models employ principle component analysis (PCA). These sets of models are composed of both simple models that represent known engineering relationships and principal component analysis (PCA) models that represent normal data patterns that exist within historical databases. The results from these many model calculations are combined into a small number of summary time trends that allow the process operator to easily monitor whether the process is entering an abnormal operation.

Figure 1:
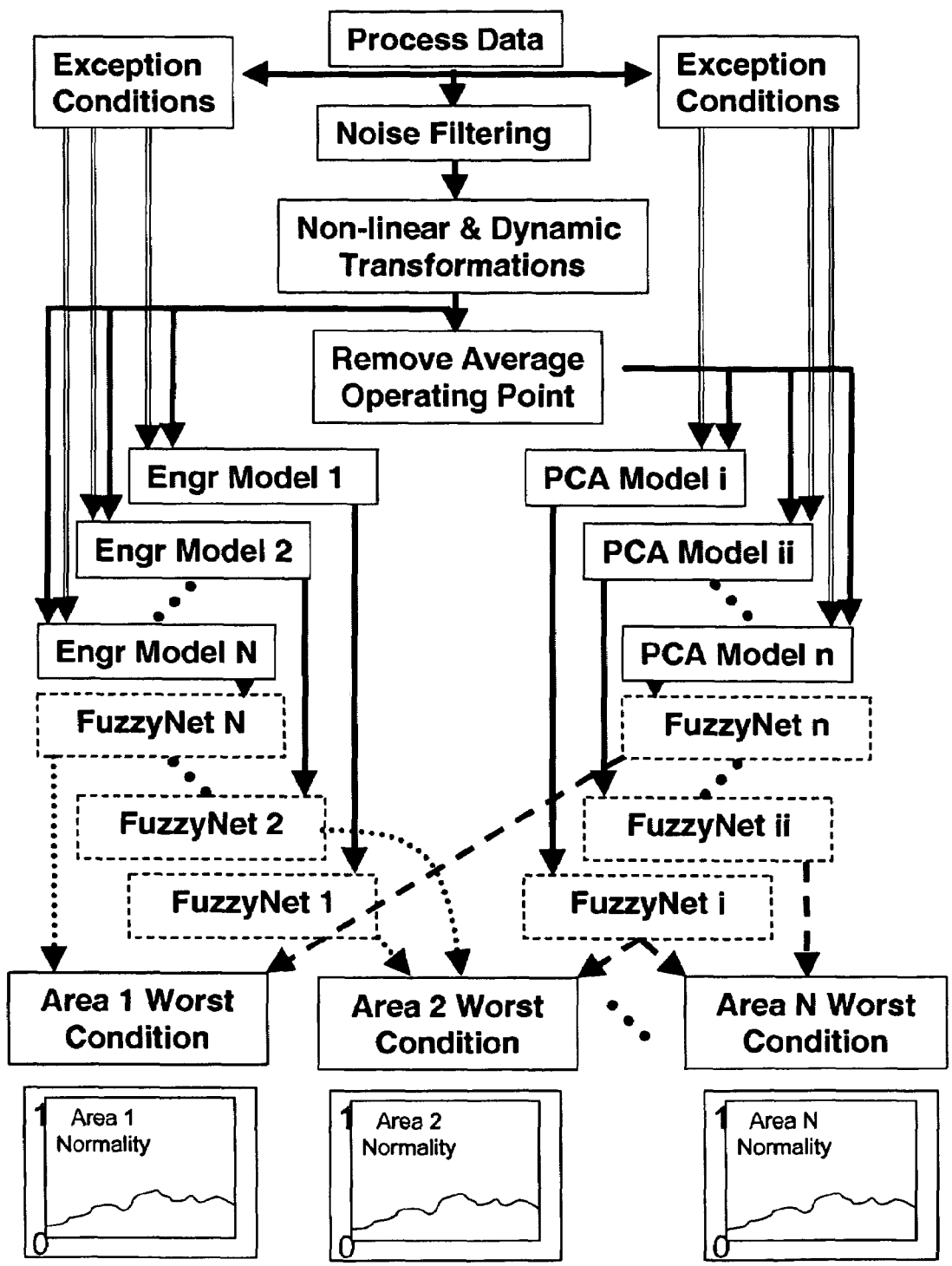
FIG. 1 shows how the information in the online system flows through the various transformations, model calculations, fuzzy Petri nets and consolidation to arrive at a summary trend which indicates the normality/abnormality of the process areas.

FIG. 1 shows how the information in the online system flows through the various transformations, model calculations, fuzzy Petri nets and consolidations to arrive at a summary trend which indicates the normality/abnormality of the process areas. The heart of this system is the various models used to monitor the normality of the process operations.

The PCA models described in this invention are intended to broadly monitor continuous refining and chemical processes and to rapidly detect developing equipment and process problems. The intent is to provide blanket monitoring of all the process equipment and process operations under the span of responsibility of a particular console operator post. This can involve many major refining or chemical process operating units (e.g. distillation towers, reactors, compressors, heat exchange trains, etc.) which have hundreds to thousands of process measurements. The monitoring is designed to detect problems which develop on a minutes to hours timescale, as opposed to long term performance degradation. The process and equipment problems do not need to be specified beforehand. This is in contrast to the use of PCA models cited in the literature which are structured to detect a specific important process problem and to cover a much smaller portion of the process operations.

To accomplish this objective, the method for PCA model development and deployment includes a number of novel extensions required for their application to continuous refining and chemical processes including:

criteria for establishing the equipment scope of the PCA models criteria and methods for selecting, analyzing, and transforming measurement inputs developing of multivariate statistical models based on a variation of principle component models, PCA developing models based on simple engineering relationships restructuring the associated statistical indices preprocessing the on-line data to provide exception calculations and continuous on-line model updating using fuzzy Petri nets to interpret model indices as normal or abnormal using fuzzy Petri nets to combine multiple model outputs into a single continuous summary indication of normality/abnormality for a process area design of operator interactions with the models and fuzzy Petri nets to reflect operations and maintenance activities These extensions are necessary to handle the characteristics of continuous refining and chemical plant operations and the corresponding data characteristics so that PCA and simple engineering models can be used effectively. These extensions provide the advantage of preventing many of the Type I and Type II errors and quicker indications of abnormal events.

This section will not provide a general background to PCA. For that, readers should refer to a standard textbook on PCA, see e.g. E. Jackson's "*A User's Guide to Principal Component Analysis*", John Wiley & Sons, 1991.

The classical PCA technique makes the following statistical assumptions all of which are violated to some degree by the data generated from normal continuous refining and chemical plant process operations:

1. The process is stationary—its mean and variance are constant over time.
2. The cross correlation among variables is linear over the range of normal process operations
3. Process noise random variables are mutually independent.
4. The covariance matrix of the process variables is not degenerate (i.e. positive semi-definite).
5. The data are scaled "appropriately" (the standard statistical approach being to scale to unit variance).
6. There are no (uncompensated) process dynamics (a standard partial compensation for this being the inclusion of lag variables in the model)
7. All variables have some degree of cross correlation.
8. The data have a multivariate normal distribution Consequently, in the selection, analysis and transformation of inputs and the subsequent in building the PCA model, various adjustments are made to evaluate and compensate for the degree of violation.

Once these PCA models are deployed on-line the model calculations require specific exception processing to remove the effect of known operation and maintenance activities, to disable failed or "bad acting" inputs, to allow the operator observe and acknowledge the propagation of an event through the process and to automatically restore the calculations once the process has returned to normal.

Use of PCA models is supplemented by simple redundancy checks that are based on known engineering relationships that must be true during normal operations. These can be as simple as checking physically redundant measurements, or as complex as material and engineering balances.

The simplest form of redundancy checks are simple 2×2 checks, e.g.

temperature 1=temperature 2 flow 1=valve characteristic curve 1 (valve 1 position)

material flow into process unit 1=material flow out of process unit 1

Figure 2:
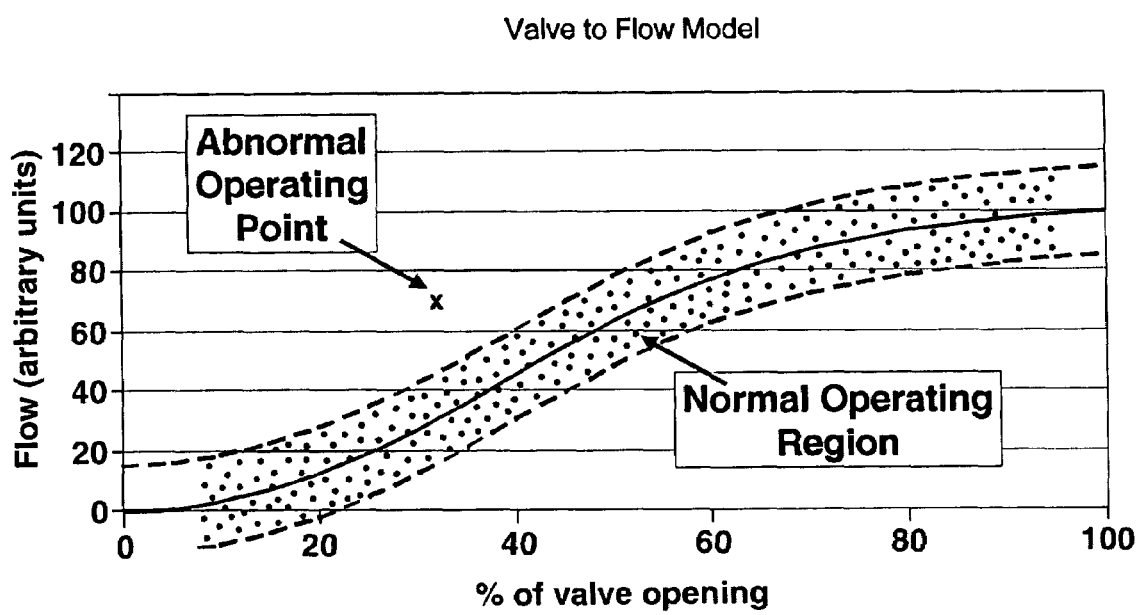
FIG. 2 shows a valve flow plot to the operator as a simple x-y plot.

These are shown to the operator as simple x-y plots, such as the valve flow plot in FIG. 2. Each plot has an area of normal operations, shown on this plot by the gray area. Operations outside this area are signaled as abnormal.

Multiple redundancy can also be checked through a single multidimensional model. Examples of multidimensional redundancy are:

pressure 1=pressure 2= . . . =pressure n material flow into process unit 1=material flow out of process unit 1= . . . =material flow into process unit 2

Figure 3:
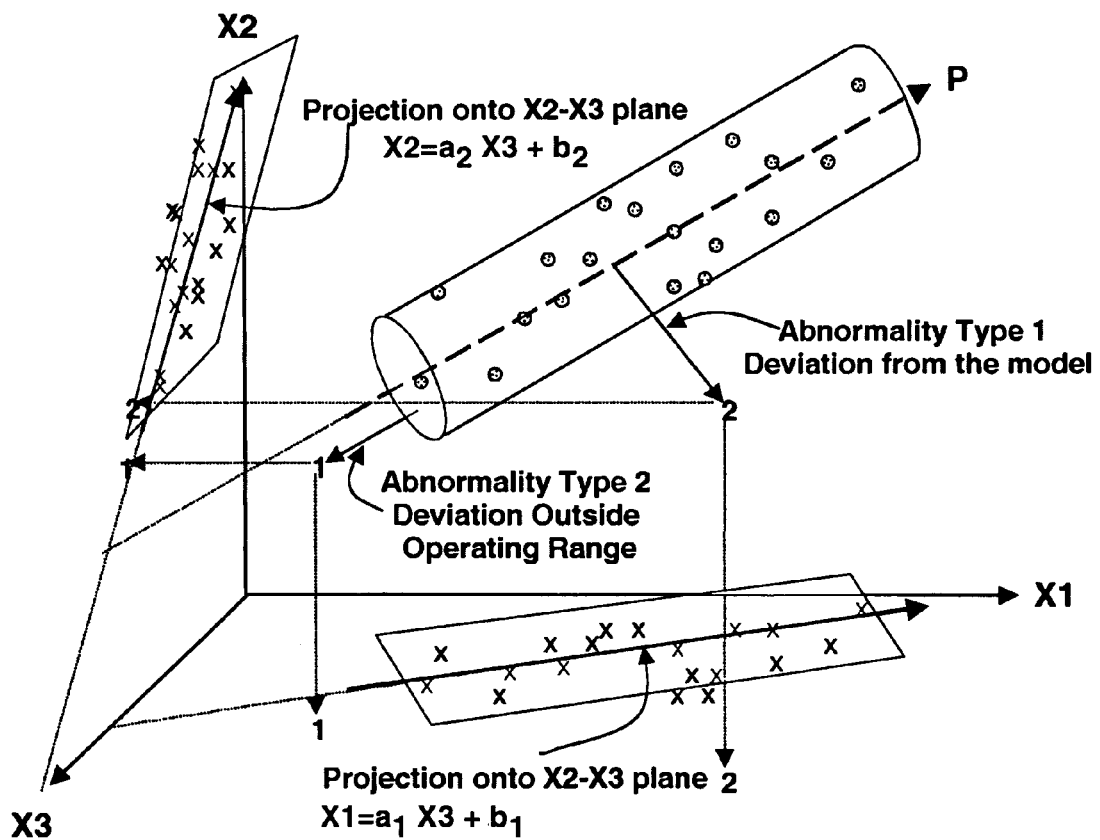
FIG. 3 shows three-dimensional redundancy expressed as a PCA model.

Multidimensional checks are represented with "PCA like" models. In FIG. 3, there are three independent and redundant measures, X1, X2, and X3. Whenever X3 changes by one, X1 changes by $a_{13}$ and X2 changes by $a_{23}$. This set of relationships is expressed as a PCA model with a single principle component direction, P. This type of model is presented to the operator in a manner similar to the broad PCA models. As with the two dimensional redundancy checks the gray area shows the area of normal operations. The principle component loadings of P are directly calculated from the engineering equations, not in the traditional manner of determining P from the direction of greatest variability.

The characteristics of the process operation require exception operations to keep these relationships accurate over the normal range of process operations and normal field equipment changes and maintenance activities. Examples of exception operations are:

opening of bypass valves around flow meters compensating for upstream/downstream pressure changes recalibration of field measurements redirecting process flows based on operating modes The PCA models and the engineering redundancy checks are combined using fuzzy Petri nets to provide the process operator with a continuous summary indication of the normality of the process operations under his control (FIG. 4).

Multiple statistical indices are created from each PCA model so that the indices correspond to the configuration and hierarchy of the process equipment that the process operator handles. The sensitivity of the traditional sum of Squared Prediction Error, SPE, index is improved by creating subset indices, which only contain the contribution to the SPE index for the inputs which come from designated portions of the complete process area covered by the PCA model. Each statistical index from the PCA models is fed into a fuzzy Petri net to convert the index into a zero to one scale, which continuously indicates the range from normal operation (value of zero) to abnormal operation (value of one).

Each redundancy check is also converted to a continuous normal-abnormal indication using fuzzy nets. There are two different indices used for these models to indicate abnormality; deviation from the model and deviation outside the operating range (shown on FIG. 3). These deviations are equivalent to the sum of the square of the error and the Hotelling T square indices for PCA models. For checks with dimension greater than two, it is possible to identify which input has a problem. In FIG. 3, since the X3-X2 relationship is still within the normal envelope, the problem is with input X1. Each deviation measure is converted by the fuzzy Petri net into a zero to one scale that will continuously indicate the range from normal operation (value of zero) to abnormal operation (value of one).

For each process area under the authority of the operator, the applicable set of normal-abnormal indicators is combined into a single normal-abnormal indicator. This is done by using fuzzy Petri logic to select the worst case indication of abnormal operation. In this way the operator has a high level summary of all the checks within the process area. This section will not provide a general background to fuzzy Petri nets. For that, readers should refer to a standard reference on fuzzy Petri nets, see e.g. Cardoso, et al, *Fuzzy Petri Nets: An Overview*, 13$^{th}$ Word Congress of IFAC, Vol. 1: Identification II, Discrete Event Systems, San Francisco, Calif., USA, June 30-Jul. 5, 1996, pp 443-448.

Figure 5:
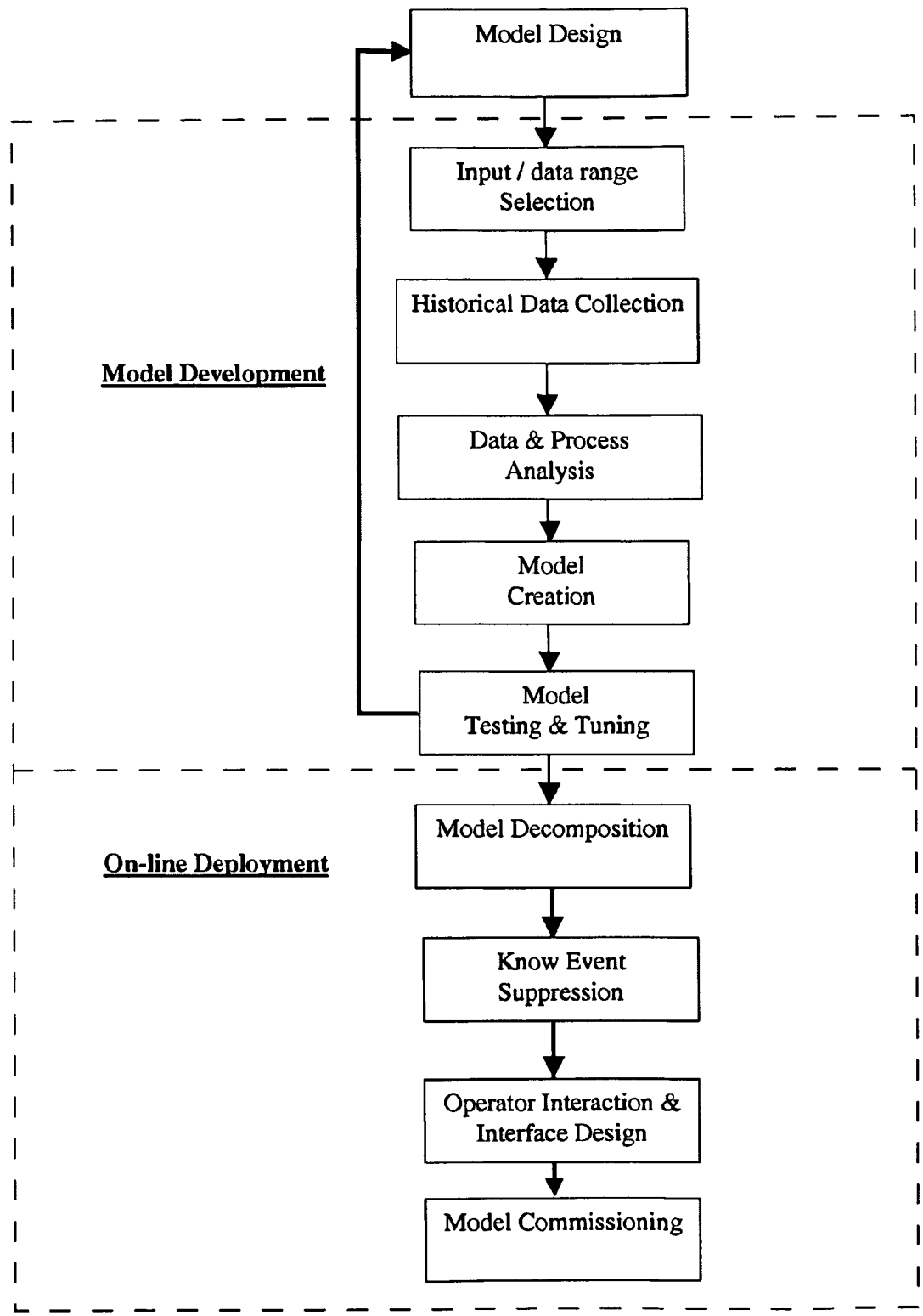
FIG. 5 shows a schematic diagram of the overall process for developing an abnormal event application.

The overall process for developing an abnormal event application is shown in FIG. 5. The basic development strategy is iterative where the developer starts with a rough model, then successively improves that model's capability based on observing how well the model represents the actual process operations during both normal operations and abnormal operations. The models are then restructured and retrained based on these observations.

Developing PCA Models for Abnormal Event Detection

I. Conceptual PCA Model Design

The overall design goals are to:

provide the console operator with a continuous status (normal vs. abnormal) of process operations for all of the process units under his operating authority provide him with an early detection of a rapidly developing (minutes to hours) abnormal event within his operating authority provide him with only the key process information needed to diagnose the root cause of the abnormal event.

Actual root cause diagnosis is outside the scope of this invention. The console operator is expected to diagnosis the process problem based on his process knowledge and training.

Having a broad process scope is important to the overall success of abnormal operation monitoring. For the operator to learn the system and maintain his skills, he needs to regularly use the system. Since specific abnormal events occur infrequently, abnormal operations monitoring of a small portion of the process would be infrequently used by the operator, likely leading the operator to disregard the system when it finally detects an abnormal event. This broad scope is in contrast to the published modeling goal which is to design the model based on detecting a specific process problem of significant economic interest (see e.g., Kourti, "Process Analysis and Abnormal Situation Detection: From Theory to Practice", IEEE Control Systems Magazine, October 2002pp. 10-25.)

There are thousands of process measurements within the process units under a single console operator's operating authority. Continuous refining and chemical processes exhibit significant time dynamics among these measurements, which break the cross correlation among the data. This requires dividing the process equipment into separate PCA models where the cross correlation can be maintained.

Conceptual model design is composed of four major decisions:

Subdividing the process equipment into equipment groups with corresponding PCA models Subdividing process operating time periods into process operating modes requiring different PCA models Identifying which measurements within an equipment group should be designated as inputs to each PCA model Identifying which measurements within an equipment group should act as flags for suppressing known events or other exception operations A. Process Unit Coverage The initial decision is to create groups of equipment that will be covered by a single PCA model. The specific process units included requires an understanding of the process integration/interaction. Similar to the design of a multivariable constraint controller, the boundary of the PCA model should encompass all significant process interactions and key upstream and downstream indications of process changes and disturbances.

The following rules are used to determined these equipment groups:

Equipment groups are defined by including all the major material and energy integrations and quick recycles in the same equipment group. If the process uses a multivariable constraint controller, the controller model will explicitly identify the interaction points among the process units. Otherwise the interactions need to be identified through an engineering analysis of the process.

Process groups should be divided at a point where there is a minimal interaction between the process equipment groups. The most obvious dividing point occurs when the only interaction comes through a single pipe containing the feed to the next downstream unit. In this case the temperature, pressure, flow, and composition of the feed are the primary influences on the downstream equipment group and the pressure in the immediate downstream unit is the primary influence on the upstream equipment group. These primary influence measurements should be included in both the upstream and downstream equipment group PCA models.

Include the influence of the process control applications between upstream and downstream equipment groups. The process control applications provide additional influence paths between upstream and downstream equipment groups. Both feedforward and feedback paths can exist. Where such paths exist the measurements which drive these paths need to be included in both equipment groups. Analysis of the process control applications will indicate the major interactions among the process units.

Divide equipment groups wherever there are significant time dynamics (e.g. storage tanks, long pipelines etc.). The PCA models primarily handle quick process changes (e.g. those which occur over a period of minutes to hours). Influences, which take several hours, days or even weeks to have their effect on the process, are not suitable for PCA models. Where these influences are important to the normal data patterns, measurements of these effects need to be dynamically compensated to get their effect time synchronized with the other process measurements (see the discussion of dynamic compensation).

B. Process Operating Modes

Process operating modes are defined as specific time periods where the process behavior is significantly different. Examples of these are production of different grades of product (e.g. polymer production), significant process transitions (e.g. startups, shutdowns, feedstock switches), processing of dramatically different feedstock (e.g. cracking naphtha rather than ethane in olefins production), or different configurations of the process equipment (different sets of process units running).

Where these significant operating modes exist, it is likely that separate PCA models will need to be developed for each major operating mode. The fewer models needed the better. The developer should assume that a specific PCA model could cover similar operating modes. This assumption must be tested by running new data from each operating mode through the model to see if it behaves correctly.

C. Historical Process Problems

In order for there to be organizational interest in developing an abnormal event detection system, there should be an historical process problem of significant economic impact. However, these significant problems must be analyzed to identify the best approach for attacking these problems. In particular, the developer should make the following checks before trying to build an abnormal event detection application:

1. Can the problem be permanently fixed? Often a problem exists because site personnel have not had sufficient time to investigate and permanently solve the problem. Once the attention of the organization is focused on the problem, a permanent solution is often found. This is the best approach.
2. Can the problem be directly measured? A more reliable way to detect a problem is to install sensors that can directly measure the problem in the process. This can also be used to prevent the problem through a process control application. This is the second best approach.
3. Can an inferential measurement be developed which will measure the approach to the abnormal operation? Inferential measurements are usually developed using partial least squares, PLS, models which are very close relatives to PCA abnormal event models. Other common alternatives for developing inferential measurements include Neural Nets and linear regression models. If the data exists which can be used to reliably measure the approach to the problem condition (e.g. tower flooding using delta pressure), this can then be used to not only detect when the condition exists but also as the base for a control application to prevent the condition from occurring. This is the third best approach.

Both direct measurements of problem conditions and inferential measurements of these conditions can be easily integrated into the overall network of abnormal detection models.

II. Input Data and Operating Range Selection

Within an equipment group, there will be thousands of process measurements. For the preliminary design:

Select all cascade secondary controller measurements, and especially ultimate secondary outputs (signals to field control valves) on these units Select key measurements used by the console operator to monitor the process (e.g. those which appear on his operating schematics)

Select any measurements used by the contact engineer to measure the performance of the process Select any upstream measurement of feedrate, feed temperature or feed quality Select measurements of downstream conditions which affect the process operating area, particularly pressures.

Select extra redundant measurements for measurements that are important

Select measurements that may be needed to calculate non-linear transformations.

Select any external measurement of a disturbance (e.g. ambient temperature)

Select any other measurements, which the process experts regard as important measures of the process condition From this list only include measurements which have the following characteristics:

The measurement does not have a history of erratic or problem performance

The measurement has a satisfactory signal to noise ratio

The measurement is cross-correlated with other measurements in the data set

The measurement is not saturated for more than 10% of the time during normal operations.

The measurement is not tightly controlled to a fixed setpoint, which rarely changes (the ultimate primary of a control hierarchy).

The measurement does not have long stretches of "Bad Value" operation or saturated against transmitter limits.

The measurement does not go across a range of values, which is known to be highly non-linear The measurement is not a redundant calculation from the raw measurements The signals to field control valves are not saturated for more than 10% of the time A. Evaluations for Selecting Model Inputs There are two statistical criteria for prioritizing potential inputs into the PCA Abnormal Detection Model, Signal to Noise Ratio and Cross-Correlation.

1) Signal to Noise Test

The signal to noise ratio is a measure of the information content in the input signal.

The signal to noise ratio is calculated as follows:

1. The raw signal is filtered using an exponential filter with an approximate dynamic time constant equivalent to that of the process. For continuous refining and chemical processes this time constant is usually in the range of 30 minutes to 2 hours. Other low pass filters can be used as well. For the exponential filter the equations are:

$$Y_n = P*Y_{n-1} + (1-P)*X_n \quad \text{Exponential filter equation} \quad \text{Equation 1}$$

$$P = \text{Exp}(-T_s/T_f) \quad \text{Filter constant calculation} \quad \text{Equation 2}$$

where:
$Y_n$ the current filtered value
$Y_{n-1}$ the previous filtered value
$X_n$ the current raw value
P the exponential filter constant
$T_s$ the sample time of the measurement
$T_f$ the filter time constant 2. A residual signal is created by subtracting the filtered signal from the raw signal $$R_n = X_n - Y_n \quad \text{Equation 3}$$

3. The signal to noise ratio is the ratio of the standard deviation of the filtered signal divided by the standard deviation of the residual signal $$S/N = \sigma_Y/\sigma_R \quad \text{Equation 4}$$

It is preferable to have all inputs exhibit a S/N which is greater than a predetermined minimum, such as 4. Those inputs with S/N less than this minimum need individual examination to determine whether they should be included in the model The data set used to calculate the S/N should exclude any long periods of steady-state operation since that will cause the estimate for the noise content to be excessively large.

2) Cross Correlation Test

The cross correlation is a measure of the information redundancy the input data set. The cross correlation between any two signals is calculated as:

1. Calculate the co-variance, $S_{ik}$, between each input pair, i and k $$S_{ik} = \frac{N*\Sigma(X_i*X_k) - (\Sigma X_i)*(\Sigma X_k)}{N*(N-1)} \quad \text{Equation 5}$$

2. Calculate the correlation coefficient for each pair of inputs from the co-variance:

$$CC_{ik} = S_{ik}/(S_{ii}*S_{kk})^{1/2} \quad \text{Equation 6}$$

There are two circumstances, which flag that an input should not be included in the model. The first circumstance occurs when there is no significant correlation between a particular input and the rest of the input data set. For each input, there must be at least one other input in the data set with a significant correlation coefficient, such as 0.4.

The second circumstance occurs when the same input information has been (accidentally) included twice, often through some calculation, which has a different identifier. Any input pairs that exhibit correlation coefficients near one (for example above 0.95) need individual examination to determine whether both inputs should be included in the model. If the inputs are physically independent but logically redundant (i.e., two independent thermocouples are independently measuring the same process temperature) then both these inputs should be included in the model.

If two inputs are transformations of each other (i.e., temperature and pressure compensated temperature) the preference is to include the measurement that the operator is familiar with, unless there is a significantly improved cross correlation between one of these measurements and the rest of the dataset. Then the one with the higher cross correlation should be included.

3) Identifying & Handling Saturated Variables

Refining and chemical processes often run against hard and soft constraints resulting in saturated values and "Bad Values" for the model inputs. Common constraints are: instrument transmitter high and low ranges, analyzer ranges, maximum and minimum control valve positions, and process control application output limits. Inputs can fall into several categories with regard to saturation which require special handling when pre-processing the inputs, both for model building and for the on-line use of these models.

Bad Values

For standard analog instruments (e.g., 4-20 milliarpp electronic transmitters), bad values can occur because of two separate reasons:

The actual process condition is outside the range of the field transmitter

The connection with the field has been broken

When either of these conditions occur, the process control system could be configured on an individual measurement basis to either assign a special code to the value for that measurement to indicate that the measurement is a Bad Value, or to maintain the last good value of the measurement. These values will then propagate throughout any calculations performed on the process control system. When the "last good value" option has been configured, this can lead to erroneous calculations that are difficult to detect and exclude. Typically when the "Bad Value" code is propagated through the system, all calculations which depend on the bad measurement will be flagged bad as well.

Regardless of the option configured on the process control system, those time periods, which include Bad Values should not be included in training or test data sets. The developer needs to identify which option has been configured in the process control system and then configure data filters for excluding samples, which are Bad Values. For the on-line implementation, inputs must be pre-processed so that Bad Values are flagged as missing values, regardless of which option had been selected on the process control system.

Those inputs, which are normally Bad Value for extensive time periods should be excluded from the model.

Constrained Variables

Constrained variables are ones where the measurement is at some limit, and this measurement matches an actual process condition (as opposed to where the value has defaulted to the maximum or minimum limit of the transmitter range—covered in the Bad Value section). This process situation can occur for several reasons:

- Portions of the process are normally inactive except under special override conditions, for example pressure relief flow to the flare system. Time periods where these override conditions are active should be excluded from the training and validation data set by setting up data filters. For the on-line implementation these override events are trigger events for automatic suppression of selected model statistics
- The process control system is designed to drive the process against process operating limits, for example product spec limits. These constraints typically fall into two categories:—those, which are occasionally saturated and those, which are normally saturated. Those inputs, which are normally saturated, should be excluded from the model. Those inputs, which are only occasionally saturated (for example less than 10% of the time) can be included in the model however, they should be scaled based on the time periods when they are not saturated.

B. Input from Process Control Applications

The process control applications have a very significant effect on the correlation structure of the process data. In particular:

- The variation of controlled variables is significantly reduced so that movement in the controlled variables is primarily noise except for those brief time periods when the process has been hit with a significant process disturbance or the operator has intentionally moved the operating point by changing key setpoints.
- The normal variation in the controlled variables is transferred by the control system to the manipulated variables (ultimately the signals sent to the control valves in the field).

Figure 6:
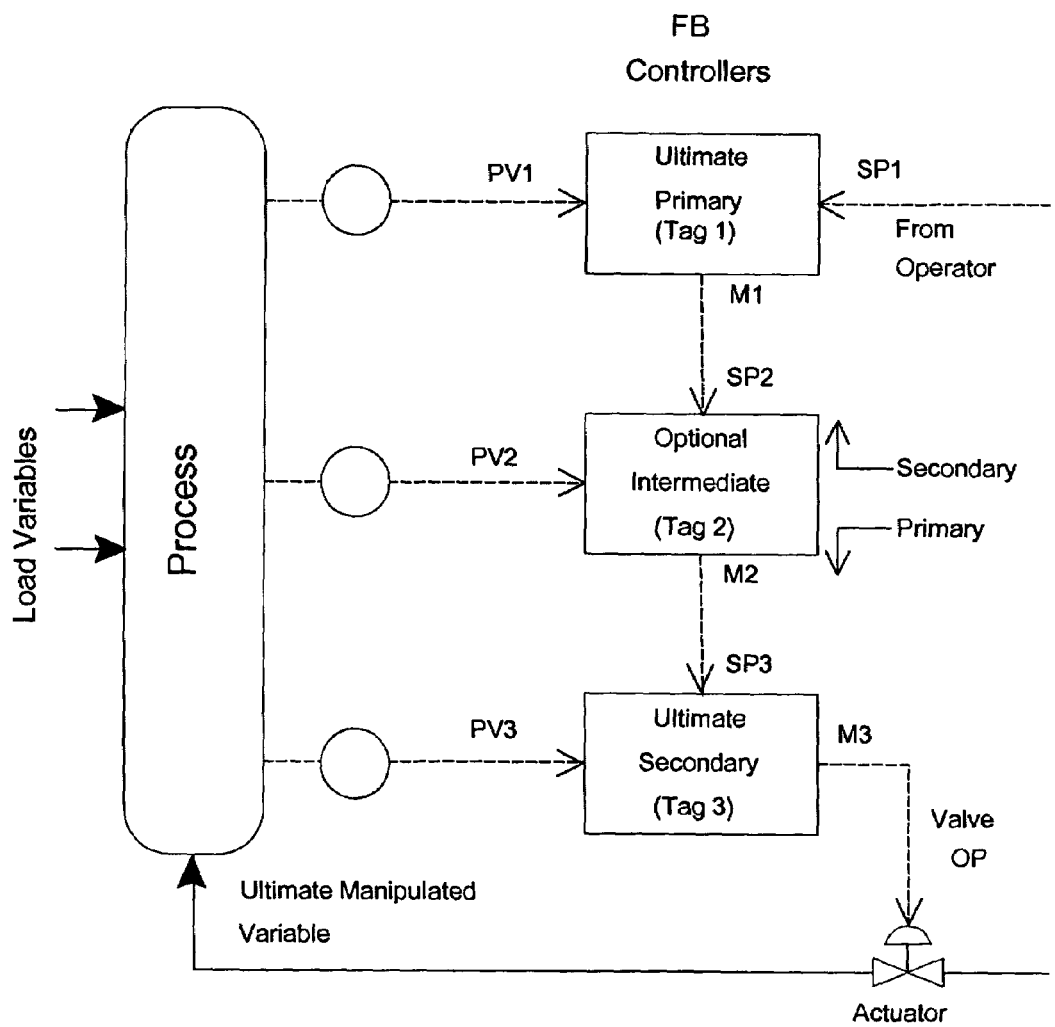
FIG. 6 shows a schematic diagram of the anatomy of a process control cascade.
Figure 7:
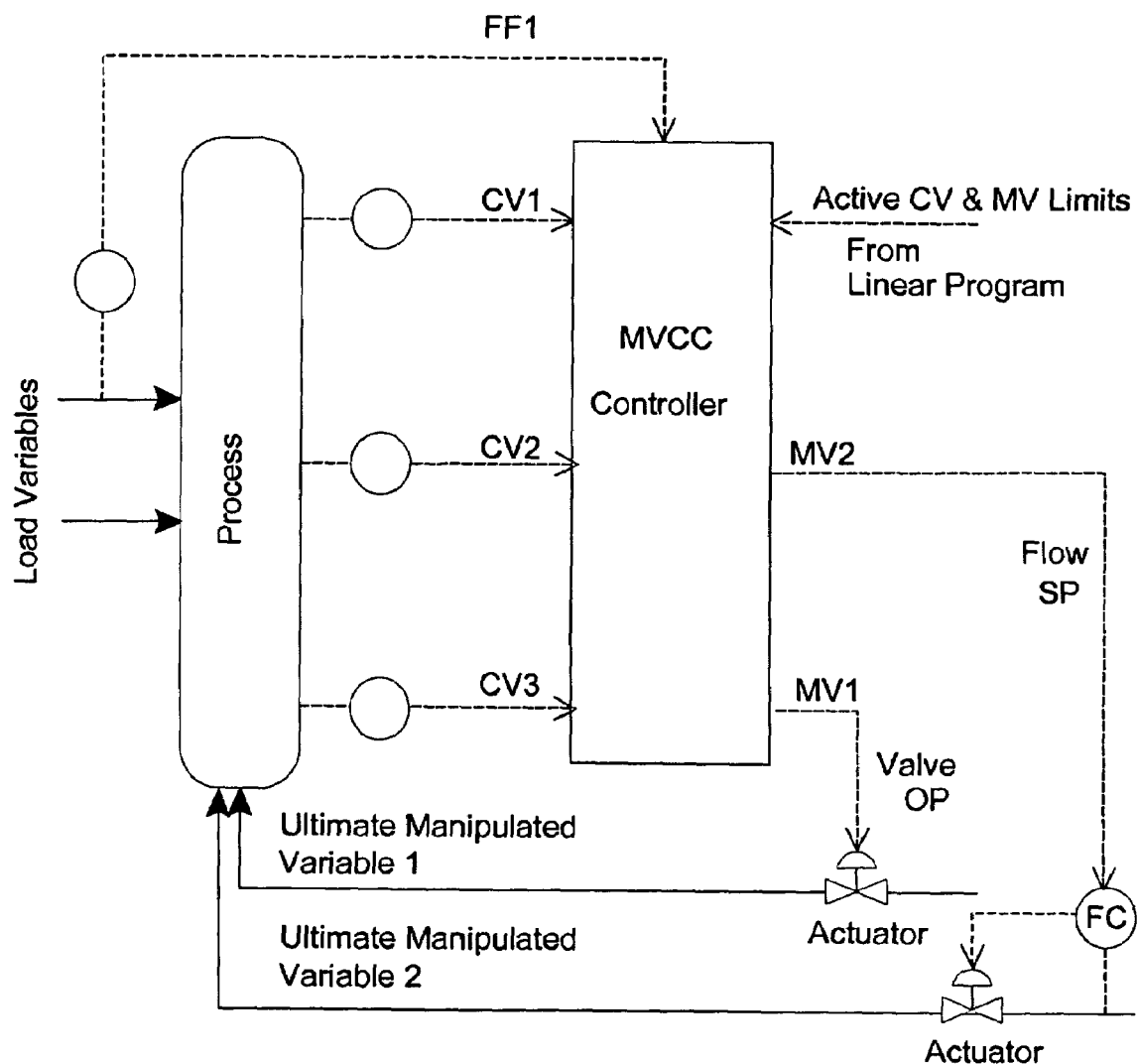
FIG. 7 shows a schematic diagram of the anatomy of a multivariable constraint controller, MVCC.

The normal operations of refinery and chemical processes are usually controlled by two different types of control structures: the classical control cascades (shown in FIG. 6) and the more recent multivariable constraint controllers, MVCC (shown in FIG. 7).

1) Selecting Model Inputs From Cascade Structures

FIG. 6 shows a typical "cascade" process control application, which is a very common control structure for refining and chemical processes. Although there are many potential model inputs from such an application, the only ones that are candidates for the model are the raw process measurements (the "PVs" in this figure ) and the final output to the field valve.

Although it is a very important measurement, the PV of the ultimate primary of the cascade control structure is a poor candidate for inclusion in the model. This measurement usually has very limited movement since the objective of the control structure is to keep this measurement at the setpoint. There can be movement in the PV of the ultimate primary if its setpoint is changed but this usually is infrequent. The data patterns from occasional primary setpoint moves will usually not have sufficient power in the training dataset for the model to characterize the data pattern.

Because of this difficulty in characterizing the data pattern resulting from changes in the setpoint of the ultimate primary, when the operator makes this setpoint move, it is likely to cause a significant increase in the sum of squared prediction error, SPE, index of the model. Consequently, any change in the setpoint of the ultimate primary is a candidate trigger for a "known event suppression". Whenever the operator changes an ultimate primary setpoint, the "known event suppression" logic will automatically remove its effect from the SPE calculation.

Should the developer include the PV of the ultimate primary into the model, this measurement should be scaled based on those brief time periods during which the operator has changed the setpoint and until the process has moved close to the vale of the new setpoint (for example within 95% of the new setpoint change thus if the setpoint change is from 10 to 11, when the PV reaches 10.95)

There may also be measurements that are very strongly correlated (for example greater than 0.95 correlation coefficient) with the PV of the Ultimate Primary, for example redundant thermocouples located near a temperature measurement used as a PV for an Ultimate Primary. These redundant measurements should be treated in the identical manner that is chosen for the PV of the Ultimate Primary.

Cascade structures can have setpoint limits on each secondary and can have output limits on the signal to the field control valve. It is important to check the status of these potentially constrained operations to see whether the measurement associated with a setpoint has been operated in a constrained manner or whether the signal to the field valve has been constrained. Date during these constrained operations should not be used.

2) Selecting/Calculating Model Inputs from Multivariable Constraint Controllers, MVCC FIG. 7 shows a typical MVCC process control application, which is a very common control structure for refining and chemical processes. An MVCC uses a dynamic mathematical model to predict how changes in manipulated variables, MVs, (usually valve positions or setpoints of regulatory control loops) will change control variables, CVs (the dependent temperatures, pressures, compositions and flows which measure the process state). An MVCC attempts to push the process operation against operating limits. These limits can be either MV limits or CV limits and are determined by an external optimizer. The number of limits that the process operates against will be equal to the number of MVs the controller is allowed to manipulate minus the number of material balances controlled. So if an MVCC has 12 MVs, 30 CVs and 2 levels then the process will be operated against 10 limits. An MVCC will also predict the effect of measured load disturbances on the process and compensate for these load disturbances (known as feedforward variables, FF).

Whether or not a raw MV or CV is a good candidate for inclusion in the PCA model depends on the percentage of time that MV or CV is held against its operating limit by the MVCC. As discussed in the Constrained Variables section, raw variables that are constrained more than 10% of the time are poor candidates for inclusion in the PCA model. Normally unconstrained variables should be handled per the Constrained Variables section discussion.

If an unconstrained MV is a setpoint to a regulatory control loop, the setpoint should not be included, instead the measurement of that regulatory control loop should be included. The signal to the field valve from that regulatory control loop should also be included.

If an unconstrained MV is a signal to a field valve position, then it should be included in the model.

C. Redundant Measurements

The process control system databases can have a significant redundancy among the candidate inputs into the PCA model. One type of redundancy is "physical redundancy", where there are multiple sensors (such as thermocouples) located in close physical proximity to each other within the process equipment. The other type of redundancy is "calculational redundancy", where raw sensors are mathematically combined into new variables (e.g. pressure compensated temperatures or mass flows calculated from volumetric flow measurements).

As a general rule, both the raw measurement and an input which is calculated from that measurement should not be included in the model. The general preference is to include the version of the measurement that the process operator is most familiar with. The exception to this rule is when the raw inputs must be mathematically transformed in order to improve the correlation structure of the data for the model. In that case the transformed variable should be included in the model but not the raw measurement.

Physical redundancy is very important for providing cross validation information in the model. As a general rule, raw measurements, which are physically redundant should be included in the model. When there are a large number of physically redundant measurements, these measurements must be specially scaled so as to prevent them from overwhelming the selection of principle components (see the section on variable scaling). A common process example occurs from the large number of thermocouples that are placed in reactors to catch reactor runaways.

When mining a very large database, the developer can identify the redundant measurements by doing a cross-correlation calculation among all of the candidate inputs. Those measurement pairs with a very high cross-correlation (for example above 0.95) should be individually examined to classify each pair as either physically redundant or calculationally redundant.

III. Historical Data Collection

A significant effort in the development lies in creating a good training data set, which is known to contain all modes of normal process operations. This data set should:

Span the normal operating range: Datasets, which span small parts of the operating range, are composed mostly of noise. The range of the data compared to the range of the data during steady state operations is a good indication of the quality of the information in the dataset.

Include all normal operating modes (including seasonal mode variations). Each operating mode may have different correlation structures. Unless the patterns, which characterize the operating mode, are captured by the model, these unmodeled operating modes will appear as abnormal operations.

Only include normal operating data: If strong abnormal operating data is included in the training data, the model will mistakenly model these abnormal operations as normal operations. Consequently, when the model is later compared to an abnormal operation, it may not detect the abnormality operations.

History should be as similar as possible to the data used in the on-line system: The online system will be providing spot values at a frequency fast enough to detect the abnormal event. For continuous refining and chemical operations this sampling frequency will be around one minute. Within the limitations of the data historian, the training data should be as equivalent to one-minute spot values as possible.

The strategy for data collection is to start with a long operating history (usually in the range of 9 months to 18 months), then try to remove those time periods with obvious or documented abnormal events. By using such a long time period, the smaller abnormal events will not appear with sufficient strength in the training data set to significantly influence the model parameters most operating modes should have occurred and will be represented in the data.

A. Historical Data Collection Issues

1) Data Compression

Many historical databases use data compression to minimize the storage requirements for the data. Unfortunately, this practice can disrupt the correlation structure of the data. At the beginning of the project the data compression of the database should be turned off and the spot values of the data historized. Final models should be built using uncompressed data whenever possible. Averaged values should not be used unless they are the only data available, and then with the shortest data average available.

2) Length of Data History

For the model to properly represent the normal process patterns, the training data set needs to have examples of all the normal operating modes, normal operating changes and changes and normal minor disturbances that the process experiences. This is accomplished by using data from over a long period of process operations (e.g. 9-18 months). In particular, the differences among seasonal operations (spring, summer, fall and winter) can be very significant with refinery and chemical processes.

Sometimes these long stretches of data are not yet available (e.g. after a turnaround or other significant reconfiguration of the process equipment). In these cases the model would start with a short initial set of training data (e.g. 6 weeks) then the training dataset is expanded as further data is collected and the model updated monthly until the models are stabilized (e.g. the model coefficients don't change with the addition of new data)

3) Ancillary Historical Data

The various operating journals for this time period should also be collected. This will be used to designate operating time periods as abnormal, or operating in some special mode that needs to be excluded from the training dataset. In particular, important historical abnormal events can be selected from these logs to act as test cases for the models.

4) Lack of Specific Measurement History

Often setpoints and controller outputs are not historized in the plant process data historian. Historization of these values should immediately begin at the start of the project.

5) Operating Modes

Old data that no longer properly represents the current process operations should be removed from the training data set. After a major process modification, the training data and PCA model may need to be rebuilt from scratch. If a particular type of operation is no longer being done, all data from that operation should be removed from the training data set.

Operating logs should be used to identify when the process was run under different operating modes. These different modes may require separate models. Where the model is intended to cover several operating modes, the number of samples in the training dataset from each operating model should be approximately equivalent.

6) Sampling Rate

The developer should gather several months of process data using the site's process historian, preferably getting one minute spot values. If this is not available, the highest resolution data, with the least amount of averaging should be used.

7) Infrequently Sampled Measurements

Figure 8:
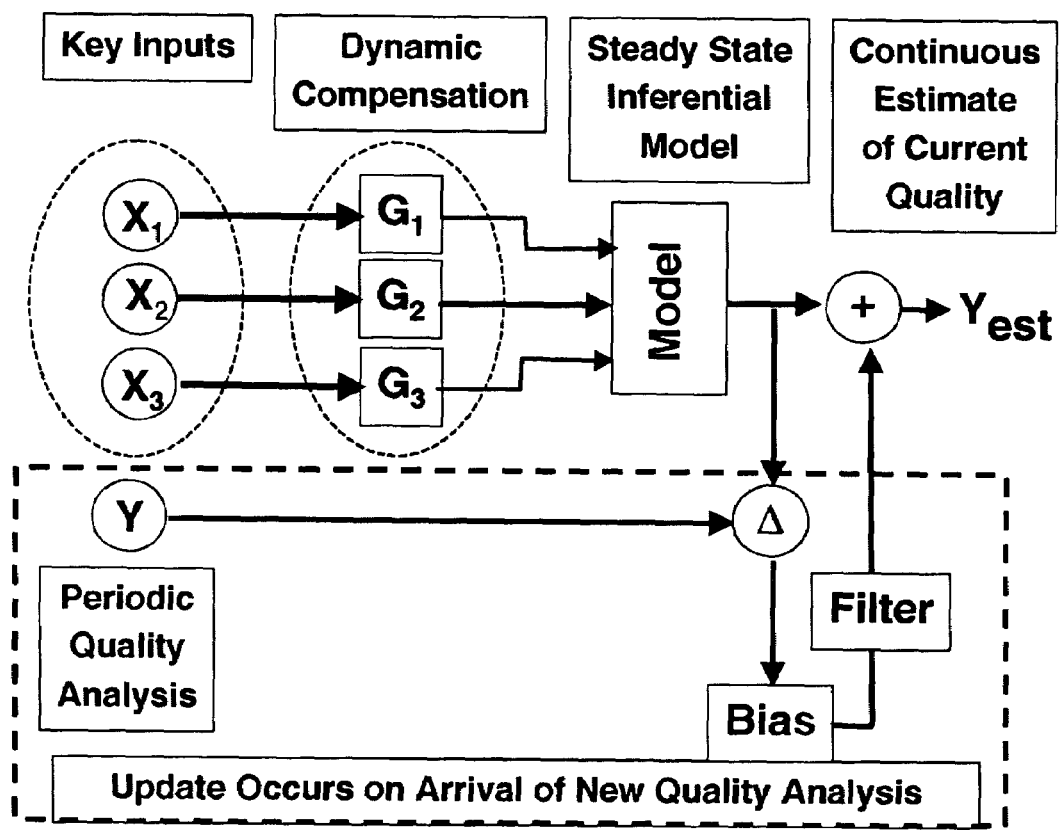
FIG. 8 shows a schematic diagram of the on-line inferential estimate of current quality.

Quality measurements (analyzers and lab samples) have a much slower sample frequency than other process measurements, ranging from tens of minutes to daily. In order to include these measurements in the model a continuous estimate of these quality measurements needs to be constructed. FIG. 8 shows the online calculation of a continuous quality estimate. This same model structure should be created and applied to the historical data. This quality estimate then becomes the input into the PCA model.

8) Model Triggered Data Annotation

Except for very obvious abnormalities, the quality of historical data is difficult to determine. The inclusion of abnormal operating data can bias the model. The strategy of using large quantities of historical data will compensate to some degree the model bias caused by abnormal operating in the training data set. The model built from historical data that predates the start of the project must be regarded with suspicion as to its quality. The initial training dataset should be replaced with a dataset, which contains high quality annotations of the process conditions, which occur during the project life.

The model development strategy is to start with an initial "rough" model (the consequence of a questionable training data set) then use the model to trigger the gathering of a high quality training data set. As the model is used to monitor the process, annotations and data will be gathered on normal operations, special operations, and abnormal operations. Anytime the model flags an abnormal operation or an abnormal event is missed by the model, the cause and duration of the event is annotated. In this way feedback on the model's ability to monitor the process operation can be incorporated in the training data. This data is then used to improve the model, which is then used to continue to gather better quality training data. This process is repeated until the model is satisfactory.

IV. Data & Process Analysis

A. Initial Rough Data Analysis

Using the operating logs and examining the process key performance indicators, the historical data is divided into periods with known abnormal operations and periods with no identified abnormal operations. The data with no identified abnormal operations will be the training data set.

Now each measurement needs to be examined over its history to see whether it is a candidate for the training data set. Measurements which should be excluded are:

Those with many long periods of time as "Bad Value"

Those with many long periods of time pegged to their transmitter high or low limits Those, which show very little variability (except those, which are tightly controlled to their setpoints)

Those that continuously show very large variability relative to their operating range Those that show little or no cross correlation with any other measurements in the data set Those with poor signal to noise ratios While examining the data, those time periods where measurements are briefly indicating "Bad Value" or are briefly pegged to their transmitter high or low limits should also be excluded.

Once these exclusions have been made the first rough PCA model should be built. Since this is going to be a very rough model the exact number of principal components to be retained is not important. This will typically be around 5% of the number measurements included in the model. The number of PCs should ultimately match the number of degrees of freedom in the process, however this is not usually known since this includes all the different sources of process disturbances. There are several standard methods for determining how many principal components to include. Also at this stage the statistical approach to variable scaling should be used: scale all variables to unit variance.

$$X' = (X - X_{avg})/\sigma \qquad \text{Equation 7}$$

The training data set should now be run through this preliminary model to identify time periods where the data does not match the model. These time periods should be examined to see whether an abnormal event was occurring at the time. If this is judged to be the case, then these time periods should also be flagged as times with known abnormal events occurring. These time periods should be excluded from the training data set and the model rebuilt with the modified data.

B. Removing Outliers and Periods of Abnormal Operations

Eliminating obvious abnormal events will be done through the following:

Removing documented events. It is very rare to have a complete record of the abnormal event history at a site. However, significant operating problems should be documented in operating records such as operator logs, operator change journals, alarm journals, and instrument maintenance records. These are only providing a partial record of the abnormal event history.

Figure 9:
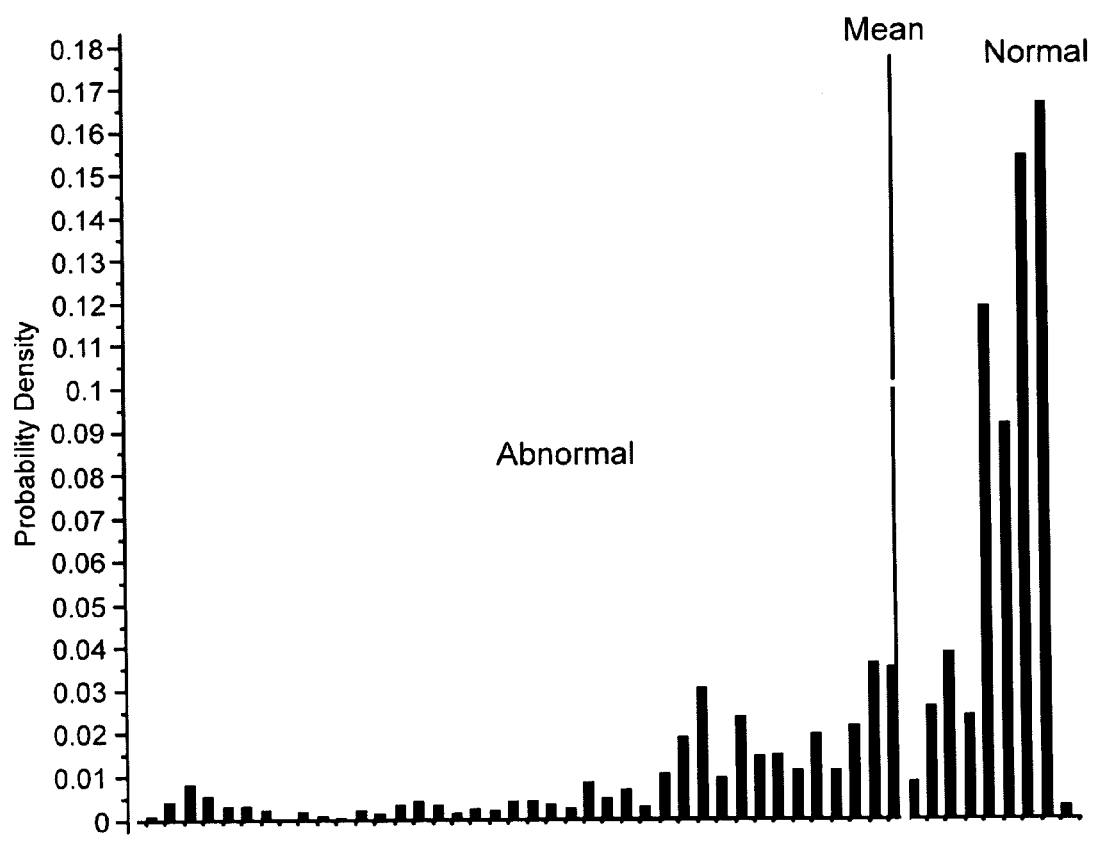
FIG. 9 shows the KPI analysis of historical data.

Removing time periods where key performance indicators, KPIs, are abnormal. Such measurements as feed rates, product rates, product quality are common key performance indicators. Each process operation may have additional KPIs that are specific to the unit. Careful examination of this limited set of measurements will usually give a clear indication of periods of abnormal operations. FIG. 9 shows a histogram of a KPI. Since the operating goal for this KPI is to maximize it, the operating periods where this KPI is low are likely abnormal operations. Process qualities are often the easiest KPIs to analyze since the optimum operation is against a specification limit and they are less sensitive to normal feed rate variations.

C. Compensating for Noise

By noise we are referring to the high frequency content of the measurement signal which does not contain useful information about the process. Noise can be caused by specific process conditions such as two-phase flow across an orifice plate or turbulence in the level. Noise can be caused by electrical inductance. However, significant process variability, perhaps caused by process disturbances is useful information and should not be filtered out.

There are two primary noise types encountered in refining and chemical process measurements: measurement spikes and exponentially correlated continuous noise. With measurement spikes, the signal jumps by an unreasonably large amount for a short number of samples before returning to a value near its previous value. Noise spikes are removed using a traditional spike rejection filter such as the Union filter.

Figure 10:
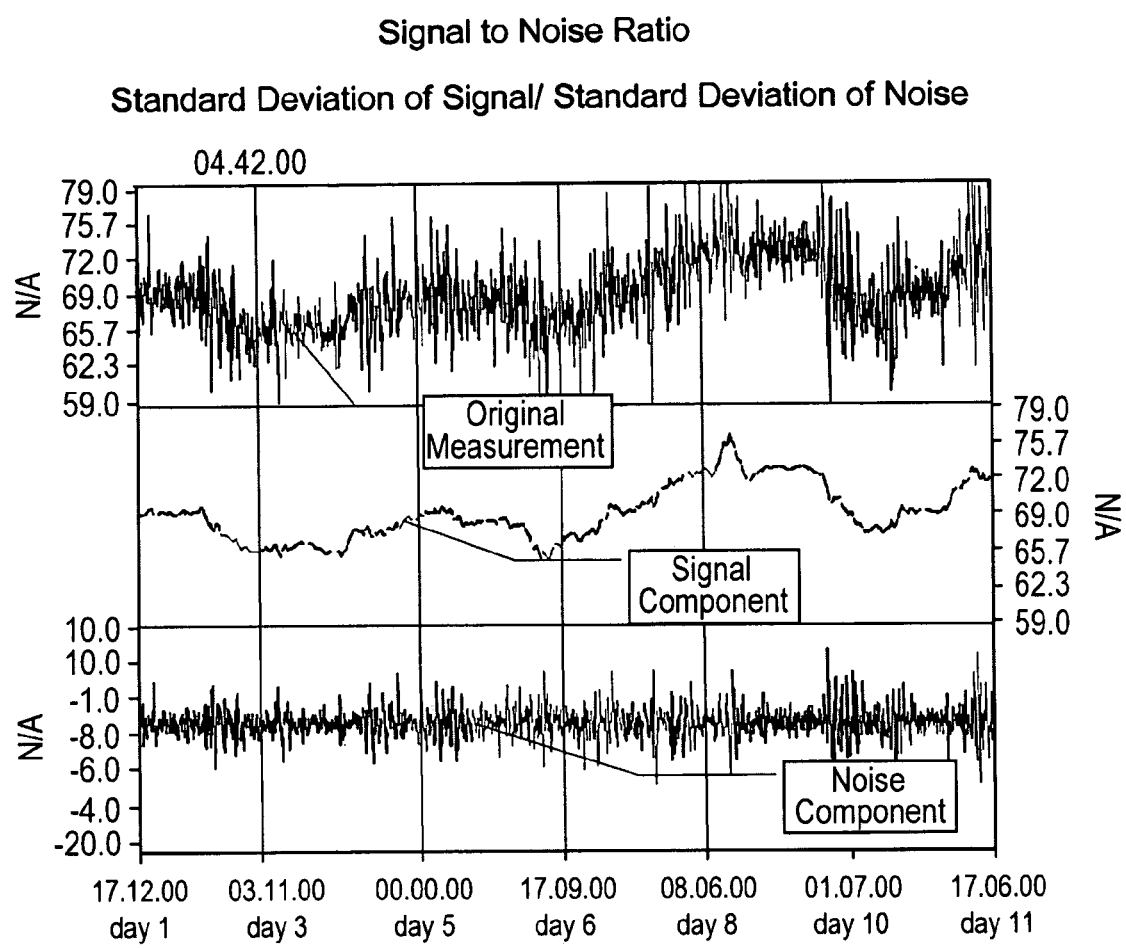
FIG. 10 shows a diagram of signal to noise ratio.

The amount of noise in the signal can be quantified by a measure known as the signal to noise ratio (see FIG. 10). This is defined as the ratio of the amount of signal variability due to process variation to the amount of signal variability due to high frequency noise. A value below four is a typical value for indicating that the signal has substantial noise, and can harm the model's effectiveness.

Whenever the developer encounters a signal with significant noise, he needs to make one of three choices. In order of preference, these are:

Fix the signal by removing the source of the noise (the best answer)

Remove/minimize the noise through filtering techniques

Exclude the signal from the model

Typically for signals with signal to noise ratios between 2 and 4, the exponentially correlated continuous noise can be removed with a traditional low pass filter such as an exponential filter. The equations for the exponential filter are:

$$Y^n = P*Y^{n-1} + (1-P)*X^n \quad \text{Exponential filter equation} \quad \text{Equation 8}$$

$$P = \text{Exp}(-T_s/T_f) \quad \text{Filter constant calculation} \quad \text{Equation 9}$$

$Y^n$ is the current filtered value
$Y^{n-1}$ is the previous filtered value
$X^n$ is the current raw value
P is the exponential filter constant
$T_s$ is the sample time of the measurement
$T_f$ is the filter time constant Signals with very poor signal to noise ratios (for example less than 2) may not be sufficiently improved by filtering techniques to be directly included in the model. If the input is regarded as important, the scaling of the variable should be set to de-sensitize the model by significantly increasing the size of the scaling factor (typically by a factor in the range of 2-10).

D. Transformed Variables

Transformed variables should be included in the model for two different reasons.

First, based on an engineering analysis of the specific equipment and process chemistry, known non-linearities in the process should be transformed and included in the model. Since one of the assumptions of PCA is that the variables in the model are linearly correlated, significant process or equipment non-linearities will break down this correlation structure and show up as a deviation from the model. This will affect the usable range of the model.

Examples of well known non-linear transforms are:
Reflux to feed ratio in distillation columns
Log of composition in high purity distillation
Pressure compensated temperature measurement
Sidestream yield
Flow to valve position (FIG. 2)
Reaction rate to exponential temperature change Second, the data from process problems, which have occurred historically, should also be examined to understand how these problems show up in the process measurements. For example, the relationship between tower delta pressure and feedrate is relatively linear until the flooding point is reached, when the delta pressure will increase exponentially. Since tower flooding is picked up by the break in this linear correlation, both delta pressure and feed rate should be included. As another example, catalyst flow problems can often be seen in the delta pressures in the transfer line. So instead of including the absolute pressure measurements in the model, the delta pressures should be calculated and included.

E. Dynamic Transformations

Figure 11:
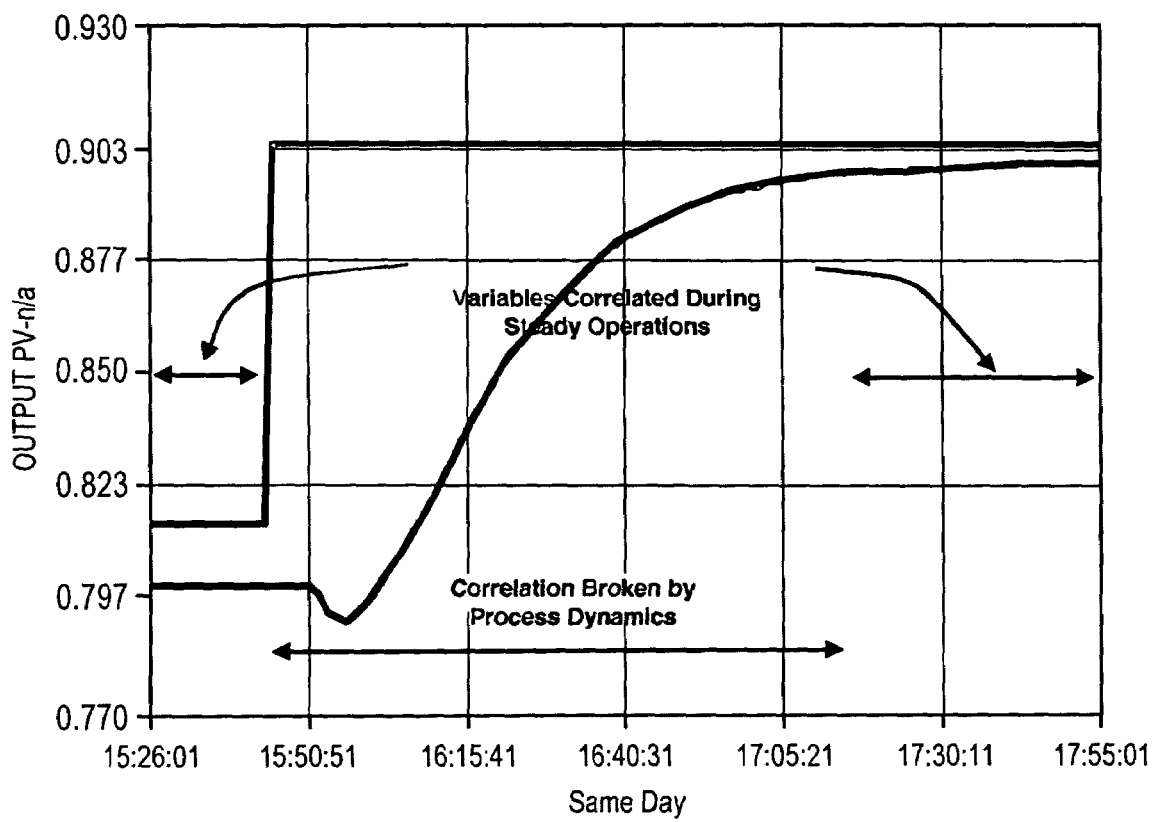
FIG. 11 shows how the process dynamics can disrupt the correlation between the current values of two measurements.

FIG. 11 shows how the process dynamics can disrupt the correlation between the current values of two measurements. During the transition time one value is constantly changing while the other is not, so there is no correlation between the current values during the transition. However these two measurements can be brought back into time synchronization by transforming the leading variable using a dynamic transfer function. Usually a first order with deadtime dynamic model (shown in Equation 9 in the Laplace transform format) is sufficient to time synchronize the data.

$$Y'(s) = \frac{e^{-\Theta s} Y(s)}{Ts+1} \quad \text{Equation 9}$$

Y—raw data
Y'—time synchronized data
T—time constant
Θ—deadtime
S—Laplace Transform parameter This technique is only needed when there is a significant dynamic separation between variables used in the model. Usually only 1-2% of the variables requires this treatment. This will be true for those independent variables such as setpoints which are often changed in large steps by the operator and for the measurements which are significantly upstream of the main process units being modeled.

F. Removing Average Operating Point

Continuous refining and chemical processes are constantly being moved from one operating point to another. These can be intentional, where the operator or an optimization program makes changes to a key setpoints, or they can be due to slow process changes such as heat exchanger fouling or catalyst deactivation. Consequently, the raw data is not stationary. These operating point changes need to be removed to create a stationary dataset. Otherwise these changes erroneously appear as abnormal events.

The process measurements are transformed to deviation variables: deviation from a moving average operating point. This transformation to remove the average operating point is required when creating PCA models for abnormal event detection. This is done by subtracting the exponentially filtered value (see Equations 8 and 9 for exponential filter equations) of a measurement from its raw value and using this difference in the model.

$$X' = X - X_{filtered} \quad \text{Equation 10}$$

X'—measurement transformed to remove operating point changes
X—original raw measurement
$X_{filtered}$—exponentially filtered raw measurement The time constant for the exponential filter should be about the same size as the major time constant of the process. Often a time constant of around 40 minutes will be adequate. The consequence of this transformation is that the inputs to the PCA model are a measurement of the recent change of the process from the moving average operating point.

In order to accurately perform this transform, the data should be gathered at the sample frequency that matches the on-line system, often every minute or faster. This will result in collecting 525,600 samples for each measurement to cover one year of operating data. Once this transformation has been calculated, the dataset is resampled to get down to a more manageable number of samples, typically in the range of 30,000 to 50,000 samples.

V. Model Creation

Once the specific measurements have been selected and the training data set has been built, the model can be built quickly using standard tools.

A. Scaling Model Inputs

The performance of PCA models is dependent on the scaling of the inputs. The traditional approach to scaling is to divide each input by its standard deviation, $\sigma$, within the training data set.

$$X_i' = X_i / \sigma_i \quad \text{Equation 11}$$

For input sets that contain a large number of nearly identical measurements (such as multiple temperature measurements of fixed catalyst reactor beds) this approach is modified to further divide the measurement by the square root of the number of nearly identical measurements.

For redundant data groups $$X_i' = X_i / (\sigma_i * sqrt(N)) \quad \text{Equation 12}$$

Where N=number of inputs in redundant data group

These traditional approaches can be inappropriate for measurements from continuous refining and chemical processes. Because the process is usually well controlled at specified operating points, the data distribution is a combination of data from steady state operations and data from "disturbed" and operating point change operations. These data will have overly small standard deviations from the preponderance of steady state operation data. The resulting PCA model will be excessively sensitive to small to moderate deviations in the process measurements.

For continuous refining and chemical processes, the scaling should be based on the degree of variability that occurs during normal process disturbances or during operating point changes not on the degree of variability that occurs during continuous steady state operations. For normally unconstrained variables, there are two different ways of determining the scaling factor.

First is to identify time periods where the process was not running at steady state, but was also not experiencing a significant abnormal event. A limited number of measurements act as the key indicators of steady state operations. These are typically the process key performance indicators and usually include the process feed rate, the product production rates and the product quality. These key measures are used to segment the operations into periods of normal steady state operations, normally disturbed operations, and abnormal operations. The standard deviation from the time periods of normally disturbed operations provides a good scaling factor for most of the measurements.

Figure 12:
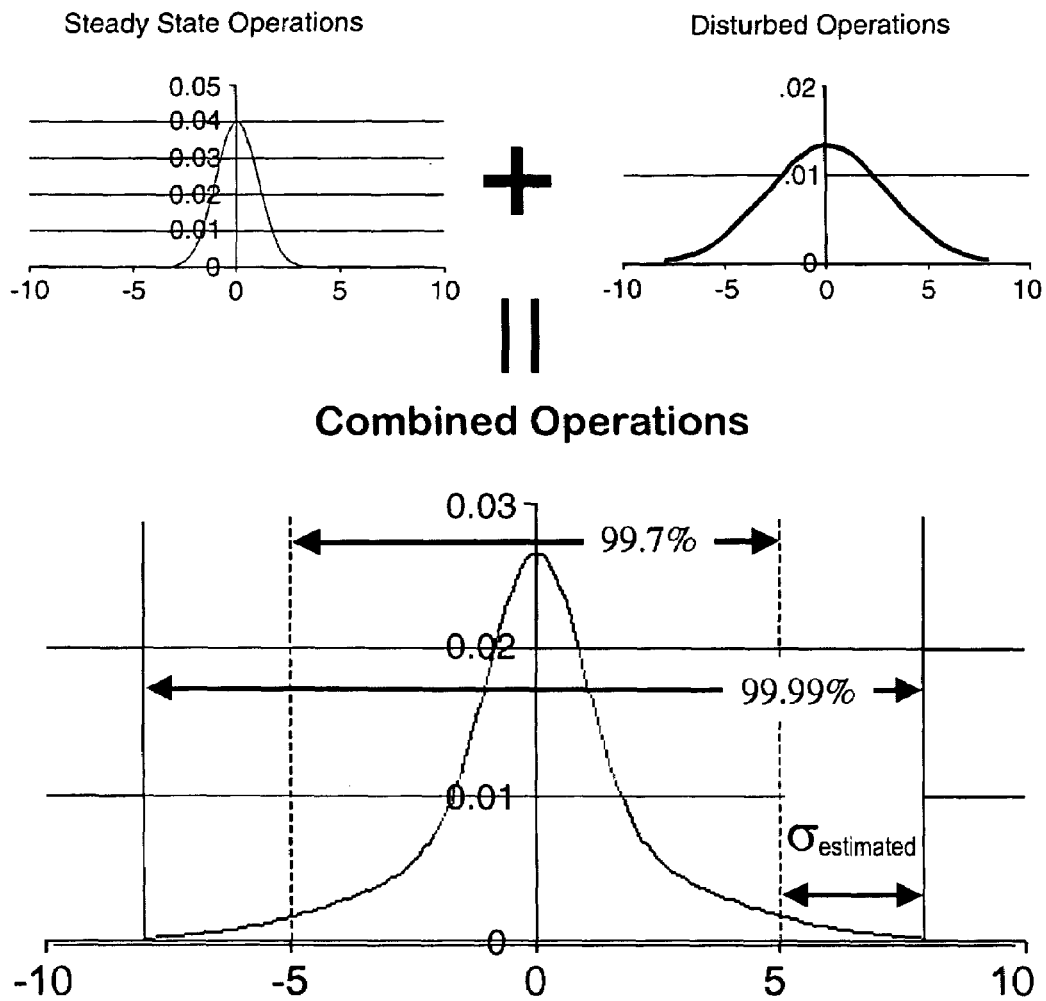
FIG. 12 shows the probability distribution of process data.

An alternative approach to explicitly calculating the scaling based on disturbed operations is to use the entire training data set as follows. The scaling factor can be approximated by looking at the data distribuion outside of 3 standard deviations from the mean. For example, 99.7% of the data should lie, within 3 standard deviations of the mean and that 99.99% of the data should lie, within 4 standard deviations of the mean. The span of data values between 99.7% and 99.99% from the mean can act as an approximation for the standard deviation of the "disturbed" data in the data set. See FIG. 12.

Finally, if a measurement is often constrained (see the discussion on saturated variables) only those time periods where the variable is unconstrained should be used for calculating the standard deviation used as the scaling factor.

B. Selecting the Number of Principal Components

PCA transforms the actual process variables into a set of independent variables called Principal Components, PC, which are linear combinations of the original variables (Equation 13).

$$PC_i = A_{i,1} * X_1 + A_{i,2} * X_2 + A_{i,3} * X_{3+} \quad \text{Equation 13}$$

The process will have a number of degrees of freedom, which represent the specific independent effects that influence the process. These different independent effects show up in the process data as process variation. Process variation can be due to intentional changes, such as feed rate changes, or unintentional disturbances, such as ambient temperature variation.

Each principal component models a part of the process variability caused by these different independent influences on the process. The principal components are extracted in the direction of decreasing variation in the data set, with each subsequent principal component modeling less and less of the process variability. Significant principal components represent a significant source of process variation, for example the first principal component usually represents the effect of feed rate changes since this is usually the source of the largest process changes. At some point, the developer must decide when the process variation modeled by the principal components no longer represents an independent source of process variation.

The engineering approach to selecting the correct number of principal components is to stop when the groups of variables, which are the primary contributors to the principal component no longer make engineering sense. The primary cause of the process variation modeled by a PC is identified by looking at the coefficients, $A_{i,n}$, of the original variables (which are called loadings). Those coefficients, which are relatively large in magnitude, are the major contributors to a particular PC. Someone with a good understanding of the process should be able to look at the group of variables, which are the major contributors to a PC and assign a name (e.g. feed rate effect) to that PC. As more and more PCs are extracted from the data, the coefficients become more equal in size. At this point the variation being modeled by a particular PC is primarily noise.

Figure 13:
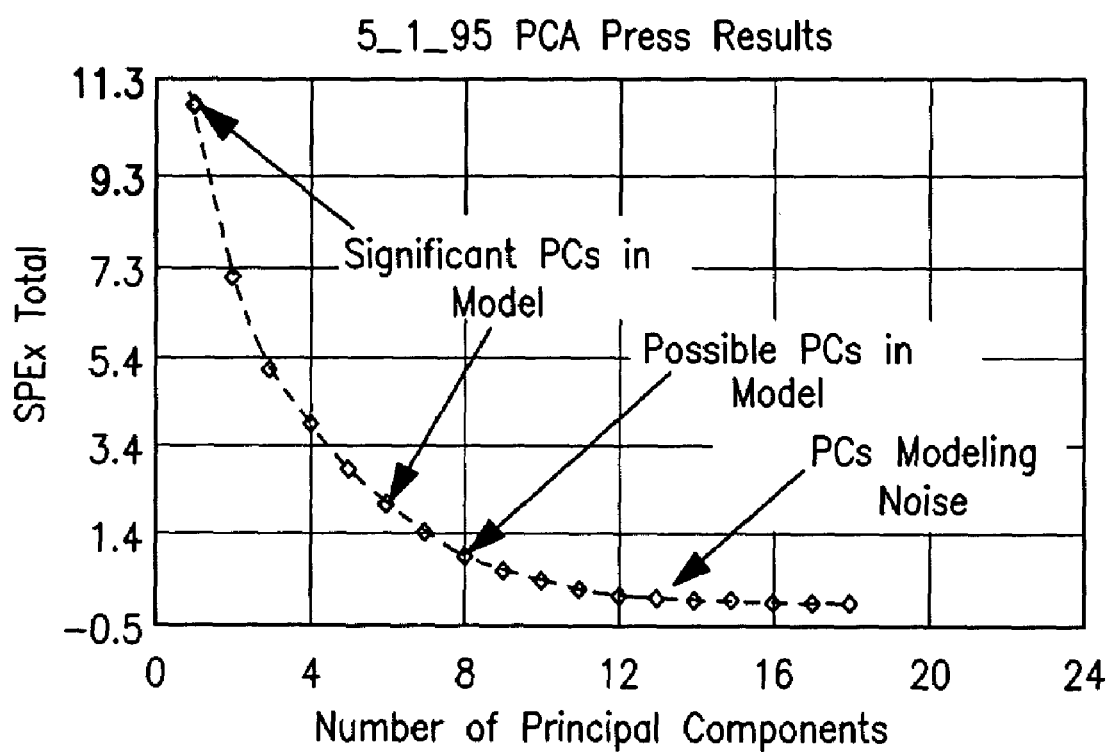
FIG. 13 shows illustration of the press statistic.

The traditional statistical method for determining when the PC is just modeling noise is to identify when the process variation being modeled with each new PC becomes constant. This is measured by the PRESS statistic, which plots the amount of variation modeled by each successive PC (FIG. 13). Unfortunately this test is often ambiguous for PCA models developed on refining and chemical processes.

VI. Model Testing & Tuning

The process data will not have a gaussian or normal distribution. Consequently, the standard statistical method of setting the trigger for detecting an abnormal event at 3 standard deviations of the error residual should not be used. Instead the trigger point needs to be set empirically based on experience with using the model.

Initially the trigger level should be set so that abnormal events would be signaled at a rate acceptable to the site engineer, typically 5 or 6 times each day. This can be determined by looking at the $SPE_x$ statistic for the training data set (this is also referred to as the Q statistic or the $DMOD_x$ statistic). This level is set so that real abnormal events will not get missed but false alarms will not overwhelm the site engineer.

A. Enhancing the Model

Once the initial model has been created, it needs to be enhanced by creating a new training data set. This is done by using the model to monitor the process. Once the model indicates a potential abnormal situation, the engineer should investigate and classify the process situation. The engineer will find three different situations, either some special process operation is occurring, an actual abnormal situation is occurring, or the process is normal and it is a false indication.

The new training data set is made up of data from special operations and normal operations. The same analyses as were done to create the initial model need to be performed on the data, and the model re-calculated. With this new model the trigger lever will still be set empirically, but now with better annotated data, this trigger point can be tuned so as to only give an indication when a true abnormal event has occurred.

Simple Engineering Models for Abnormal Event Detection

The physics, chemistry, and mechanical design of the process equipment as well as the insertion of multiple similar measurements creates a substantial amount of redundancy in the data from continuous refining and chemical processes. This redundancy is called physical redundancy when identical measurements are present, and calculational redundancy when the physical, chemical, or mechanical relationships are used to perform independent but equivalent estimates of a process condition. This class of model is called an engineering redundancy model.

I. Two Dimensional Engineering Redundancy Models

This is the simplest form of the model and it has the generic form:

$$F(y_i)=G(x_i)+\text{filtered bias}_i+\text{operator bias}+\text{error}_i \quad \text{Equation 14}$$

$$\text{raw bias}_i=F(y_i)-\{G(x_i)+\text{filtered bias}_i+\text{operator bias}\}=\text{error}_i \quad \text{Equation 15}$$

$$\text{filtered bias}_i=\text{filtered bias}_{i-1}+N^*\text{raw bias}_{i-1} \quad \text{Equation 16}$$

N—convergence factor (e.g. 0.0001)

Normal operating range: xmin<x<xmax

Normal model deviation: −(max_error)<error<(max_error)

The "operator bias" term is updated whenever the operator determines that there has been some field event (e.g. opening a bypass flow) which requires the model to be shifted. On the operator's command, the operator bias term is updated so that Equation 14 is exactly satisfied (error$_i$=0)

The "filtered bias" term updates continuously to account for persistent unmeasured process changes that bias the engineering redundancy model. The convergence factor, "N", is set to eliminate any persistent change after a user specified time period, usually on the time scale of days.

The "normal operating range" and the "normal model deviation" are determined from the historical data for the engineering redundancy model. In most cases the max_error value is a single value, however this can also be a vector of values that is dependent on the x axis location.

Figure 14:
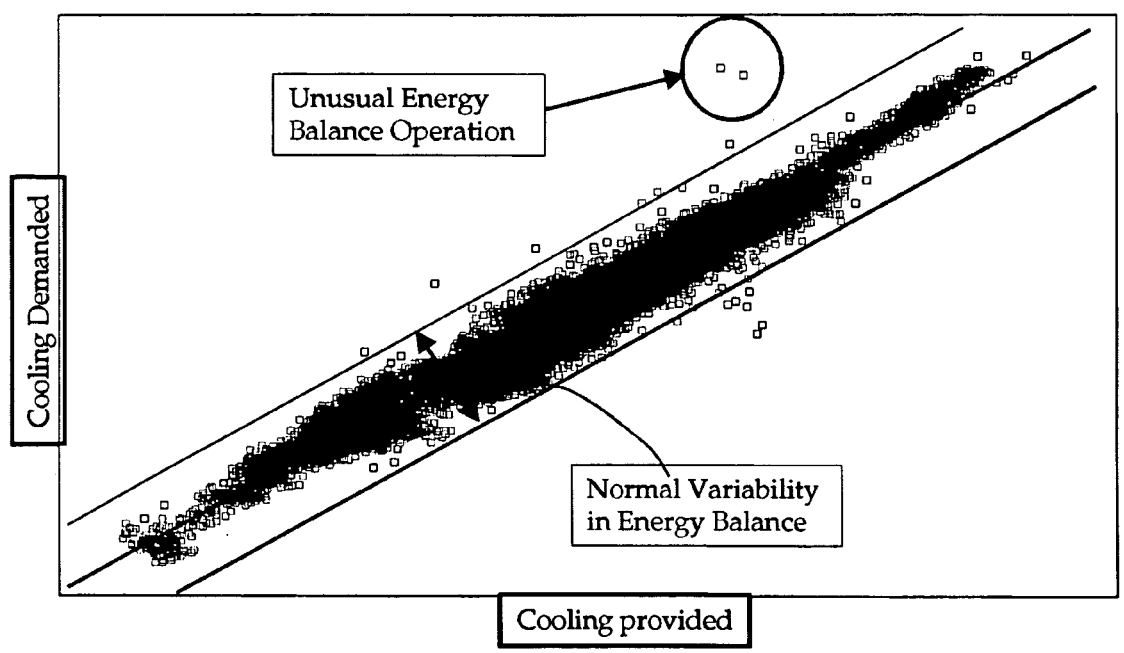
FIG. 14 shows the two-dimensional energy balance model.

Any two dimensional equation can be represented in this manner. Material balances, energy balances, estimated analyzer readings versus actual analyzer readings, compressor curves, etc. FIG. 14 shows a two dimensional energy balance.

As a case in point the flow versus valve position model is explained in greater detail.

A. The Flow Versus Valve Position Model

A particularly valuable engineering redundancy model is the flow versus valve position model. This model is graphically shown in FIG. 2. The particular form of this model is:

$$\frac{\text{Flow}}{(\text{Delta\_Pressure}/\text{Delta\_Pressure}_{reference})^a} + \text{filtered bias} + \text{operator bias} = Cv(VP) \quad \text{Equation 17}$$

where:

Flow: measured flow through a control valve

Delta_Pressure=closest measured upstream pressure−closest measured downstream pressure Delta_Pressure$_{reference}$: average Delta_Pressure during normal operation a: model parameter fitted to historical data Cv: valve characteristic curve determined empirically from historical data VP: signal to the control valve (not the actual control valve position)

The objectives of this model are to:

Detecting sticking/stuck control valves

Detecting frozen/failed flow measurements

Detecting control valve operation where the control system loses control of the flow This particular arrangement of the flow versus valve equation is chosen for human factors reasons: the x-y plot of the equation in this form is the one most easily understood by the operators. It is important for any of these models that they be arranged in the way which is most likely to be easily understood by the operators.

B. Developing the Flow Versus Valve Position Model

Figure 15:
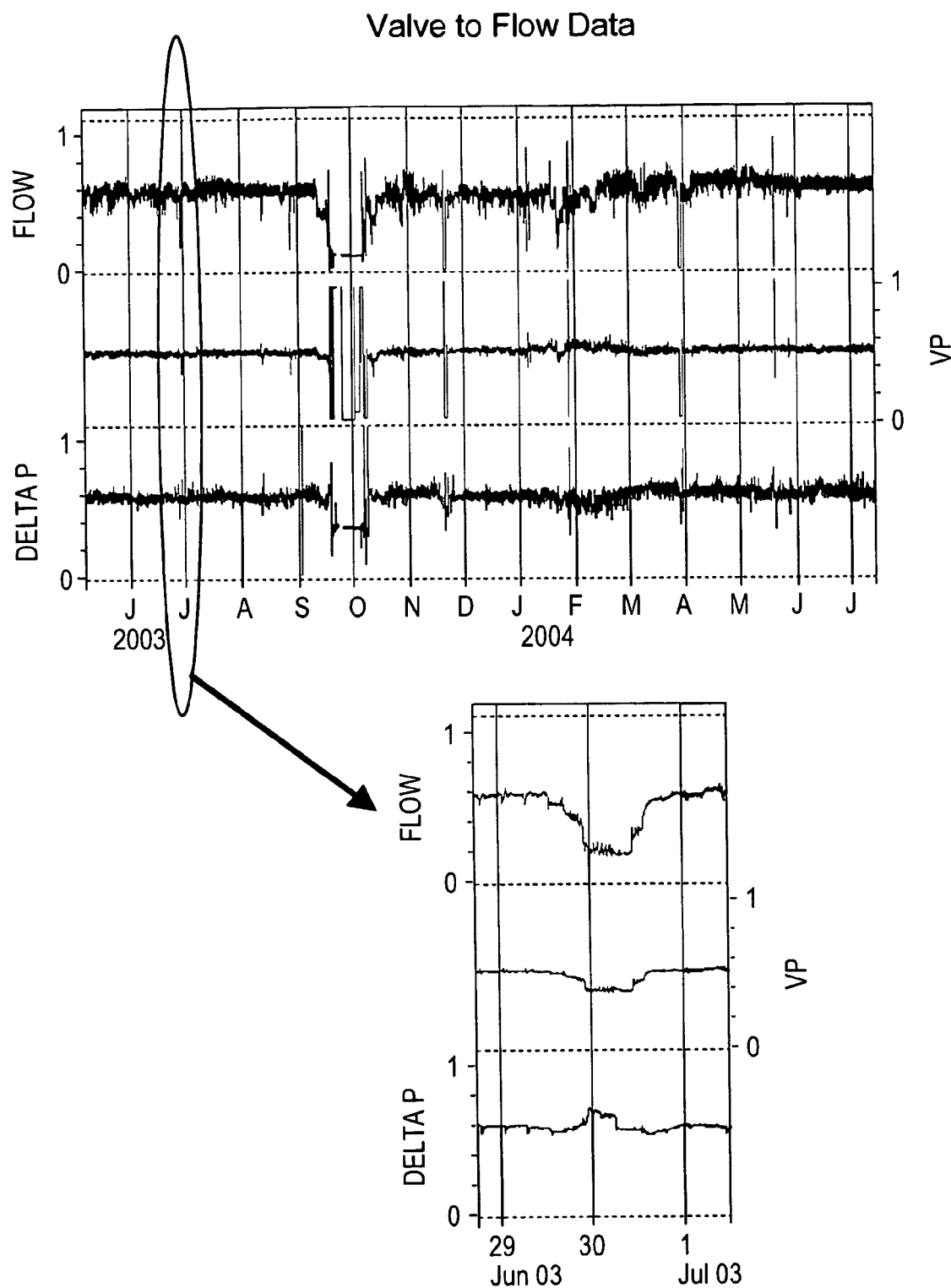
FIG. 15 shows a typical stretch of Flow, Valve Position, and Delta Pressure data with the long period of constant operation.

Because of the long periods of steady state operation experienced by continuous refining and chemical processes, a long historical record (1 to 2 years) may be required to get sufficient data to span the operation of the control valve. FIG. 15 shows a typical stretch of Flow, Valve Position, and Delta Pressure data with the long periods of constant operation. The first step is to isolate the brief time periods where there is some significant variation in the operation, as shown. This should be then mixed with periods of normal operation taken from various periods in history.

Often, either the Upstream_Pressure (often a pump discharge) or the Downstream_Pressure is not available. In those cases the missing measurement becomes a fixed model parameter in the model. If both pressures are missing then it is impossible to include the pressure effect in the model.

The valve characteristic curve can be either fit with a linear valve curve, with a quadratic valve curve or with a piecewise linear function. The piecewise linear function is the most flexible and will fit any form of valve characteristic curve.

The theoretical value for "a" is ½ if the measurements are taken directly across the valve. Rarely are the measurements positioned there. "a" becomes an empirically determined parameter to account for the actual positioning of the pressure measurements.

Often there will be very few periods of time with variations in the Delta_Pressure. The noise in the Delta_Pressure during the normal periods of operation can confuse the model-fitting program. To overcome this, the model is developed in two phases, first where a small dataset, which only contains periods of Delta_Pressure variation is used to fit the model. Then the pressure dependent parameters ("a" and perhaps the missing upstream or downstream pressure) are fixed at the values determined, and the model is re-developed with the larger dataset.

C. Fuzzy-net Processing of Flow Versus Valve Abnormality Indications

Figure 16:
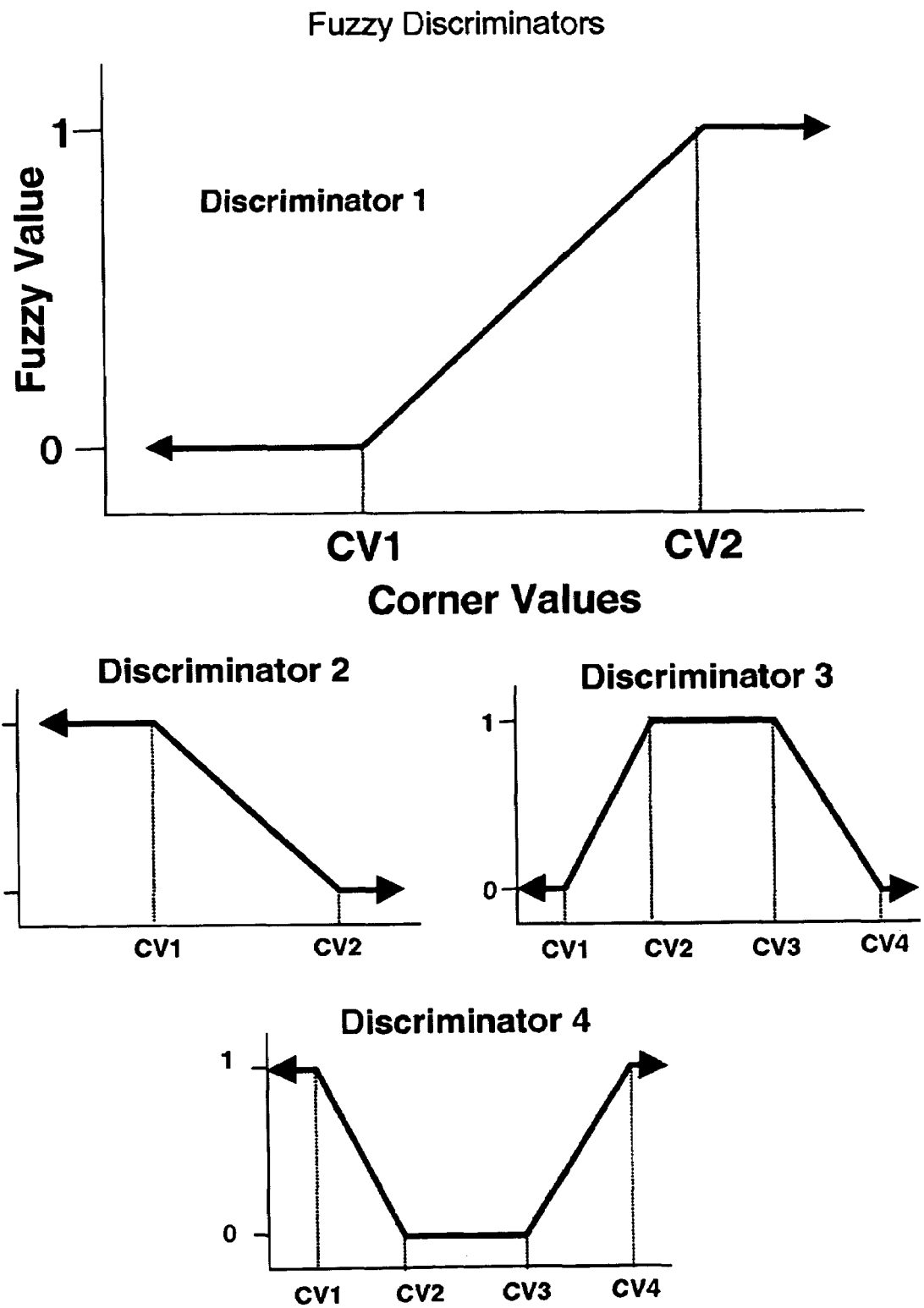
FIG. 16 shows a type 4 fuzzy discriminator.

As with any two-dimensional engineering redundancy model, there are two measures of abnormality, the "normal operating range" and the "normal model deviation". The "normal model deviation" is based on a normalized index: the error/max_error. This is fed into a type 4 fuzzy discriminator (FIG. 16). The developer can pick the transition from normal (value of zero) to abnormal (value of 1) in a standard way by using the normalized index.

The "normal operating range" index is the valve position distance from the normal region. It typically represents the operating region of the valve where a change in valve position will result in little or no change in the flow through the valve. Once again the developer can use the type 4 fuzzy discriminator to cover both the upper and lower ends of the normal operating range and the transition from normal to abnormal operation.

D. Grouping Multiple Flow/Valve Models

A common way of grouping Flow/Valve models which is favored by the operators is to put all of these models into a single fuzzy network so that the trend indicator will tell them that all of their critical flow controllers are working. In that case, the model indications into the fuzzy network (FIG. 4) will contain the "normal operating range" and the "normal model deviation" indication for each of the flow/valve models. The trend will contain the discriminator result from the worst model indication.

Figure 17:
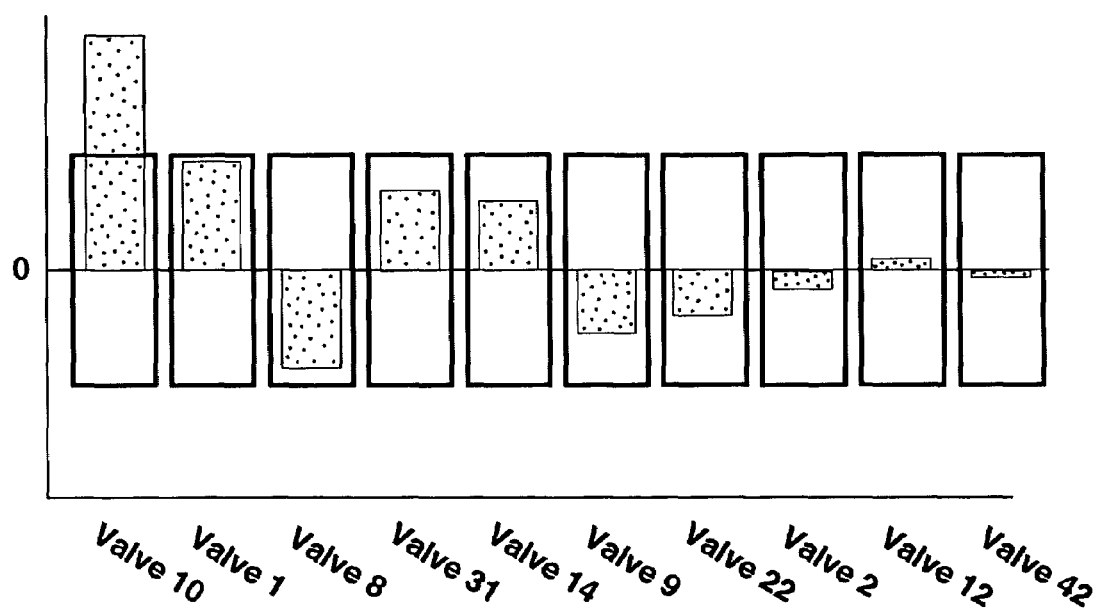
FIG. 17 shows a flow versus valve Pareto chart.

When a common equipment type is grouped together, another operator favored way to look at this group is through a Pareto chart of the flow/valves (FIG. 17). In this chart, the top 10 abnormal valves are dynamically arranged from the most abnormal on the left to the least abnormal on the right. Each Pareto bar also has a reference box indicating the degree of variation of the model abnormality indication that is within normal. The chart in FIG. 17 shows that "Valve 10" is substantially outside the normal box but that the others are all behaving normally. The operator would next investigate a plot for "Valve 10" similar to FIG. 2 to diagnose the problem with the flow control loop.

II. Multidimensional Engineering Redundancy Models

Once the dimensionality gets larger than 2, a single "PCA like" model is developed to handle a high dimension engineering redundancy check. Examples of multidimensional redundancy are:

pressure 1=pressure 2= . . . =pressure n material flow into process unit 1=material flow out of process unit 1= . . . =material flow into process unit 2

Because of measurement calibration errors, these equations will each require coefficients to compensate. Consequently, the model set that must be first developed is:

$$F_1(y_i) = a_1 G_1(x_i) + \text{filtered bias}_{1,i} + \text{operator bias}_1 + \text{error}_{1,i}$$

$$F_2(y_i) = a_n G_2(x_i) + \text{filtered bias}_{2,i} + \text{operator bias}_2 + \text{error}_{2,i}$$

$$F_n(y_i) = a_n G_n(x_i) + \text{filtered bias}_{n,i} + \text{operator bias}_n + \text{error}_{n,i} \quad \text{Equation 18}$$

These models are developed in the identical manner that the two dimensional engineering redundancy models were developed.

This set of multidimensional checks are now converted into "PCA like" models. This conversion relies on the interpretation of a principle component in a PCA model as a model of an independent effect on the process where the principle component coefficients (loadings) represent the proportional change in the measurements due to this independent effect. In FIG. 3, there are three independent and redundant measures, X1, X2, and X3. Whenever X3 changes by one, X1 changes by $a_1$ and X2 changes by $a_2$. This set of relationships is expressed as a single principle component model, P, with coefficients in unscaled engineering units as:

$$P = a_1 X1 + a_2 X2 + a_3 X3 \quad \text{Equation 19}$$

Where $a_3 = 1$

This engineering unit version of the model can be converted to a standard PCA model format as follows:

Drawing analogies to standard statistical concepts, the conversion factors for each dimension, X, can be based on the normal operating range. For example, using 3σ around the mean to define the normal operating range, the scaled variables are defined as:

$$X_{scale} = X_{normal\ operating\ range}/6\sigma \quad \text{Equation 20}$$

(99.7% of normal operating data should fall within 3σ of the mean)

$$X_{mid} = X_{mid\ point\ of\ operating\ range} \quad \text{Equation 21}$$

(explicitly defining the "mean" as the mid point of the normal operating range)

$$X' = (X - X_{mid})/X_{scale} \quad \text{Equation 22}$$

(standard PCA scaling once mean and σ are determined)

Then the P' loadings for $X_i$ are:

$$b_i = (a_i/X_{i\text{-}scale}) \bigg/ \left(\sum_{k=1}^{N} (a_k/X_{k\text{-}scale})^2\right)^{1/2} \quad \text{Equation 23}$$

(the requirement that the loading vector be normalized)

This transforms P to $$P' = b_1 X1 + b_2 * X2 + \ldots + b_n * XN \quad \text{Equation 24}$$

$$P\text{"standard deviation"} = b_1 + b_2 + \ldots + b_n \quad \text{Equation 25}$$

With this conversion, the multidimensional engineering redundancy model can now be handled using the standard PCA structure for calculation, exception handling, operator display and interaction.

Deploying PCA Models and Simple Engineering Models For Abnormal Event Detection

I. Operator and Known Event Suppression

Suppression logic is required for the following:

Provide a way to eliminate false indications from measurable unusual events

Provide a way to clear abnormal indications that the operator has investigated

Provide a way to temporarily disable models or measurements for maintenance

Provide a way to disable bad acting models until they can be retuned

Provide a way to permanently disable bad acting instruments.

Figure 18:
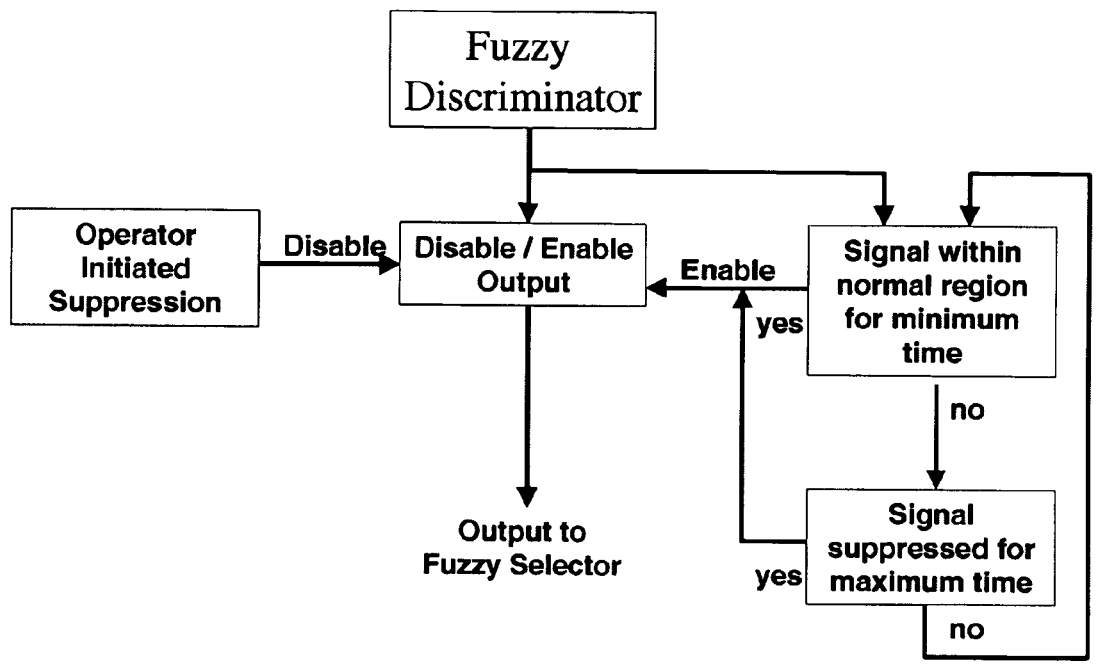
FIG. 18 shows a schematic diagram of operator suppression logic.
Figure 19:
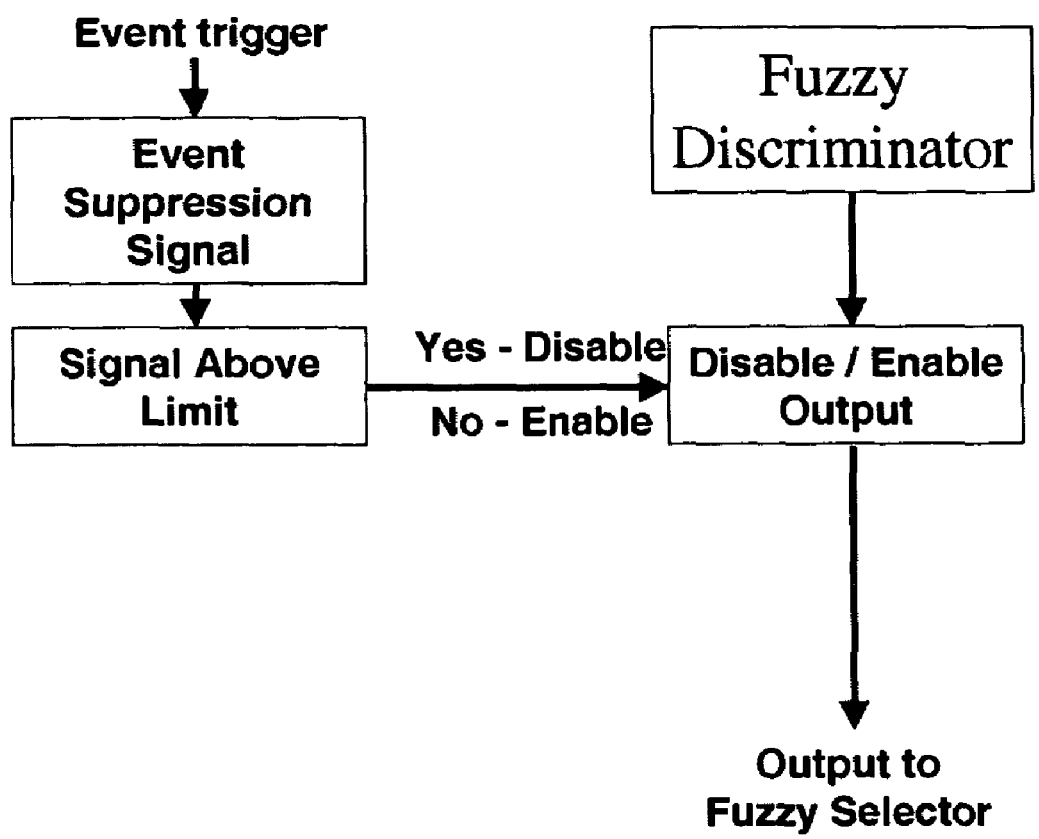
FIG. 19 shows a schematic diagram of event suppression logic.

There are two types of suppression. Suppression which is automatically triggered by an external, measurable event and suppression which is initiated by the operator. The logic behind these two types of suppression is shown in FIGS. 18 and 19. Although these diagrams show the suppression occurring on a fuzzified model index, suppression can occur on a particular measurement, on a particular model index, on an entire model, or on a combination of models within the process area.

For operator initiated suppression, there are two timers, which determine when the suppression is over. One timer verifies that the suppressed information has returned to and remains in the normal state. Typical values for this timer are from 15-30 minutes. The second timer will reactivate the abnormal event check, regardless of whether it has returned to the normal state. Typical values for this timer are either equivalent to the length of the operator's work shift (8 to 12 hours) or a very large time for semi-permanent suppression.

Figure 20:
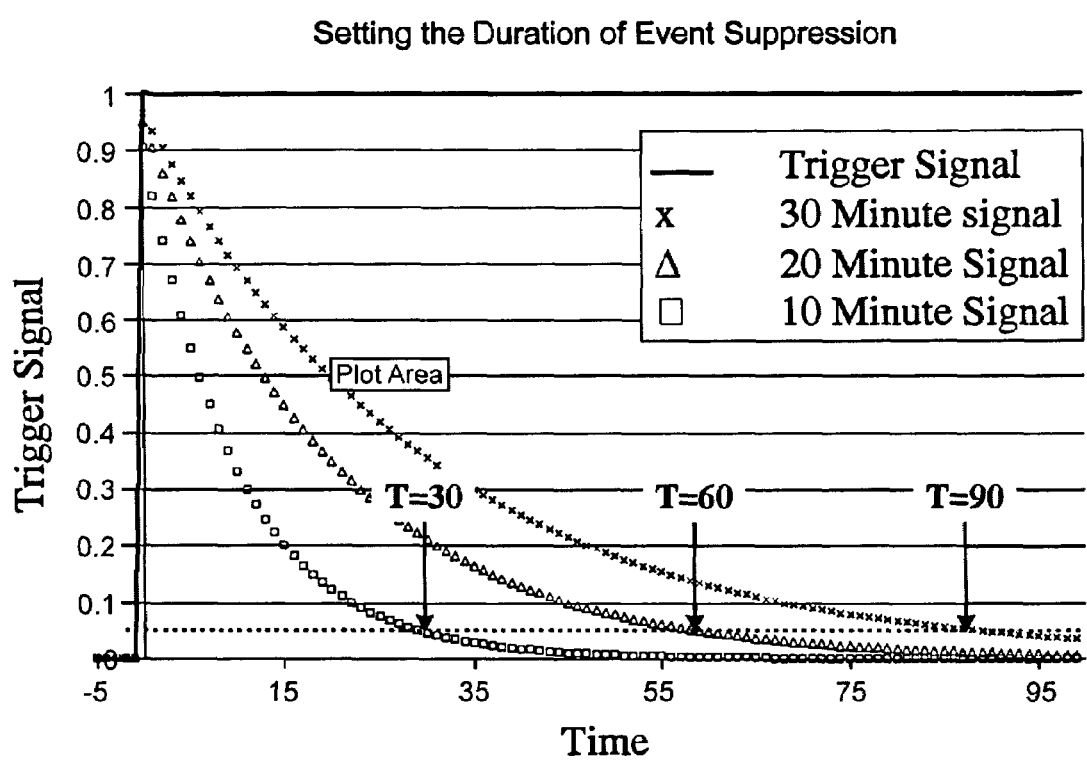
FIG. 20 shows the setting of the duration of event suppression.

For event based suppression, a measurable trigger is required. This can be an operator setpoint change, a sudden measurement change, or a digital signal. This signal is converted into a timing signal, shown in FIG. 20. This timing signal is created from the trigger signal using the following equations:

$Y_n = P*Y_{n-1} + (1-P)*X_n$ Exponential filter equation  Equation 26

$P = \mathrm{Exp}(-T_s/T_f)$ Filter constant calculation  Equation 27

$Z_n = X_n - Y_n$ Timing signal calculation  Equation 28 where:
$Y_n$ the current filtered value of the trigger signal
$Y_{n-1}$ the previous filtered value of the trigger signal
$X_n$ the current value of the trigger signal
$Z_n$ the timing signal shown in FIG. 20
P the exponential filter constant
$T_s$ the sample time of the measurement
$T_f$ the filter time constant As long as the timing signal is above a threshold (shown as 0.05 in FIG. 20), the event remains suppressed. The developer sets the length of the suppression by changing the filter time constant, $T_f$. Although a simple timer could also be used for this function, this timing signal will account for trigger signals of different sizes, creating longer suppressions for large changes and shorter suppressions for smaller changes.

Figure 21:
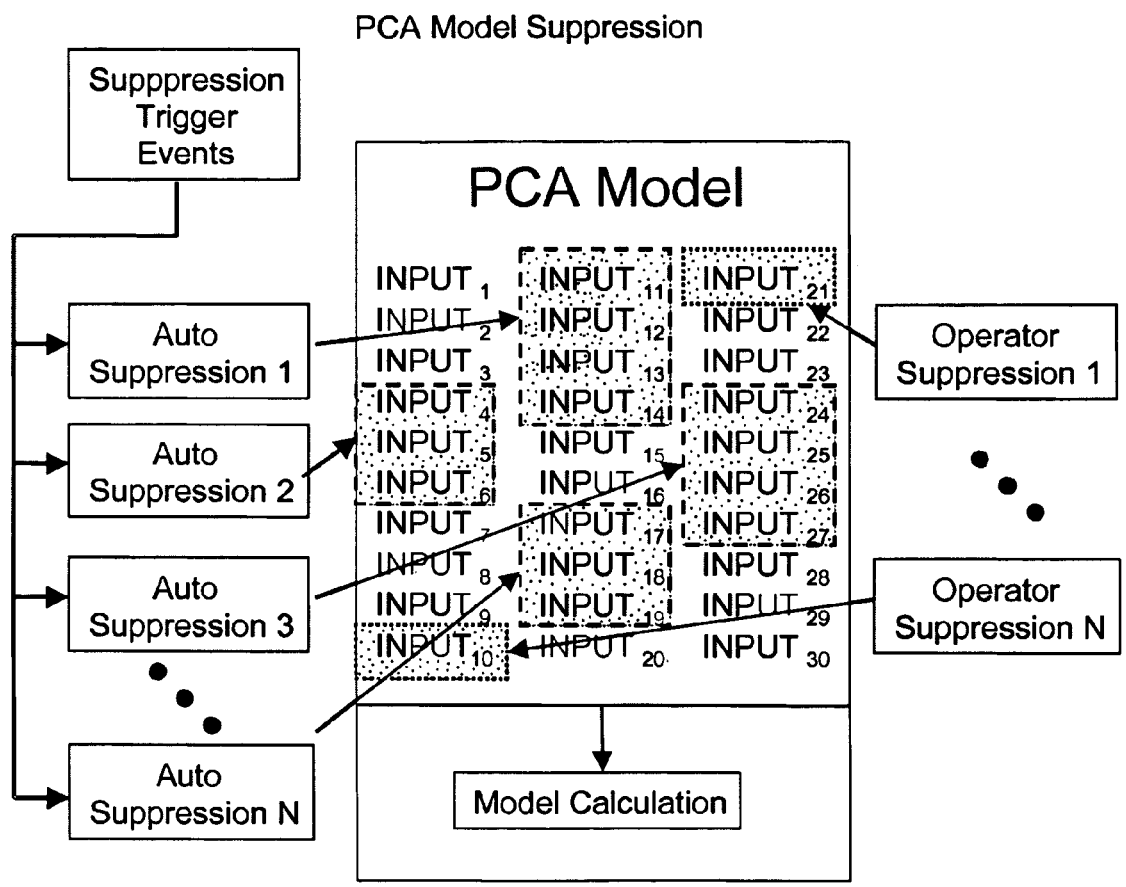
FIG. 21 shows the event suppression and the operator suppression disabling predefined sets of inputs in the PCA model.

FIG. 21 shows the event suppression and the operator suppression disabling predefined sets of inputs in the PCA model. The set of inputs to be automatically suppressed is determined from the on-line model performance. Whenever the PCA model gives an indication that the operator does not want to see, this indication can be traced to a small number of individual contributions to the Sum of Error Square index. To suppress these individual contributions, the calculation of this index is modified as follows:

$$E^2 = \sum_{i=1}^{n} w_i e_i^2 \qquad \text{Equation 29}$$

$w_i$—the contribution weight for input i (normally equal to 1)
$e_i$—the contribution to the sum of error squared from input i When a trigger event occurs, the contribution weights are set to zero for each of the inputs that are to be suppressed. When these inputs are to be reactivated, the contribution weight is gradually returned to a value of 1.

II. PCA Model Decomposition

Although the PCA model is built using a broad process equipment scope, the model indices can be segregated into groupings that better match the operators' view of the process and can improve the sensitivity of the index to an abnormal event.

Referring again to Equation 29, we can create several Sum of Error Square groupings:

$$E_1^2 = \sum_{i=1}^{l} w_i e_i^2 \qquad \text{Equation 30}$$

$$E_2^2 = \sum_{i=l}^{k} w_i e_i^2$$

$$\vdots$$

$$E_m^2 = \sum_{i=k}^{n} w_i e_i^2$$

Usually these groupings are based around smaller sub-units of equipment (e.g. reboiler section of a tower), or are sub-groupings, which are relevant to the function of the equipment (e.g. product quality).

Since each contributor, $e_i$, is always adding to the sum of error square based on process noise, the size of the index due to noise increases linearly with the number of inputs contributing to the index. With fewer contributors to the sum of error square calculation, the signal to noise ratio for the index is improved, making the index more responsive to abnormal events.

In a similar manner, each principle component can be subdivided to match the equipment groupings and an index analogous to the Hotelling $T^2$ index can be created for each subgroup.

$$P_{1,a} = \sum_{i=1}^{l} b_{1,i} x_i \qquad \text{Equation 31}$$

$$P_{1,b} = \sum_{i=l}^{k} b_{1,i} x_i$$

$$P_{1,c} = \sum_{i=k}^{n} b_{1,i} x_i$$

$$P_{2,a} = \sum_{i=1}^{l} b_{2,i} x_i$$

$$P_{2,b} = \sum_{i=l}^{k} b_{2,i} x_i$$

$$P_{2,c} = \sum_{i=k}^{n} b_{2,i} x_i$$

$$T_a^2 = \sum_{i=1}^{m} P_{i,a}^2$$

$$T_b^2 = \sum_{i=1}^{m} P_{i,b}^2$$

$$T_c^2 = \sum_{i=1}^{m} P_{i,c}^2$$

The thresholds for these indices are calculated by running the testing data through the models and setting the sensitivity of the thresholds based on their performance on the test data.

These new indices are interpreted for the operator in the identical manner that a normal PCA model is handled. Pareto charts based on the original inputs are shown for the largest contributors to the sum of error square index, and the largest contributors to the largest P in the $T^2$ calculation.

III. Overlapping PCA Models

Inputs will appear in several PCA models so that all interactions affecting the model are encompassed within the model. This can cause multiple indications to the operator when these inputs are the major contributors to the sum of error squared index.

To avoid this issue, any input, which appears in multiple PCA models, is assigned one of those PCA models as its primary model. The contribution weight in Equation 29 for the primary PCA model will remain at one while for the non-primary PCA models, it is set to zero.

IV. Operator Interaction & Interface Design

Figure 22:
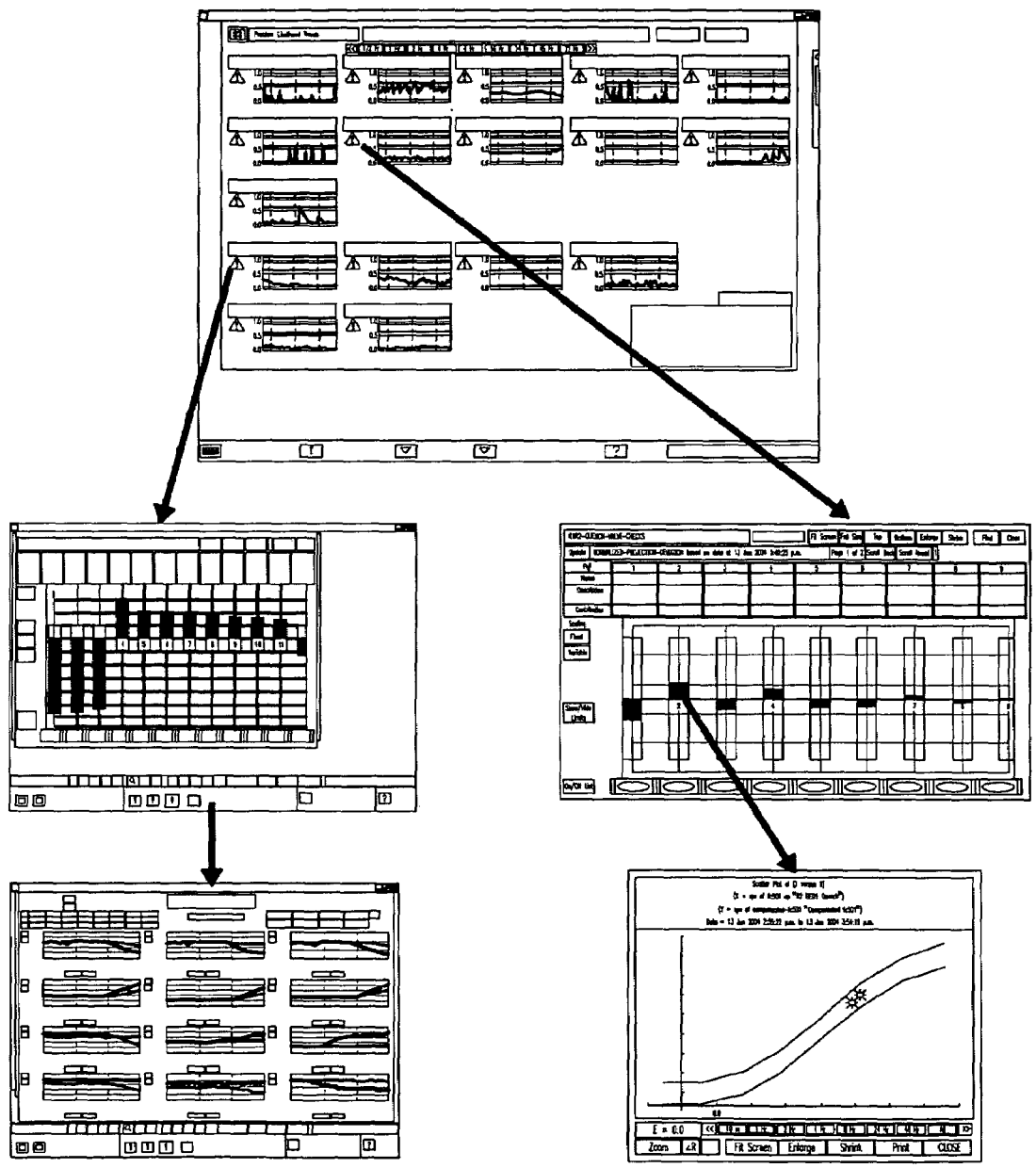
FIG. 22 shows how design objectives are expressed in the primary interfaces used by the operator.

The primary objectives of the operator interface are to:
Provide a continuous indication of the normality of the major process areas under the authority of the operator
Provide rapid (1 or 2 mouse clicks) navigation to the underlying model information
Provide the operator with control over which models are enabled. FIG. 22 shows how these design objectives are expressed in the primary interfaces used by the operator.

The final output from a fuzzy Petri net is a normality trend as is shown in FIG. 4. This trend represents the model index that indicates the greatest likelihood of abnormality as defined in the fuzzy discriminate function. The number of trends shown in the summary is flexible and decided in discussions with the operators. On this trend are two reference lines for the operator to help signal when they should take action, a yellow line typically set at a value of 0.6 and a red line typically set at a value of 0.9. These lines provide guidance to the operator as to when he is expected to take action. When the trend crosses the yellow line, the green triangle in FIG. 4 will turn yellow and when the trend crosses the red line, the green triangle will turn red. The triangle also has the function that it will take the operator to the display associated with the model giving the most abnormal indication.

If the model is a PCA model or it is part of an equipment group (e.g. all control valves), selecting the green triangle will create a Pareto chart. For a PCA model, of the dozen largest contributors to the model index, this will indicate the most abnormal (on the left) to the least abnormal (on the right) Usually the key abnormal event indicators will be among the first 2 or 3 measurements. The Pareto chart includes a red box around each bar to provide the operator with a reference as to how unusual the measurement can be before it is regarded as an indication of abnormality.

For PCA models, operators are provided with a trend Pareto, which matches the order in the bar chart Pareto. With the trend Pareto, each plot has two trends, the actual measurement (in cyan) and an estimate from the PCA model of what that measurements should have been if everything was normal (in tan).

For valve/flow models, the detail under the Pareto will be the two dimensional flow versus valve position model plot. From this plot the operator can apply the operator bias to the model.

If there is no equipment grouping, selecting the green triangle will take the operator right to the worst two-dimensional model under the summary trend.

Operator suppression is done at the Pareto chart level by selecting the on/off button beneath each bar.

| BIBLIOGRAPHY | | | |
|---|---|---|---|
| I. U.S. Patent Documents | | | |
| 1 | 5,859,964 | Jan. 12, 1999 | Wang, et al, "System and method for performing real time data acquisition, process modeling and fault detection of wafer fabrication processes" |
| 2 | 5,949,678 | Sep. 7, 1999 | Wold, et al, "Method for Monitoring Multivariable Processes" |
| 3 | 6,522,978 | Feb. 18, 2002 | Chen, et al, "Paper web breakage prediction using principal components analysis and classification and regression trees" |
| 4 | 6,368,975 | Apr. 9, 2002 | Balasubramhanya, et al, "Method and apparatus for monitoring a process by employing principal component analysis" |
| 5 | 6,466,877 | Oct. 15, 2002 | Chen, et al, "Paper web breakage prediction using principal components analysis and classification and regression trees" |
| 6 | 6,521,080 | Feb. 18, 2003 | Balasubramhanya, et al, "Method and apparatus for monitoring a process by employing principal component analysis" |
| 7 | 6,564,119 | May 13, 2003 | Vaculik, et al, "Multivariate Statistical Model Based System for Monitoring the Operation of a Continuous Caster and Detecting the Onset of Impending Breakouts" |
| 8 | 6,636,842 | Oct. 21, 2003 | Zambrano, et al, "System and method for controlling an industrial process utilizing process trajectories" |
| II. Literature | | | |
| 1. Cardoso, J. et al | | | "Fuzzy Petri Nets: An Overview", 13$^{th}$ Word Congress of IFAC, Vol. I: Identification II, Discrete Event Systems, San Francisco, CA, USA, June 30-July 5, 1996, pp. 443-448. |
| 2. Jackson, E. | | | "A User's Guide to Principal Component Analysis", John Wiley & Sons, 1991 |
| 3. Kourti, T. | | | "Process Analysis and Abnormal Situation Detection: From Theory to Practice", IEEE Control Systems Magazine, October 2002, pp. 10-25 |
| 4. Ku, W. | | | "Disturbance Detection and Isolation for Statistical Process Control in Chemical Processes", PhD Thesis, Lehigh University, Aug. 17, 1994 |
| 5. Martens, H., & Naes, T., | | | "Multivariate Calibration", John Wiley & Sons, 1989 |
| 6. Piovoso, M. J., et al. | | | "Process Data Chemometrics", IEEE Trans on Instrumentation and Measurement, Vol. 41, No. 2, April 1992, pp. 262-268 |

Appendix 2

TABLE 1

Charge Gas Compressor and Caustic Wash Principal Components With Sensor Title and Principal Component Loading

| Sensor Description | Loading |
|---|---|
| 1. Compressor Temperature Balance | |
| WR FROM SURF COND | −0.173 |
| CHG CMP2SUC COOLER | −0.172 |
| WR FR SURFACE COND | −0.172 |
| CGC CTW OUTLET | −0.171 |
| CGC 1ST STAGE EXCHANGER 2 H2O OUT TEMP | −0.170 |

TABLE 1-continued

Charge Gas Compressor and Caustic Wash Principal Components With Sensor Title and Principal Component Loading

| Sensor Description | Loading |
|---|---|
| CGC 1ST STAGE EXCHANGER 1 H2O OUT TEMP | −0.167 |
| CGC 1ST STAGE HC OUT TEMP | −0.165 |
| CGC EXCHANGER INLET TEMP | −0.162 |
| CHG CMP DIS COOLER | −0.160 |
| CAUSTIC TOWER FEED | −0.159 |
| 2. Compressor Pressure Balance | |
| CHG COMP 1ST DISC | 0.224 |
| C3R DRIER TUBE INLET PRESS | 0.200 |
| CHG COMP 2ND STG DISC | 0.197 |
| CGC 2ND STG DEL P | 0.195 |
| CHG CMP 2 STG DISC | 0.187 |
| NACC TRISEN SPEED SETPNT | 0.180 |
| MCGC TURBINE SPEED | 0.175 |
| CHG COMP 1ST STG SUCT Output | 0.175 |
| TOTAL FRESH FEED | 0.175 |
| CHARGE COMP RELIEF | 0.157 |
| 3. Discharge Temperature Balance | |
| C3R DRIER BACK PRESS | 0.344 |
| CGC COOLED OUTLET OVHD TO DRIERS | 0.341 |
| C3R DRIER CHARGE GAS OUTLET | 0.338 |
| MCGC COOLED OUTLET OH TO DRYERS | 0.320 |
| C3R DRIER BACK PRESS Output | −0.319 |
| C3 = VAP FM C3R DRIER | 0.315 |
| CHG COMP AFT CHLR C3R DRIER Output | −0.204 |
| CHG CMP 1 STG SUC | 0.187 |
| CHG COMP 1ST STG SUCT | 0.182 |
| CAUSTIC TWR DISCH | 0.155 |
| 4. Fresh Feed | |
| CHG CMP 1 STG SUC | 0.322 |
| CHG COMP 1ST STG SUCT | 0.314 |
| CAUSTIC TWR DISCH | 0.259 |
| CHARGE COMP RELIEF | 0.244 |
| TOTAL FRESH FEED | 0.222 |
| CHG CMP 2 STG SUC | 0.211 |
| COLD BOX FEED | −0.203 |
| C3R DRIER BACK PRESS | −0.195 |
| C3R DRIER CHARGE GAS OUTLET | −0.180 |
| CGC COOLED OUTLET OVHD TO DRIERS | −0.174 |
| 5. Steam Balance | |
| HP STM TO CHG CMP | −0.341 |
| CGC EXT STM OVRRIDE SEL Output | 0.339 |
| CGC STEAM TURBINE 1ST STG NOZ | −0.337 |
| CGC STEAM TURBINE INLET STM VAL POS | −0.325 |
| STM COND FM ZCD01 | 0.265 |
| CGC STEAM TURBINE EXTRACT STM PRESS | −0.255 |
| CGC STEAM TURBINE EXTRT STM VAL POS | 0.241 |
| CGC STEAM TURBINE EXTRACT STM TEMP | −0.195 |
| SURF COND INLET | 0.170 |
| CHG COMP SURF COND VAC | −0.164 |
| 6. Feed Quality | |
| OLEFINS RECOVERY TRAIN FEED-H2 | 0.340 |
| OLEFINS CRACKING TRAIN TOTAL PROD | 0.335 |
| MW CORRECTED STOH | −0.328 |
| OLEFINS RECOVERY TRAIN FEED-C1 | −0.317 |
| CGC 2ND SUC MW | −0.240 |
| OLEFINS RECOVERY TRAIN FEED-C3 = | −0.237 |
| CH4 FEED RATE TO OLEFINS RECOVERY TRAIN | −0.219 |
| CH4 FEED RATE TO OLEFINS RECOVERY TRAIN | −0.216 |
| OLEFINS RECOVERY TRAIN FEED-C2 = | 0.172 |
| DRYERS FD MOLECULAR WT | −0.163 |
| 7. Recycle Feed | |
| HP STM TO CHG CMP | −0.217 |
| COMP DISCH. TO PP | 0.204 |
| FRESH FD CHGE CMPR | 0.191 |
| W CTW SUPPLY MAIN | 0.189 |
| CG 1ST STG SUC TEMP OVRD Output | 0.188 |
| RERUN OH CONDENSOR TO FEED | −0.188 |
| CHG COMP 2ND STG SUCT | −0.183 |
| RERUN OH CONDENSOR TO FEED Output | −0.172 |
| CAUSTIC TOWER FEED COOLER QW OUT | 0.171 |
| CHG COMP 1ST STG SUCT | −0.166 |
| 8. Caustic Balance | |
| TARGET NAOH BY ANALYZER | 0.526 |
| % SPENT - ANALYZERS | 0.512 |
| CO2 TO CAUSTIC TWR | 0.461 |
| H2S TO CAUSTIC TOWER | 0.212 |
| CHG COMP 2ND STG SUCT | 0.176 |
| CHG COMP 1ST STG SUCT | 0.170 |
| FEED EXCHANGER ACTUAL-PRED. DP | −0.103 |
| CAUSTIC FEED FRM BL Output | −0.096 |
| CO2 IN CGC DISCHARGE | 0.077 |
| CGC 2ND SUC MW | 0.076 |
| 9. Feed Rate on Caustic | |
| CH4 FEED RATE TO OLEFINS RECOVERY TRAIN | 0.314 |
| NEW SPENT CAUSTIC LINE | 0.278 |
| CHG COMP 1ST STG SUCT | 0.238 |
| CHG COMP 2ND STG SUCT | 0.233 |
| OLEFINS RECOVERY TRAIN FEED-C1 | 0.225 |
| CAUSTIC TOWER 1ST STG | 0.199 |
| OLEFINS RECOVERY TRAIN FEED-C2O | −0.192 |
| CAUSTIC FEED FRM BL | 0.185 |
| COLD BOX FEED | 0.179 |
| CONDENSATE TO TOP | 0.170 |
| 10. Caustic Efficiency | |
| CHG COMP 1ST STG SUCT | −0.362 |
| CHG COMP 2ND STG SUCT | −0.358 |
| CGC 2ND SUC MW | −0.233 |
| FEED EXCHANGER ACTUAL-PRED. DP | 0.209 |
| CO2 TO CAUSTIC TWR | 0.187 |
| CHG COMP DISC DRUM DRW Output | −0.183 |
| TARGET NAOH BY ANALYZER | 0.178 |
| CHG CMP 2 STG SUC | 0.172 |
| CH4 FEED RATE TO OLEFINS RECOVERY TRAIN | 0.159 |
| % SPENT - ANALYZERS | 0.155 |

TABLE 2

Ethylene and Propylene Refrigeration Principal Components With Sensor Title and Principal Component Loading

| Sensor Description | Loading |
|---|---|
| 1. Ethylene Compressor Discharge | |
| C2 = REFRIG DRUM | 0.138 |
| C2 = COMP DISCHARGE | 0.135 |
| C2R COMP OUTLET CONDENSOR A C2 = OUT | 0.124 |
| C2R COMP OUTLET CONDENSOR B C2 = OUT | 0.124 |
| C2 = COMPR 3RD SUCT | 0.123 |
| C2 = CMP 3RD SUCT DRUM | 0.121 |
| C2 = COMPR 2ND SUCT | 0.121 |
| C2R COMP OUTLET DRUM OUTLET | 0.121 |
| CHG CMP2SUC COOLER | 0.120 |
| C2R COMP OUTLET CONDENSOR A SHELL OUT | 0.120 |
| 2. Propylene Compressor Discharge | |
| PROP CMP 4 STG DIS | −0.142 |
| RERUN TOWER CONDENSED OVHD | −0.135 |
| H2O FM SURF COND 1 | −0.133 |
| CW OUT C3R OUTLET CONDENSOR A | −0.131 |
| CW OUT C3R OUTLET CONDENSOR D | −0.130 |
| H2O FM SURF COND 2 | −0.130 |
| C3R COMP 4TH STG DP | −0.129 |
| CW OUT C3R OUTLET CONDENSOR C | −0.129 |
| COND FM SURF COND 5 | −0.127 |
| PROP COMP TO R-FUEL | −0.126 |

TABLE 2-continued

Ethylene and Propylene Refrigeration Principal Components
With Sensor Title and Principal Component Loading

| Sensor Description | Loading |
|---|---|
| 3. Propylene Compressor Suction | |
| C2 SPLITTER OVHD COND B LO OVERRIDE SEL Output | −0.218 |
| C2 SPLITTER OVHD COND A LO OVERRIDE SEL Output | −0.218 |
| C2 SPLITTER OVHD COND B VALVE DP | 0.212 |
| OUTLET BTM DRAW OFF | −0.177 |
| C3R COMP MEDIAN SPEED | −0.173 |
| PROP COMP 1ST STG SUCT Output | −0.163 |
| ETY SPLT REFLUX DR | −0.159 |
| C2 = SPLITTER TOTAL HEAT IN | −0.157 |
| C3 = TO SPLTR REBOILER | −0.149 |
| C2 = SPLITTER REBOILER BTU CONTROLLER | −0.144 |
| Ethylene Compressor Load | |
| C2 = COMPR DISCHARGE | 0.201 |
| C2R COMP MOTOR AMPS | 0.197 |
| DEMETHANIZER REBOIL PROP | −0.183 |
| DEMETH REBOILER A/B SHELL INLET | −0.182 |
| DEMETH FD CHILL EXCHANGER Output | −0.168 |
| CHG GAS FROM C2 = SPLITTER BOTTOMS | −0.161 |
| C2 = SPLITTER BOTTOMS C2 PRODUCT | −0.147 |
| DEMETH RBLR A IN | −0.132 |
| PROP PUMP OUT | 0.129 |
| DEMETH REBOILER A/B SHELL INLET Output | −0.128 |
| 5. Ethylene Compressor Suction | |
| C2R FROM COLD BOX | 0.224 |
| C2 = CMP 1 SUCT DRUM | 0.220 |
| C2 = COMPR 1ST STAGE SUCT | 0.215 |
| PROP COMP 3RD STG DUMP | 0.208 |
| C2 = SPLITTER REBOILER SHELL OUT | 0.206 |
| DEPROP OH CONDENSR | 0.202 |
| ETHY SPLIT REB FD | 0.201 |
| DEMETH OVHD COND C2R LIQUID | 0.193 |
| FEED GAS FRM COLD BOX | 0.187 |
| DEMETH OVHD COND C2R VAPOR | 0.185 |
| 6. Propylene Compressor Demand | |
| C2 = SPLITTER TOTAL HEAT IN | −0.188 |
| PROP COMP 4TH STG DISC Output | −0.183 |
| PROP COMP TO R-FUEL | −0.183 |
| DEPROP OH CONDENSR | 0.181 |
| DEMETH FEED DR 2 | 0.172 |
| CG 1ST STG SUC TEMP OVRD Output | 0.171 |
| DEMETH FEED DR 3 | 0.165 |
| C3 = TO SPLTR REBOILER Output | −0.163 |
| PROP CMP 4 STG SUC | −0.161 |
| C3 = TO COLDBOX FIRST CORE | −0.147 |
| 7. Ethylene-Propylene Compressors Interation | |
| C3R COMP - C3R COMP OUTLET COND TEMP MARGIN | −0.193 |
| C3R COMP 4TH STG DP | 0.189 |
| CW OUT C3R OUTLET CONDENSOR D | 0.189 |
| C2R COMP OUTLET DRUM ETHYLENE PURGE Output | 0.181 |
| COLD BOX C2 = VAPOR | 0.176 |
| DEMETH FD CHILL EXCHANGER Output | 0.173 |
| C2 = COMPR 3RD STG SUCT | 0.170 |
| C3 = PURGE TO FEED Output | −0.168 |
| DEMETH FEED C2R COLDBOX CHILLER 1 LEVEL Output | −0.166 |
| C2R COMP OUTLET EXCHANGER OUTLET TEMP | −0.162 |
| 8. Propylene Make-up | |
| DEPROP OVERHEAD | −0.208 |
| RERUN TOWER - RERUN OVHD COND VENT GAS | −0.207 |
| PROP CMP 1 STG SUC | −0.182 |
| ETHANE PRODUCT | −0.174 |
| C2 PROD TO B LIMIT | −0.171 |
| C3R COLDBOX VAPOR | 0.168 |
| PROP CMP 4 STG SUC | 0.165 |
| SPLTR REFLUX CND B | 0.160 |
| WR FR AFT COND | −0.158 |
| PROP COMP 3RD STG DUMP | −0.138 |
| 9. Propylene Heat Sources | |
| DEETH OVHD COND C3 = VAPOR Output | −0.316 |
| DEMETH FEED CHILLER #1 | −0.312 |
| DEETH OVHD COND C3 = VAPOR | −0.309 |
| PROP COMP SURF COND VAC | −0.309 |
| PROP COMP 3 SUCT DRUM | −0.253 |
| ETHANE PRODUCT Output | 0.193 |
| HP STEAM TO PROP CMP | 0.135 |
| PROP COMP 4TH STG SUCT | 0.121 |
| PROP CMP 4 STG DIS | 0.119 |
| DEMETH FEED COLD BOX LEVEL | 0.111 |
| 10. Demethanizer Balance | |
| DEMETH REBOILER A/B SHELL INLET Output | −0.202 |
| C3 = FROM DEETH OVHD COND | −0.183 |
| C2R COMP - DRUM LO SEL Output | −0.157 |
| C2R COMP 2ND STAGE FEED DRUM LIQUID | −0.155 |
| C2 SPLITTER OVHD COND B LO OVERRIDE SEL Output | −0.145 |
| VAP FRM C2 = SPLITTER BOTTOMS | −0.144 |
| DEMETH RBLR A IN | −0.142 |
| ETY SPLT REFLUX DR | −0.135 |
| DEMETH FEED DR 2 | −0.134 |
| DEMETH FEED DR 3 | −0.134 |
| 11. Propylene Vapor Balance | |
| DEMETH REBOILER A/B SHELL INLET Output | 0.191 |
| C3 = FROM DEETH OVHD COND | 0.190 |
| MAKEUP AND PURGE BTMS | 0.184 |
| WR FR AFT COND | −0.170 |
| VAP FRM C2 = SPLITTER BOTTOMS | 0.167 |
| RERUN TOWER - RERUN OVHD COND VENT GAS | −0.167 |
| C2R COMP 2ND STAGE FEED DRUM LIQUID | 0.161 |
| DEMETH RBLR A IN | 0.159 |
| C2R COMP - DRUM LO SEL Output | −0.155 |
| ETY SPLT REFLUX DR | −0.153 |
| 12. De-Ethanizer Load | |
| DEETH VAPOR PROD | 0.199 |
| CHG CMP2SUC COOLER | 0.190 |
| RERUN TOWER VENT COND RERUN OVHD COND Output | 0.174 |
| C3 = TO SPLTR REBOILER | 0.169 |
| C2R COMP - DRUM LO SEL Output | 0.155 |
| RERUN TOWER VENT COND RERUN OVHD COND Output | −0.152 |
| C3R COMP 3RD STG SUCT | 0.148 |
| C2 = COMPR 1ST STAGE SUCT | 0.137 |
| ETY SPLT REFLUX DR | 0.137 |
| PROP PUMP OUT | 0.136 |
| 13. Propylene Recycle | |
| COOL KICKBACK TO C3R COMP FEED DRUM | 0.198 |
| MAPD REACTOR C3 RECYCLE TO FEED | −0.178 |
| ETY SPLT REFLUX DR | 0.177 |
| PROP COMP 4TH STG DISC | 0.175 |
| C2 = COMP DISCHARGE | 0.167 |
| C3 = FROM DEETH OVHD COND | 0.163 |
| C2R COMP - DRUM LO SEL Output | 0.158 |
| C2 = DESUPERHEATER C2R OUTLET 2ND EXCHANGER Output | 0.157 |
| DEMETH REBOILER A/B SHELL INLET Output | 0.156 |
| DEMETH FEED DR 3 | 0.150 |
| 14. Ethylene Splitter Load | |
| RERUN TOWER - RERUN OVHD COND VENT GAS | −0.211 |
| C2 = COMP DISCHARGE | 0.184 |
| SPLTR REFLUX CND B | 0.181 |
| PROP PUMP OUT | −0.179 |
| MAPD REACTOR C3 RECYCLE TO FEED | −0.176 |
| WR FR AFT COND | −0.167 |
| ETHANE PRODUCT | −0.160 |
| DEMETH REBOILER A/B SHELL INLET Output | −0.159 |
| DEPROP OVERHEAD | −0.159 |
| C2 PROD TO B LIMIT | −0.159 |

TABLE 2-continued

Ethylene and Propylene Refrigeration Principal Components
With Sensor Title and Principal Component Loading

| Sensor Description | Loading |
|---|---|
| 15. Coldbox and De-Methanizer Feed | |
| DEMETH FEED COLD BOX LEVEL Output | 0.208 |
| DEMETHANIZER REFLUX DRUM | 0.194 |
| RERUN TOWER - RERUN OVHD COND VENT GAS | −0.191 |
| SPLITTER BTM TEMP | −0.190 |
| DEPROP OVERHEAD | −0.187 |
| PROP PUMP OUT | 0.186 |
| PROP COMP 4TH STG DISC | 0.178 |
| HP ETHYLENE PROD | 0.152 |
| SPLTR REFLUX CND B | 0.143 |
| PROP COMP 4TH STG DISC | 0.128 |

TABLE 3

Dryers, Coldbox, and Methane Booster Principal Components
With Sensor Title and Principal Component Loading

| Sensor Description | Loading |
|---|---|
| 1. Hydrogen Purity | |
| DIFF ACROSS COLDBOX CORE EXCHANGER 3 | −0.200 |
| H2 PRODUCT PURITY THCO | −0.178 |
| LO PRES CH4 DP | −0.177 |
| C3R COLDBOX VAPOR PRESSURE | −0.173 |
| HYDROGEN WT FRACTION | 0.171 |
| HYDROGEN PURITY | 0.170 |
| HYDROGEN MOLECULAR WT | −0.169 |
| FEED GAS FRM C2R COLDBOX CHILLER 1 | −0.168 |
| COLD BOX H2 MOL WT | −0.167 |
| FEED GAS FRM C3R COLDBOX | −0.164 |
| 2. Methane Medium Pressure Temperature | |
| MP METH TO OLEFINS CRACKING TRAIN-W | 0.240 |
| METH CMP 1 STG SUC | 0.233 |
| CH4 BOOSTER 1ST STAGE OUTLET GAS OUT | 0.230 |
| CH4 BOOSTER 2ND STAGE OUTLET GAS OUT | 0.230 |
| COLDBOX LP METHANE | 0.230 |
| H2 FROM COLDBOX | 0.230 |
| CB MPCH4 OUT TLCO | 0.223 |
| COLDBOX HP METHANE | 0.217 |
| METH CMP 2 STG SUC | 0.217 |
| CH4 BOOSTER 2ND STAGE OUTLET CTN RTM TEMP | 0.212 |
| 3. Dryer Outlet Temperature | |
| DRYER REGN FUR STK | −0.307 |
| DRYER REG HTR OUT | −0.305 |
| DRYER REGN OUTLET3 | −0.304 |
| DRYER REGN OUTLET4 | −0.304 |
| DRYER REGEN HEADER OUT | −0.303 |
| DRYER REGN OUTLET1 | −0.303 |
| DRYER REGN OUTLET2 | −0.303 |
| FG TO REGEN HTR | −0.271 |
| REGEN FURN CH4 TO COOLDOWN | −0.235 |
| REG GAS TO DRYERS | −0.232 |
| 4. Coldbox Pressure Balance | |
| DEMETH FEED DR 3 | 0.309 |
| DEMETH FD DRUM | 0.306 |
| MIN DEMTH #4FD DRM PRESS | 0.305 |
| H2 SEPARATOR DRUM | 0.300 |
| DEMETH FEED DR 2 | 0.289 |
| COLDBOX TO DEMETH DP | 0.272 |
| DEMETH FEED DR 1 | 0.269 |
| H2 FROM COLDBOX | 0.269 |
| DEMETHANIZER FEED #3 Output | −0.193 |
| DEMETH FEED DRM #4 LEVEL Output | −0.173 |
| 5. Methane Supply Balance | |
| METHANE COMPR 2ND DISCHG | −0.290 |
| MP METHANE TO OLEFINS CRACKING TRAIN-W | 0.261 |

TABLE 3-continued

Dryers, Coldbox, and Methane Booster Principal Components
With Sensor Title and Principal Component Loading

| Sensor Description | Loading |
|---|---|
| MED PRESS METHANE HEADER Output | −0.246 |
| METHANE COMP 2ND STG SUC Output | 0.233 |
| MED PRESS METHANE HEADER | 0.229 |
| METH TO FUEL GAS | −0.223 |
| OLEFINS RECOVERY TRAIN T.G. TO CMM | −0.216 |
| METHANE COMPR MIN FLOW | 0.210 |
| MP METHANE FROM COLDBOX | 0.201 |
| MP METH TO OLEFINS CRACKING TRAIN-W | 0.163 |
| 6. Coldbox Temperature | |
| DEMETH FD CHILL EXCHANGER Output | −0.264 |
| CHG GAS FROM C2 = SPLITTER BOTTOMS | −0.263 |
| C2 = SPLITTER BOTTOMS C2 PRODUCT | −0.255 |
| CHG GAS FROM C2 = SPLITTER HIP REBOILER | −0.226 |
| C2 = SPLITTER BOTTOMS C20 (FEED) | 0.218 |
| VAP FRM C2 = SPLITTER BOTTOMS | −0.189 |
| CHARGE GAS FROM COLDBOX FEED EXCHANGER | −0.188 |
| DEMETH FD CHILL EXCHANGER | 0.167 |
| SPLTR HIP RBLR VAP | −0.162 |
| DEMETH FEED DRUM #1 | −0.156 |
| 7. Methane Header | |
| NO1 FD TEMP CUTOUT | −0.202 |
| FURNACE FG KO DRUM Output | −0.201 |
| MED PRESS METHANE HEADER | 0.195 |
| MP METHANE FROM COLDBOX | 0.188 |
| DEMETHANIZER FEED1 | −0.180 |
| MP METHANE TO OLEFINS CRACKING TRAIN-W | 0.179 |
| MED PRESS METHANE HEADER Output | −0.164 |
| C3R 2ND STAGE EXCHANGER C3 = VAPOR | −0.161 |
| FEED GAS TO COLDBOX FEED DRUM | −0.160 |
| C2R COLDBOX CORE EXCHANGER INLET | −0.160 |
| 8. Coldbox Methane Quality | |
| DEMETHANIZER #4 FEED | −0.236 |
| TOTAL MP METHANE FLOW | −0.213 |
| FEED GAS FRM COLD BOX | −0.208 |
| COLDBOX RECYCLE | −0.206 |
| MED PRES CH4 DP | −0.196 |
| COLDBOX INLET PRES PHCO | −0.194 |
| COLD BOX C2 = R LIQUID | −0.161 |
| HI PRESS C1 FROM COLDBOX | −0.153 |
| METH TO FUEL GAS | −0.142 |
| MP METHANE FROM COLDBOX | −0.140 |
| 9. Methane Compressor Load | |
| METH CMP 1 DISCH | 0.285 |
| METH CMP 2 DISCH | 0.268 |
| METH COMP 1ST SUC | 0.254 |
| METHANE BOOSTER MOTOR AMPS | 0.253 |
| HIGH PRESS METHANE | 0.213 |
| METHANE COMP 1ST STG DIS | 0.171 |
| C2 = SPLITTER BOTTOMS SUPERHEAT CTRL OR Output | −0.171 |
| METHANE COMPR MIN FLOW | 0.166 |
| METH CMP 2 SUCTION | 0.154 |
| SPLTR HIP RBLR IN | −0.149 |
| 10. Methane Letdown Balance | |
| METH CMP 1 DISCH | 0.231 |
| C2 = SPLITTER BOTTOMS SUPERHEAT CTRL OR Output | 0.227 |
| METH CMP 2 DISCH | 0.212 |
| DEMETHANIZER FEED4 | −0.183 |
| METHANE BOOSTER MOTOR AMPS | 0.180 |
| SPLTR HIP RBLR IN | 0.180 |
| HIGH PRESS METHANE | 0.159 |
| METH COMP 1ST SUC | 0.156 |
| FEED GAS TO COLDBOX | −0.156 |
| VAP FRM C2 = SPLITTER BOTTOMS | −0.153 |
| 11. Low Pressure Methane Quality | |
| LOW PRESS CH4: ACETYLENE | 0.276 |
| LP METHANE C2 = | 0.235 |
| HIGH PRESS METHANE | 0.210 |
| DEMETHANIZER FEED #3 | 0.207 |

TABLE 3-continued

Dryers, Coldbox, and Methane Booster Principal Components
With Sensor Title and Principal Component Loading

| Sensor Description | Loading |
|---|---|
| METH CMP 2 DISCH | 0.204 |
| METH BOOST DUMP TO FLARE | −0.178 |
| METHANE COMP 1ST STG SUC | −0.176 |
| MED PRES CH4: ACET | 0.175 |
| HYDROGEN SEPARATOR DRUM | −0.172 |
| DEMETH FEED COLD BOX LEVEL | 0.168 |
| 12. Dryer Temperature Balance | |
| REGEN FURN BLOWDOWN CTW OUTLET TEMP | −0.338 |
| REGEN FURN BLOWDOWN GAS INLET | −0.325 |
| CHG DRYER REGN OUT | −0.309 |
| REGEN FURN BLOWDOWN GAS OUTLET TEMP | −0.307 |
| CH4 TO FG | −0.169 |
| COLDBOX INLET PRES PHCO | 0.159 |
| COLDBOX RECYCLE | 0.157 |
| COLDBOX HP METHANE | 0.144 |
| COLDBOX HP METHANE | 0.141 |
| H2 FROM COLDBOX | 0.132 |
| 13. Methane Recycle | |
| REGEN FURN BLOWDOWN GAS INLET | −0.238 |
| CHG DRYER REGN OUT | −0.225 |
| REGEN FURN BLOWDOWN CTW OUTLET TEMP | −0.214 |
| DEMETHANIZER FEED #3 | −0.203 |
| C3 = TO COLDBOX FIRST CORE | −0.175 |
| CO TEMPERATURE | 0.175 |
| C3 = FROM COLDBOX | −0.168 |
| REGEN FURN BLOWDOWN GAS OUTLET TEMP | −0.166 |
| MED PRES CH4 DP | −0.145 |
| OLEFINS CRACKING TRAIN-W FUEL GAS | −0.145 |
| 14. Methane Compressor Suction | |
| METHANE COMP 1ST STG SUC | −0.275 |
| METH BOOST DUMP TO FLARE | −0.267 |
| C3R 2ND STAGE EXCHANGER C3 = VAPOR | −0.237 |
| NO1 FD TEMP CUTOUT | −0.197 |
| FEED GAS TO COLDBOX FEED DRUM | −0.189 |
| C2R COLDBOX CORE EXCHANGER INLET | −0.177 |
| DEMETHANIZER FEED1 | −0.175 |
| HYDROGEN SEPARATOR DRUM | −0.172 |
| C3R COLDBOX VAPOR | 0.171 |
| C3R COLDBOX VAPOR PRESSURE | 0.163 |
| 15. Methane Booster Discharge | |
| C3 = FROM COLDBOX | 0.236 |
| C3 = TO COLDBOX FIRST CORE | 0.219 |
| METH BOOST DUMP TO FLARE | −0.218 |
| METHANE COMP 1ST STG SUC | −0.205 |
| METHANE COMP 1ST STG SUC Output | 0.180 |
| DEMETH FD CHL 1 C3 => COLDBOX FEED EXCHANGER | 0.173 |
| DEMETH FD CHL 1 C3 => COLDBOX FEED EXCHANGER Output | 0.172 |
| LO PRES CH4 DP | 0.160 |
| FURNACE FG KO DRUM Output | −0.156 |
| CO TEMPERATURE | −0.152 |

TABLE 4

De-Methanizer Principal Components
With Sensor Title and Principal Component Loading

| Sensor Description | Loading |
|---|---|
| 1. Heat Balance | |
| DEMETH RBLR A IN | 0.222 |
| DEMETH BTMS | 0.215 |
| DEMETH RBLR B IN | 0.213 |
| DEMETH OH COND HEAT | −0.203 |
| DEMETH TOTAL REFLX HEAT | −0.199 |
| DEMETH REBOIL B OUT TEM | 0.184 |

TABLE 4-continued

De-Methanizer Principal Components
With Sensor Title and Principal Component Loading

| Sensor Description | Loading |
|---|---|
| DEMETHANIZER FEED #3 | −0.181 |
| DEMETHANIZER REBOIL PROP | 0.179 |
| DEMETH REBOILER A/B SHELL INLET | 0.179 |
| DEMETHANIZER REFLUX FLOW | −0.172 |
| 2. Mass Balance | |
| DEMETHANIZER BTMS FLOW Output | 0.220 |
| DEMETH BOTTOMS LEVEL | 0.220 |
| DEMETH LEVEL TO DEETH | 0.217 |
| DEMETH TRAY 26 | 0.215 |
| DEMETHANIZER REFLUX FLOW Output | 0.208 |
| C2 = COMPR 1ST STAGE SUCT | −0.191 |
| LIQUID METHANE RECYCLE | −0.190 |
| DEMETHANIZER #4 FEED | −0.187 |
| DEMETHANIZER REBOIL PROP | 0.176 |
| DEMETH REBOILER A/B SHELL INLET | 0.176 |
| 3. Overhead Temperature | |
| DEMETH OH | 0.259 |
| DEMETH TRAY 5 | 0.237 |
| DEMETH UPPER OH AVG TEMP | 0.232 |
| DEMETH OVHD COND C2R LIQUID | 0.189 |
| EXPANDER OUTLET PR | 0.188 |
| C2 = COMPR 1ST STAGE SUCT | 0.182 |
| EXPNDR DRUM | 0.182 |
| DEMETHANIZER REFLUX DRUM | 0.169 |
| DEMETH OVHD DRUM HL EXPND TRIP LHCO | 0.168 |
| DEMETH OVHD TO EXPANDER Output | 0.167 |
| 4. Methane Compressor | |
| EXPNDR SHAFT SPEED | −0.201 |
| DEMETH REBOILER C3 = REBLR 4TH SUCT | −0.199 |
| EXPNDR IN HI RNGE | −0.199 |
| DEMETHANIZER FEED #3 | −0.193 |
| DEMETH OVHD TO EXPANDER Output | −0.188 |
| DEMETH TRAY 34 TEMP CTL | 0.185 |
| DEMETH CUTPOINT CONTROL | −0.184 |
| DEMETH TRAY 38 | 0.184 |
| DEMETH TRAY 34 | 0.173 |
| DEMETHANIZER FEED #1 | 0.172 |
| 5. Methane Turbo-Expander | |
| EXPNDR RECMP INLET | −0.338 |
| EXPNDR DRUM | −0.337 |
| EXPANDER OUTLET PR | −0.332 |
| EXPNDR RECMP OUT P | −0.281 |
| DEMETH OFF GAS | −0.253 |
| EXPNDR OUTLET TEMP | −0.217 |
| EXPNDR SHAFT SPEED | 0.210 |
| EXPANDER RECOMPR DISCHG | 0.171 |
| DEMETH MIN BTM TEMP | 0.168 |
| DEMETH TRAY 16 | 0.162 |
| 6. Methane Quality | |
| DEMETH TRAY 34 TEMP CTL | 0.292 |
| DEMETH TRAY 38 | 0.274 |
| DEMETH TRAY 34 | 0.268 |
| DEMETHANIZER REFLUX FLOW Output | 0.227 |
| DEMETH CUTPOINT CONTROL | −0.226 |
| DEMETH REBOILER C3 = REBLR 4TH SUCT | −0.215 |
| EXPANDER INLET PR | −0.185 |
| DEMETHANIZER BTMS FLOW | −0.180 |
| TURBOEXPANDER SEPR LEVEL Output | 0.175 |
| 4TH STG SUCT C3 = TO DEMETH REBOILER | −0.164 |
| 7. Methane Recycle | |
| EXPNDR RECMP INLET | 0.430 |
| EXPNDR RECMP OUT T | 0.404 |
| HI PRESS C1 FROM COLDBOX | −0.355 |
| EXPANDER RECOMPR DISCHG Output | 0.319 |
| DEMETH TRAY 34 | −0.202 |
| CB MPCH4 OUT TLCO | 0.193 |
| DEMETH TRAY 38 | −0.184 |
| DEMETH TRAY 34 TEMP CTL | −0.164 |

TABLE 4-continued

De-Methanizer Principal Components
With Sensor Title and Principal Component Loading

| Sensor Description | Loading |
| --- | --- |
| DEMETH MIN BTM TEMP | −0.155 |
| MIN DEMETH-DEETH DELTA-P | −0.140 |
| 8. Methane Pressure Balance | |
| EXPNDR RECMP INLET | −0.283 |
| EXPANDER INLET PR | −0.273 |
| EXPNDR RECMP OUT T | −0.269 |
| DEMETHANIZER OVHD PRESS | −0.252 |
| DEMETH TRAY 38 | −0.227 |
| DEMETH TRAY 34 | −0.226 |
| EXPANDER RECOMPR DISCHG Output | −0.219 |
| HI PRESS C1 FROM COLDBOX | 0.202 |
| DEMETH BOTTOMS LEVEL | 0.186 |
| DEMETH LEVEL TO DEETH | 0.175 |
| 9. Feed Rate | |
| LIQUID METHANE RECYCLE | 0.021 |
| HI PRESS C1 FROM COLDBOX | −0.094 |
| DEMETHANIZER FEED #3 | −0.051 |
| DEMETHANIZER FEED #2 | 0.039 |
| DEMETHANIZER FEED #1 | 0.006 |
| DEMETHANIZER #4 FEED | 0.088 |
| #4 DEMETH FEED W/SF614 | 0.130 |
| DEMETH TOTAL OH RATE | 0.009 |
| DEMETH TOTAL REFLX HEAT | −0.196 |
| EXPNDR LIQ->MPMETH | 0.154 |
| 10. Bottoms Balance | |
| DEMETH REBLR KO POT KD21 | 0.283 |
| DEMETHANIZER BTMS FLOW | −0.275 |
| EXPNDR RECMP OUT P | −0.270 |
| DEMETH REBLR KO POT KD21 Output | 0.266 |
| EXPNDR OUTLET TEMP | 0.234 |
| EXPNDR SHAFT SPEED | −0.201 |
| MAKEUP AND PURGE BTMS | −0.200 |
| EXPANDER RECOMPR DISCHG Output | 0.198 |
| TURBOEXPANDER SEPR LEVEL Output | 0.183 |
| DEMETHANIZER OVHD PRESS | 0.181 |

TABLE 5

De-Ethanizer Principal Components
With Sensor Title and Principal Component Loading

| Sensor Description | Loading |
| --- | --- |
| 1. Overhead Quality | |
| DEETH TRAY 45 | −0.214 |
| DEETH B REBOILER INLET | −0.210 |
| DEETH RBLR IN | −0.206 |
| DEETH VAPOR PROD | −0.205 |
| DEETH OH TO FLARE PRESS | −0.205 |
| DEETH BTMS TO DEPR | −0.205 |
| DEETH OH | −0.202 |
| DEETH VAPOR PROD | −0.200 |
| DEETH OVHD COND C3 = VAPOR | −0.199 |
| DEETH REBOILER B OUTLET TEMP | −0.198 |
| 2. Bottoms Quality | |
| DEETH BTMS Output | 0.278 |
| DEETH BTMS | 0.275 |
| REFLUX BTU CONTROL | 0.273 |
| DETH REFLUX FLOW | 0.258 |
| DEETH REFLUX DRUM | −0.236 |
| DEETH OVHD COND C3 = VAPOR Output | 0.207 |
| AVG TEMP DEETH | 0.193 |
| DEETH REFLUX COND Output | 0.186 |
| DETH REFLUX FLOW Output | 0.179 |
| DEETH BTMS | 0.177 |

TABLE 5-continued

De-Ethanizer Principal Components
With Sensor Title and Principal Component Loading

| Sensor Description | Loading |
| --- | --- |
| 3. Bottoms Heat Balance | |
| DEMETH BTMS | −0.314 |
| STM TO DEETH REBOILER | 0.265 |
| ACET CONVERT FEED VALVE POSITION | 0.253 |
| DEMETH BTMS C3 = | −0.240 |
| REBOILER BTU CONTROL | 0.240 |
| DEETH TOT OH FLOW | 0.232 |
| DEETH FEED | −0.227 |
| DEETH TRAY 25 | −0.222 |
| DEETH TRAY 20 | −0.208 |
| DEETH TRAY 31 | −0.200 |
| 4. Overhead Heat Balance | |
| DEETH TOT OH FLOW | −0.327 |
| ACET CONVERT FEED VALVE POSITION | −0.315 |
| DEETH CUTPOINT CONTROLLR | 0.261 |
| DEETH REFLUX COND Output | 0.240 |
| AVG TEMP DEETH | −0.228 |
| DEETH OVHD COND C3 = VAPOR Output | 0.225 |
| DE-ETHANIZER MAT BALANCE | −0.220 |
| STM TO DEETH REBOILER Output | 0.212 |
| DETH REFLUX FLOW | −0.211 |
| DEMETH LEVEL TO DEETH | 0.210 |
| 5. Bottoms Temperature | |
| DEETH BTM TO DEPROP | −0.364 |
| DEETH BOTTOMS TO DEPROP | −0.361 |
| DEETH REBOILER B OUTLET TEMP | −0.241 |
| DEETH BTMS TO DEPR | −0.239 |
| DEETH REBOILER A OUTLET TEMP | −0.234 |
| DEETH RBLR IN | −0.224 |
| DEETH B REBOILER INLET | −0.213 |
| C3 IN DEETH OH | 0.195 |
| DEMETH BTMS C2 | 0.174 |
| DEETH STARTUP TEMP | −0.169 |
| 6. Product Quality | |
| STM TO DEETH REBOILER A/B | −0.447 |
| STM TO DEETH REBOILER | −0.437 |
| DEETH CUTPOINT CONTROLLR | −0.388 |
| REBOILER BTU CONTROL | −0.347 |
| STM TO DEETH REBOILER | −0.204 |
| DEETH TOP DP | 0.160 |
| DEETH REFLUX COND Output | 0.151 |
| DEETH OVHD COND C3 = VAPOR Output | 0.138 |
| STM TO DEETH REBOILER | 0.136 |
| ACET CONVERT FEED VALVE POSITION Output | 0.135 |
| 7. Feed Quality | |
| DEMETH BTMS C2 = | 0.461 |
| DEMETH BTMS C3 = | −0.417 |
| DEMETH BTMS C3 | −0.398 |
| STM TO DEETH REBOILER | 0.315 |
| STM TO DEETH REBOILER A/B | 0.314 |
| DEMETH BTMS C2 | 0.176 |
| DEMETH BTMS | 0.154 |
| STM TO DEETH REBOILER | −0.152 |
| DEETH TRAY 31 | 0.137 |
| AVG TEMP DEETH | 0.134 |
| 8. Material Balance | |
| STM TO DEETH REBOILER | −0.360 |
| DE-ETHANIZER MAT BALANCE | 0.298 |
| DEETH STARTUP TEMP | −0.261 |
| C3 = LIQ TO DEETH OVHD COND | −0.246 |
| DEETH REFLUX COND Output | −0.229 |
| AVG TEMP DEETH | −0.224 |
| DEETH BTMS | 0.223 |
| DEETH BTMS Output | 0.202 |
| DEMETH BTMS C3 | −0.190 |
| DEETH REFLUX COND | 0.183 |

TABLE 5-continued

De-Ethanizer Principal Components
With Sensor Title and Principal Component Loading

| Sensor Description | Loading |
|---|---|
| 9. Overhead Balance | |
| DEETH STARTUP TEMP | 0.352 |
| AVG TEMP DEETH | 0.280 |
| DETH REFLUX FLOW | −0.260 |
| REFLUX BTU CONTROL | −0.254 |
| DE-ETHANIZER MAT BALANCE | 0.252 |
| STM TO DEETH REBOILER | −0.238 |
| DEETH STM COND ACC | −0.235 |
| ACET CONVERT FEED VALVE POSITION Output | 0.231 |
| DEETH PURGE TO C3R DRUM BTMS | 0.194 |
| STM TO DEETH REBOILER Output | 0.193 |
| 10. Energy Balance | |
| DEETH STM COND ACC | −0.386 |
| DEETH REFLUX COND | 0.318 |
| STM TO DEETH REBOILER | −0.308 |
| DE-ETHANIZER MAT BALANCE | −0.300 |
| DEETH STM COND ACC Output | −0.235 |
| C3 IN DEETH OH | −0.217 |
| DEETH REFLUX DRUM | 0.204 |
| C3 = LIQ TO DEETH OVHD COND | 0.199 |
| STM TO DEETH REBOILER A/B | −0.192 |
| STM TO DEETH REBOILER | −0.187 |

TABLE 6

Acetylene Converter Principal Components
With Sensor Title and Principal Component Loading

| Sensor Description | Loading |
|---|---|
| 1. Feed Rate | |
| CONVERTER FEED EXCHANGER FEED GAS IN | −0.225 |
| ACET CONVERT FEED VALVE POSITION | −0.224 |
| DEETH VAPOR PROD Output | −0.223 |
| ACET CONV FD GAS | −0.223 |
| CONVERTER A INLET PRESSURE | −0.219 |
| ACT CNV FD EXH OUT | −0.219 |
| CONVERTER A 1ST BED 44C TW7 | 0.217 |
| C2 = SPLITTER FEED TO OLA-1X | −0.211 |
| DEETH FEED PREHEAT EXCHANGER INLET | −0.210 |
| CONVERTER A 1ST BED 44B TW5 | 0.210 |
| 2. Midbed Temperature | |
| 1ST BED CONVERTER H2 Output | 0.289 |
| CONVERTER A MIDBED EXCHANGER DELTA PRESS | 0.237 |
| H2/FEED RATIO 1ST BED | 0.232 |
| ACET CONV A MIDBED Output | 0.228 |
| CONVERTER A 1ST OUTLET | 0.226 |
| CONVERTER A 1ST OUTLET TC2 | 0.217 |
| CONVERTER A 1ST OUTLET TC3 | 0.217 |
| CONVERTER A 1ST OUTLET TC1 | 0.216 |
| ACET CONV FEED | 0.198 |
| CO IN H2 PRODUCT | −0.192 |
| 3. Lead Bed Conversion | |
| ACT CNV FD HTR OUT | −0.307 |
| CONVERTER A 1ST BED INLET | −0.303 |
| ACT CONV FD HTR OUT TEM | −0.263 |
| CONVERTER A 1ST INLET | −0.260 |
| CONVERTER A 1ST BED 44A TW3 | −0.257 |
| CONVERTER A 2ND BED 43A TW2 | −0.224 |
| ACET CONV A MIDBED | −0.203 |
| CONVERTER A 2ND BED 43C TW5 | −0.179 |
| CONVERTER A 2ND BED 43B TW4 | −0.172 |
| CONVERTER A 2ND INLET | −0.165 |
| 4. Guard Bed Conversion | |
| CONVERTER A 2ND BED 43C TW5 | −0.280 |
| CONVERTER FINAL FEED EXCHANGER INLET COOLER | −0.267 |

TABLE 6-continued

Acetylene Converter Principal Components
With Sensor Title and Principal Component Loading

| Sensor Description | Loading |
|---|---|
| CONVERTER A 2ND OUTLET TC3 | −0.264 |
| CONVERTER A 2ND BED OUTLET | −0.263 |
| CONVERTER A 2ND OUTLET TC1 | −0.263 |
| CONVERTER A 2ND OUTLET TC2 | −0.263 |
| CONVERTER A 2ND BED 43B TW4 | −0.257 |
| CONVERTER A 1ST BED INLET | 0.237 |
| ACT CNV FD HTR OUT | 0.234 |
| ACT CONV FD HTR OUT TEM | 0.219 |

TABLE 7

Ethylene Splitter Principal Components
With Sensor Title and Principal Component Loading

| Sensor Description | Loading |
|---|---|
| 1. Pressure Balance | |
| SPLITTER FEED | −0.223 |
| SPLTR HIP RBLR VAP | −0.222 |
| C2 = TO BL_FEED_FL | −0.212 |
| ETY SPLT REFLUX DR | −0.204 |
| SPLITTER MID DP 1-113 | −0.200 |
| SPLITTER REFLUX FLCO Output | −0.197 |
| SPLITTER MID DP 32-113 | −0.197 |
| SPLTR HIP RBLR IN | −0.185 |
| OUTLET BTM DRAW OFF | −0.184 |
| SPLTR TRAY 116 | −0.183 |
| 2. Feed Rate | |
| C2 = SPLITTER TOTAL HEAT IN | 0.257 |
| C3 = TO SPLTR REBOILER | 0.256 |
| C2 = SPLITTER REBOILER BTU CONTROLLER | 0.255 |
| INTER REFLUX/FEED RATIO | 0.253 |
| MSE23 DUTY | 0.252 |
| SPLITTER BOTTOMS | 0.246 |
| SPLITTER REFLUX FLCO | 0.244 |
| SPLITTER BTM DP 129-150 | 0.183 |
| C2 = SPLITTER BOTTOMS C20 (FEED) | 0.164 |
| MATERIAL BALANCE C2 = SPLITTER | 0.162 |
| 3. Product Quality | |
| OLEFINS RECOVERY TRAIN C2 = PROD | −0.259 |
| HP ETHYLENE PROD | −0.258 |
| SPLITTER C2 = PROD | −0.243 |
| C2 = VAPOR PRODUCT | −0.209 |
| C2 = PRODUCT | −0.199 |
| SPLITTER BOTTOMS | 0.194 |
| SPLITTER BOTTOMS | 0.194 |
| SPLIT LVL TO SP526 | 0.191 |
| MATERIAL BALANCE C2 = SPLITTER | −0.188 |
| SPLITTER C2 = PROD Output | −0.184 |
| 4. Overhead Energy Balance | |
| C2 = VAPOR PRODUCT TLCO | 0.245 |
| C2 = VAPOR PRODUCT | 0.239 |
| HP ETHYLENE PROD | 0.231 |
| HP ETHYLENE PROD | 0.222 |
| PROP FROM ETHY HTR | 0.217 |
| ETHY PROD LOW TEMP OVRD Output | −0.185 |
| C2 = PRODUCT | −0.174 |
| OLEFINS RECOVERY TRAIN C2 = PROD | −0.154 |
| HP ETHYLENE PROD | −0.154 |
| SPLITTER C2 = PROD Output | −0.149 |
| 5. Bottoms Energy Balance | |
| C2 = SPLITTER REBOILER SHELL OUT | −0.369 |
| ETHY SPLIT REB FD | −0.368 |
| SPLITTER REBOILER A SHELL LEVEL | −0.337 |
| SPLITTER REBOILER B SHELL LEVEL | −0.334 |
| C3 = TO SPLTR REBOILER Output | 0.215 |

TABLE 7-continued

Ethylene Splitter Principal Components
With Sensor Title and Principal Component Loading

| Sensor Description | Loading |
|---|---|
| SPLITR HIP RBLR IN Output | −0.214 |
| C2 = SPLITTER ENERGY BALANCE | 0.187 |
| SPLITR HIP RBLR IN | −0.158 |
| C2 = SPLITTER HIP REBOILER | −0.156 |
| SPLITTER HIP REBOILER HEAT DUTY | −0.144 |
| *6. Ethylene Refrigeration Balance* | |
| SPLITTER OVHD COND VAPOR | 0.451 |
| SPLITTER OVHD COND VAPOR PRESS | 0.424 |
| ETHY STLTR VNT CND Output | −0.417 |
| SPLITTER OVHD COND VAPOR PRESS Output | −0.359 |
| ETHY STLTR VNT CND Output | 0.203 |
| C2 = RECYC TO COLDBOX | 0.192 |
| C2 = RECYC TO COLDBOX | 0.174 |
| RECY ETHY FROM SPLITTER OVHD COND | 0.165 |
| ETHY SPLIT REB FD | 0.131 |
| C2 = SPLITTER REBOILER SHELL OUT | 0.130 |
| *7. Temperature Profile* | |
| C2 = SPLITTER HIP REBOILER | −0.338 |
| SPLTR HIP RBLR VAP | 0.321 |
| C2 = SPLITTER BOTTOMS C2 PRODUCT | 0.294 |
| PROP COMP 4TH STG DISC | 0.248 |
| SPLITR HIP RBLR IN Output | −0.214 |
| C2 SPLITTER OVHD COND B VALVE DP | 0.194 |
| OVHD COND PURGE TO PGPU | 0.186 |
| MSPLITTER REFLUX PUMP SUCTION TEMP | 0.161 |
| C2 = SPLITTER BOTTOMS C2O (FEED) | −0.159 |
| C2 SPLITTER OVHD COND A LO OVERRIDE SEL Output | −0.144 |
| *8. Bottoms Quality* | |
| SPLITTER BTMS SUPERHEAT CTRL OR Output | −0.384 |
| SPLITTER BTMS C2 PRODUCT | 0.353 |
| C2 = SPLITTER BOTTOMS SUPERHEAT CTRL OR Output | 0.239 |
| EPW C2O AT SPLITTER BTMS OUTLET | −0.238 |
| SPLITTER BOTTOMS Output | 0.234 |
| SPLITTER BTMS SATURATION TEMP | −0.233 |
| ETHANE PRODUCT | 0.181 |
| C2 PROD TO B LIMIT | 0.162 |
| C2 = SPLITTER BOTTOMS C2 PRODUCT | −0.150 |
| SPLTR REFLUX CND B | −0.137 |
| *9. Reflux Balance* | |
| SPLTR REFLUX CND B | 0.467 |
| SPLTR REFLUX CND A | 0.466 |
| C2 = PROD FROM MSD14 | 0.454 |
| OVHD COND PURGE TO PGPU | 0.267 |
| C2 = SPLITTER BOTTOMS C2 PRODUCT | −0.169 |
| C2 = SPLITTER HIP REBOILER | 0.163 |
| SPLTR HIP RBLR VAP | −0.142 |
| ETHANE PRODUCT | 0.132 |
| MSPLITTER REFLUX PUMP SUCTION TEMP | 0.132 |
| SPLITR HIP RBLR IN Output | 0.123 |
| *10. Overhead Propylene Refrigeration* | |
| C2 = PROD FROM MSD14 | 0.258 |
| SPLTR REFLUX CND B | 0.253 |
| SPLTR REFLUX CND A | 0.232 |
| ETHY SPLIT REB FD | 0.197 |
| C2 = SPLITTER REBOILER SHELL OUT | 0.196 |
| SPLITR HIP RBLR IN Output | −0.187 |
| SPLITR HIP RBLR IN | −0.185 |
| C2 SPLITTER OVHD COND A LO OVERRIDE SEL Output | 0.181 |
| C2 SPLITTER OVHD COND B LO OVERRIDE SEL Output | 0.173 |
| C2 = SPLITTER HIP REBOILER | −0.168 |

TABLE 8

Methanator and Hydrogen Dryers Principal Components
With Sensor Title and Principal Component Loading

| Sensor Description | Loading |
|---|---|
| *1. Temperature Profile* | |
| METHANATOR 42C TW4 | −0.263 |
| METHANATOR 42D TW5 | −0.263 |
| METHANATOR OUTLET | −0.260 |
| METHANATOR 42C TW3 | −0.260 |
| METHANATOR 42D TW3 | −0.260 |
| METHANATOR 42A TW3 | −0.259 |
| METHANATOR 42B TW3 | −0.259 |
| METHANATOR 42B TW2 | −0.254 |
| METHANATOR OUTLET TC2 | −0.252 |
| UNMETH H2 MOL WT | 0.244 |
| *2. Pressure Balance* | |
| BHLA H2 HEADR PRES | −0.301 |
| METH COOLER K O DR | −0.299 |
| H2 TO BPLA | −0.295 |
| METHANATOR FEED | −0.288 |
| H2 DRIER PRODUCT | −0.288 |
| OLEFINS RECOVERY TRAIN H2->EPS/B5/RESINS | −0.285 |
| H2 BYPASSING METHANATOR | −0.270 |
| UNMETH H2 TO FUEL | −0.261 |
| MIN DEMTH #4FD DRM PRESS | −0.212 |
| METHANATOR OUTLET EXCHANGER DELTA PRESS | 0.171 |
| *3. Feed Rate* | |
| METHANATED H2 PRODUCT | 0.334 |
| METHANATOR OUTLET EXCHANGER DELTA PRESS | 0.323 |
| H2 BYPASSING METHANATOR | −0.315 |
| H2 FLOW THROUGH REFINERY HDR | 0.305 |
| MIN DEMTH #4FD DRM PRESS | 0.285 |
| MIN DP ACROSS SMALL CO FEED VLV | 0.228 |
| STEAM TO METHANATOR FEED EXCHANGER Output | 0.216 |
| H2 BYPASSING METHANATOR | 0.208 |
| H2 TO BHLA/SHLA | −0.201 |
| METHANATOR COLDBOX TEMPERATURE | 0.180 |
| *4. Product Energy Balance* | |
| MCO TEMPERATURE | 0.384 |
| H2 DRIER PRODUCT | 0.372 |
| H2 INLET TO FINAL CONVERTER FEED EXCHANGER | 0.343 |
| METH H2 COOLER OUT | 0.297 |
| MIDDLE METHANATOR OUTLET EXCHANGER WATER OUT | 0.277 |
| METHANATOR DUMP TO FLARE | 0.267 |
| CHILLED METH H2 | 0.230 |
| METH H2 FROM METHANATOR OUTLET EXCHANGER | 0.225 |
| C2 = FROM MC2R OUTLET 2ND EXCHANGER | 0.191 |
| METHANATED H2 MOL WT | −0.157 |
| *5. Feed Quality* | |
| CO IN H2 PRODUCT | −0.579 |
| CONVERTER BED #1 CO FB | −0.571 |
| 1ST BED CONVERTER H2 | 0.241 |
| H2 BYPASSING METHANATOR | −0.186 |
| STEAM TO METHANATOR FEED EXCHANGER | −0.176 |
| METHANATED H2 PRODUCT | 0.158 |
| CO IN METHANATOR FEED | −0.147 |
| METHANATOR 42A TW1 | −0.146 |
| METHANATOR FEED TEMP | −0.138 |
| METHANATOR 42B TW2 | −0.127 |
| *6. Product Quality* | |
| MAPD REACTOR H2 FLOW TO 1ST BED | −0.393 |
| H2 BYPASSING METHANATOR | 0.377 |
| H2 FLOW TO MAPD REACTOR 2ND BED | −0.351 |
| METHANATED H2 PRODUCT | −0.315 |
| METHANATOR COLDBOX TEMPERATURE | 0.303 |
| CONVERTER BED #1 CO FB | −0.275 |
| CO IN H2 PRODUCT | −0.273 |
| H2 TO BHLA/SHLA | −0.261 |
| H2 FLOW THROUGH REFINERY HDR | −0.206 |
| 1ST BED CONVERTER H2 | −0.193 |

TABLE 8-continued

Methanator and Hydrogen Dryers Principal Components
With Sensor Title and Principal Component Loading

| Sensor Description | Loading |
|---|---|
| *7. Hydrogen Demand* | |
| H2 FLOW TO MAPD REACTOR 2ND BED | 0.402 |
| CHILLED METH H2 | 0.353 |
| MAPD REACTOR H2 FLOW TO 1ST BED | 0.323 |
| METHANATOR DUMP TO FLARE | −0.270 |
| METHANATED H2 MOL WT | 0.254 |
| C2 = FROM MC2R OUTLET 2ND EXCHANGER | 0.253 |
| STEAM TO METHANATOR FEED EXCHANGER | 0.228 |
| METHANATOR FEED TEMP | 0.205 |
| MIN DP ACROSS SMALL CO FEED VLV | 0.196 |
| H2 DRIER PRODUCT | −0.181 |
| *8. Feed Temperature* | |
| METHANATOR FEED TEMP | 0.635 |
| STEAM TO METHANATOR FEED EXCHANGER | 0.564 |
| CO IN H2 PRODUCT | −0.192 |
| CONVERTER BED #1 CO FB | −0.155 |
| H2 FLOW THROUGH REFINERY HDR | 0.141 |
| METHANATOR DUMP TO FLARE | 0.122 |
| H2 DRIER PRODUCT | 0.122 |
| CHILLED METH H2 | −0.121 |
| METHANATED H2 MOL WT | −0.114 |
| MCO TEMPERATURE | 0.108 |
| *9. Hydrogen Mass Balance* | |
| METHANATOR DUMP TO FLARE | 0.396 |
| H2 FLOW TO MAPD REACTOR 2ND BED | 0.346 |
| METH H2 COOLER OUT | −0.330 |
| METH H2 FROM METHANATOR OUTLET EXCHANGER | −0.326 |
| MAPD REACTOR H2 FLOW TO 1ST BED | 0.250 |
| H2 INLET TO FINAL CONVERTER FEED EXCHANGER | −0.235 |
| H2 DRIER PRODUCT | 0.218 |
| 1ST BED CONVERTER H2 | −0.194 |
| MIN DP ACROSS SMALL CO FEED VLV | 0.190 |
| H2 DRYER B INLET | 0.178 |
| *10. Product Temperature Balance* | |
| C2 = FROM MC2R OUTLET 2ND EXCHANGER | −0.522 |
| C2 = DESUPERHEATER C2R OUTLET 2ND EXCHANGER | 0.417 |
| CHILLED METH H2 | −0.318 |
| ETHY IN H2 PRODUCT | 0.246 |
| METHANATED H2 MOL WT | 0.235 |
| UNMETH H2 TO OXO | 0.225 |
| METHANATOR COLDBOX TEMPERATURE | 0.215 |
| C2 = DESUPERHEATER C2R OUTLET 2ND EXCHANGER Output | 0.202 |
| METH H2 FROM METHANATOR OUTLET EXCHANGER | 0.178 |
| METHANATOR DUMP TO FLARE | 0.141 |

TABLE 9

Depropanizer Principal Components
With Sensor Title and Principal Component Loading

| Sensor Description | Loading |
|---|---|
| *1. Feed Rate* | |
| DEETH BOTTOMS TO DEPROP | 0.270 |
| DEPROP REFLUX Output | 0.254 |
| DEETH BTMS Output | 0.254 |
| DEETH BTMS | 0.250 |
| DEPROP TRAY 35 | 0.242 |
| DEETH BTM TO DEPROP | 0.241 |
| DEPROP BOTTOMS Output | 0.235 |
| DEPROP TRAY 45 | 0.226 |
| DEPROP BTM PRESS | 0.223 |
| DEPROP BOTTOMS | 0.219 |

TABLE 9-continued

Depropanizer Principal Components
With Sensor Title and Principal Component Loading

| Sensor Description | Loading |
|---|---|
| *2. Bottoms Energy Balance* | |
| DEPROP REBOILER INLET | −0.351 |
| DEPROP REBLR INLET | −0.334 |
| DEPROP TRAY #47 TEMP | −0.302 |
| DEPROP TRAY 45 | −0.258 |
| DEPROP REBOILER STM | 0.251 |
| MDEPROP OUTLET TEMP | −0.220 |
| DEPROP TRAY 35 | −0.209 |
| DEPROP BTM PRESS | 0.201 |
| DEETH BTM TO DEPROP | −0.198 |
| DEPROP TOTAL DELTA P | 0.196 |
| *3. Overhead Energy Balance* | |
| MDEPROP OUTLET TEMP | 0.385 |
| DEPROP TRAY #7 TEMP | 0.309 |
| DEPROP REBOILER OUT | 0.300 |
| DEPROPANIZER OVHD TEMP | 0.284 |
| DEPROP REFLUX | 0.278 |
| DEPROP REBOILER STM | 0.243 |
| DEPROP REBOILER CONDENSATE | 0.235 |
| DEPROP BOTTOMS | −0.223 |
| DEPROP TOTAL DELTA P | 0.213 |
| DEPROP REBOILER ST PHCO | 0.185 |
| *4. Overhead Material Balance* | |
| MAPD REACTOR HYDROFINER FD FLCI | −0.414 |
| DEPROP REFLUX DRUM | −0.343 |
| DEPROP OH TO FLARE | −0.313 |
| DEPROP OVERHEAD | −0.293 |
| MAPD REACTOR HYDROFINER FD FLCI Output | −0.275 |
| DEPROP TRAY 7 | −0.251 |
| DEETH BTMS Output | 0.229 |
| DEPROPANIZER OVHD TEMP | −0.202 |
| DEPROP REBOILER CONDENSATE | 0.184 |
| DEPROP TRAY #7 TEMP | −0.184 |

TABLE 10

MAPD Hydrofiner Principal Components
With Sensor Title and Principal Component Loading

| Sensor Description | Loading |
|---|---|
| *1. Guard Bed Temperature Profile* | |
| MAPD REACTORA/B/C BED TEMP TW18 | −0.140 |
| MAPD REACTOR GUARD OUTLET TEMP | −0.140 |
| MAPD REACTORA/B/C BED TEMP TW14 | −0.139 |
| MAPD REACTORA/B/C BED TW16 | −0.136 |
| MAPD REACTORA/B/C BED TW17 | −0.136 |
| MAPD REACTORA/B/C BED TEMP TW14 | −0.135 |
| MAPD REACTORA/B/C BED TEMP TW15 | −0.135 |
| MAPD REACTORA/B/C BED TEMP TW18 | −0.135 |
| MAPD REACTOR GUARD OUTLET TC1 | −0.135 |
| MAPD REACTOR GUARD OUTLET TC2 | −0.135 |
| *2. Lead Bed Conversion* | |
| HYDROGEN TO HF | −0.185 |
| COS ADSORBER BED DP | −0.167 |
| RERUN TOWER FEED STM VAPORIZER | −0.162 |
| MAPD REACTOR LEAD BED 1ST SPREAD | −0.158 |
| MAPD REACTOR LEAD OUTLET TEMP | 0.156 |
| HYDROFINER INLET TEMP | −0.155 |
| MAPD REACTORA/B/C BED TEMP TW01 | −0.154 |
| MAPD REACTORA/B BED TEMP TW18 | 0.149 |
| MAPD REACTORA/B/C BED TW02 | −0.148 |
| MAPD REACTORA/B/C INLET TEMP | −0.146 |
| *3. Midbed Quality* | |
| MAPD REACTORA/B/C INLET PRESSURE | −0.186 |
| MAPD REACTOR OUTLET PRESS | −0.183 |

TABLE 10-continued

MAPD Hydrofiner Principal Components
With Sensor Title and Principal Component Loading

| Sensor Description | Loading |
|---|---|
| MA IN H/F MIDBED | −0.182 |
| PD IN H/F MIDBED | −0.180 |
| COS ADSORBER BED OUTLET | −0.175 |
| MAPD REACTORA/B INLET PRESSURE | −0.168 |
| H2 FLOW TO MAPD REACTOR 2ND BED Output | −0.164 |
| MAPD REACTORA/B LEVEL5 SKIN TEMP | 0.163 |
| MAPD REACTOR HYDROFINER FD FLCI Output | −0.158 |
| MAPD REACTORA/B LEVEL8 SKIN TEMP | 0.157 |
| *4. Pressure Balance* | |
| MAPD REACTOR/C OUTLET PRESS | −0.260 |
| HYDROFINER OUTLET | −0.258 |
| MAPD REACTOR OUTLET PRESS | −0.234 |
| MAPD REACTORA/B/C INLET PRESSURE | −0.231 |
| RERUN TOWER FEED QW VAPORIZER | −0.221 |
| COS ADSORBER BED OUTLET | −0.208 |
| MAPD REACTORA/B INLET PRESSURE | −0.205 |
| C3 HYDROFINER FEED | −0.177 |
| MAPD REACTOR HYDROFINER FD FLCI Output | −0.165 |
| MAPD REACTORA/B/C INLET TEMP | −0.165 |
| *5. Recycle Feed to Reactor* | |
| MAPD REACTORA/B BED TW11 | −0.274 |
| MAPD REACTORA/B BED TW02 | −0.265 |
| MAPD REACTOR C3 RECYCLE TO FEED | 0.249 |
| MAPD REACTOR C3 RECYCLE TO FEED Output | 0.208 |
| C3 HYDROFINER FEED | 0.185 |
| MAPD REACTOR H2 FLOW TO 1ST BED Output | 0.181 |
| MCOS ADSORBER BED BOTTOM | −0.171 |
| MAPD REACTORA/B INLET TEMP | −0.167 |
| DEPROP REFLUX | −0.167 |
| MAPD REACTORA/B BED TW01 | −0.159 |
| *6. Lead Bed Selectivity* | |
| MAPD REACTOR TOTAL SELECTIVITY | 0.262 |
| MAPD REACTORA/B BED TW01 | 0.218 |
| MAPD REACTORA/B/C BED TW02 | 0.205 |
| MAPD REACTORA/B/C BED TW11 | 0.197 |
| MAPD REACTORA/B BED TW10 | 0.193 |
| MAPD REACTOR LEAD BED 2ND SPREAD | 0.189 |
| MAPD REACTOR LEAD BED 6TH SPREAD | 0.186 |
| HYDROFINER OUTLET Output | −0.186 |
| MAPD REACTORA/B INLET TEMPERATURE | 0.180 |
| MAPD REACTOR C3 RECYCLE TO FEED | 0.166 |
| *7. Guard Bed Conversion* | |
| MAPD REACTOR LEAD BED 2ND SPREAD | −0.244 |
| MAPD REACTORA/B BED TW10 | −0.242 |
| MAPD REACTOR TOTAL SELECTIVITY | 0.235 |
| MAPD REACTOR LEAD BED 6TH SPREAD | −0.231 |
| MAPD REACTORA/B BED TW01 | −0.229 |
| MAPD REACTORA/B/C BED TW11 | 0.220 |
| MAPD REACTORA/B/C BED TW02 | 0.217 |
| MAPD REACTORA/B BED TW05 | −0.176 |
| MAPD REACTOR - QNCH H2O TO MAPD REACTOR OUTLET COOLER | 0.159 |
| MAPD REACTOR LEAD SELECTIVITY | 0.152 |
| *8. Energy Balance* | |
| MAPD REACTOR - QNCH H2O TO MAPD REACTOR OUTLET COOLER | 0.270 |
| MAPD REACTOR LEAD BED 2ND SPREAD | 0.218 |
| RERUN FEED EXCHANGER INLET | 0.218 |
| C3 = VAP FROM MAPD REACTOR OUTLET COOLER | 0.215 |
| MAPD REACTOR OUTLET COOLER QUENCH WATER PHCO | −0.210 |
| MAPD REACTOR LEAD BED 6TH SPREAD | 0.205 |
| HYDROFINER OUTLET Output | 0.195 |
| QW EXCH HOT WATER TEMP | −0.184 |
| MAPD REACTORA/B BED TW01 | 0.172 |
| MAPD REACTORA/B BED TW10 | 0.171 |

TABLE 11

Propylene Fractionator Principal Components
With Sensor Title and Principal Component Loading

| Sensor Description | Loading |
|---|---|
| *1. Temperature Profile* | |
| C3 = FRACT TRAY 15 | −0.224 |
| C3 = FRACT TRAY 37 | −0.222 |
| C3 = FRACT TRAY 57 | −0.222 |
| C3 = FRACT OVHD VAP | −0.221 |
| C3 = FRACT - C3 = FRACT REBOILER B VAP OUT | −0.220 |
| C3 = FRACT - C3 = FRACT REBOILER A VAPOR OUT | −0.220 |
| C3 = FRACT REB IN | −0.218 |
| C3 = FRACT REBOILER B VAP OUT TEMP | −0.213 |
| RERUN TOWER CONDENSED OVHD | −0.207 |
| C3 = FRACT RBLR IN TEMP | −0.207 |
| *2. Pressure Balance* | |
| RERUN TOWER - RERUN OVHD COND VENT GAS | 0.295 |
| RERUN TOWER FEED TO BURNER LINE | 0.276 |
| RERUN TOWER OVHDCONDENSOR TO C3R MAKEUP | 0.270 |
| C3 = RERUN TRAY 15 | 0.256 |
| C3 = RERUN TRAY 10 | 0.256 |
| C3 = FRACT REFLUX FLCI | −0.229 |
| C3 = FRACT DP | −0.216 |
| C3 = RERUN OH | 0.210 |
| RERUN TOWER C3 = VAP FROM RERUN OVHD COND | 0.207 |
| RERUN TOWER DP | −0.206 |
| *3. Product Rate* | |
| C3 = PRODUCT DRUM NET DISCHARGE Output | 0.324 |
| C3 = PRODUCT DRUM NET DISCHARGE | 0.317 |
| C3 = TO SURGE DRUM Output | 0.314 |
| C3 = FRACT OH PRODUCT | 0.255 |
| LIQ PROPYLENE PROD | −0.249 |
| C3 = FRACT REFLUX DRUM | 0.228 |
| C3 = PRODUCT DRUM C3 = PROD SURGE DRUM | 0.196 |
| C3 = FRACT OH PRODUCT Output | 0.191 |
| STM TO C3 = FRACT REBOILER A BEST RANGE Output | −0.173 |
| RERUN FEED EXCHANGER BYPS CTL-VALV Output | 0.172 |
| *4. Feed Rate* | |
| RERUN TOWER DRAW TO C3 = FRACT Output | −0.291 |
| STM TO C3 = FRACT REBOILER A BEST RANGE | −0.286 |
| C3 = RERUN REFLUX FLCO | −0.280 |
| C3 = RERUN REFLUX FLCO Output | −0.278 |
| RERUN TOWER DRAW TO C3 = FRACT | −0.274 |
| FRACTIONATOR COND ACCUM Output | −0.253 |
| C3 = FRACT BOTTOMS LEVEL | −0.205 |
| C3 = FRACT STM VALVE POS CNTL Output | −0.199 |
| RERUN TOWER SIDE DRAW OFF LLCI | −0.184 |
| RERUN TOWER CIRCULATE C3 = 'S Output | −0.167 |
| *5. Feed Quality* | |
| C3 = FRACT DP | −0.353 |
| C3 = FRACT REFLUX FLCI | −0.346 |
| RERUN TOWER DP | −0.288 |
| RERUN TOWER VENT COND RERUN OVHD COND Output | 0.234 |
| C3 = FRACT BTM NET:BEST RANGE | −0.204 |
| RERUN TOWER - RERUN OVHD COND VENT GAS | −0.200 |
| RERUN TOWER C3 = VAP FROM RERUN OVHD COND | −0.198 |
| RERUN FEED EXCHANGER BYPS CTL-VALV Output | −0.157 |
| RERUN TOWER RERUN REFLUX DRUM | 0.147 |
| RERUN TOWER DRAW TO C3 = FRACT | −0.145 |
| *6. Energy Balance* | |
| C3 = RERUN REFLUX FLCO | −0.331 |
| RERUN TOWER DRAW TO C3 = FRACT | −0.286 |
| FRACTIONATOR COND ACCUM Output | 0.284 |
| C3 = FRACT STM VALVE POS CNTL Output | 0.272 |
| STM TO C3 = FRACT REBOILER A BEST RANGE | 0.269 |
| RERUN TOWER SIDE DRAW OFF LLCI | −0.261 |
| RERUN TOWER DRAW TO C3 = FRACT Output | −0.206 |
| MAPD REACTOR - QNCH H2O TO MAPD REACTOR OUTLET COOLER | 0.202 |
| RERUN TOWER RERUN REFLUX DRUM | −0.199 |
| C3 = FRACT REFLUX FLCI Output | 0.188 |

TABLE 12

Valve-Flow Models
With Model Title
Valve-Flow Models
Model Description

Fresh Feed to CGC
Propylene Liquid to SCD02
Propylene Liquid to C3R DRIER
De-Methanizer Feed #1
De-Methanizer Feed #2
De-Methanizer Feed #3
De-Methanizer Feed #4
Hydrogen Separator Drum Flow
De-Methanizer Feed #5
De-Ethanizer Reflux Flow
Methane Compressor Minimum Flow
Methane Booster Second Stage Recycle
De-Methanizer Bottoms Flow
De-Propanizer Reboiler Out
De-Ethanizer Bottoms
Splitter Hip Reboiler
Splitter Reflux
Splitter Product
De-Methanizer Reflux Flow
Ethylene Vapor Product
Condensate Stripper Heated Feed
Steam to De-Ethanizer Reboiler
Liquid Ethylene to ND03
Fourth Stage Suction Propylene to DEMETH REBOILER
Hydrogen Flow to Acetylene Converter Lead Bed
Hydrogen Flow to Acetylene Converter Guard Bed
Acetylene Converter Flow

What is claimed is:

1. A method for abnormal event detection (AED) for current operation for some process units of an ethylene processing system comprising:
   (a) comparing online measurements from the process units to a set of models including principal component analysis models and/or engineering models for normal operation of the corresponding process units, wherein said ethylene processing system has been divided into equipment groups and process operating modes wherein there is minimal interaction between said equipment groups and principal component analysis models correspond to equipment groups and process operating modes,
   (b) determining if the current operation differs from expected normal operations so as to indicate the presence of an abnormal condition in a process unit, and
   (c) determining the underlying cause of an abnormal condition in the ethylene processing system.

2. The method of claim 1 wherein said set of models corresponds to equipment groups and process operating modes, one model for each group which may include one or more operating modes.

3. The method of claim 1 wherein said set of models correspond to equipment groups and process operating modes, one model for each group and each mode.

4. The method of claim 1 wherein said set of models of normal operations further includes engineering models.

5. The method of claim 1 wherein said ethylene processing system is divided into operational areas with a principal component analysis model for each area.

6. The method of claim 1 further comprising the steps of
   (a) dividing the ethylene process into equipment groups with one or more operating modes,
   (b) determining input variables and their operating range for said equipment groups and/or operating modes,
   (c) determining historical training and testing data for said input variables,
   (d) creating a set of principle component analysis models and/or engineering models representing normal operations, where each model corresponds to one of said equipment groups including one or more operating modes,
   (e) dividing the ethylene process into operational areas where a set of one or more models corresponds an operational area, and
   (f) comparing online measurements from the ethylene process units to a set of models for normal operation of the corresponding operational area.

7. The method of claim 1 wherein said equipment groups have minimal interactions among each other.

8. The method of claim 1 wherein said equipment groups include feedforward information from upstream equipment groups and feedback information from downstream equipment groups.

9. The method of claim 1 wherein inputs to the models are measurements of the performance and/or physical state of the ethylene process, and/or control signals sent to field actuators from the control system, and/or external factors affecting the ethylene process.

10. The method of claim 1 wherein the inputs to the models determine the physical state of the ethylene process.

11. The method of claim 1 wherein said indication of an abnormal event further comprises of suppressing model calculations to eliminate false positives on special cause operations.

12. The method of claim 1 wherein unwanted abnormal event indications are suppressed using override suppressors.

13. The method of claim 2 wherein said equipment groups include all major material and energy interactions in the same group.

14. The method of claim 2 wherein each said model further comprises suppressing model calculations to eliminate false positives on special cause operations.

15. The method of claim 2 further comprising the steps of (a)-determining said each model begins with a rough model based on questionable data, (b) using said rough model to gather high quality training data, and improve the model, and (e) repeating step (b) to further improve the model.

16. The method of claim 2 wherein said model includes transformed variables.

17. The method of claim 2 wherein principal components include process variables provided by online measurements.

18. The method of claim 4 wherein said engineering model further comprises determining consistency between some control valves and flow meters.

19. The method of claim 4 wherein the principle components for the principle component analysis models are selected based on named degrees of freedom in the equipment group.

20. The method of claim 4 wherein the number of principal components is chosen such that coefficients of the non-chosen principal components become about equal in size.

21. The method of claim 5 wherein there are eleven operational areas.

22. The method of claim 5 wherein said principal components analysis models include process variable values measured by sensors.

23. The method of claim 5 wherein said principal components analysis models for different process units include some process variable values measured by the same sensor.

24. The method of claim 5 wherein a number of principal components is selected by a magnitude of total process variation represented by successive components.

25. The method of claim 6 wherein operating modes are specific time periods wherein the ethylene process behavior is significantly different.

26. The method of claim 6 wherein historical data (raining sets arc segregated according to operating modes.

27. The method of claim 6 wherein said models includes transformed variables.

28. The method of claim 6 further comprising the steps
(a) determining said model begins with a rough model based on questionable data,
(b) using said rough model to gather high quality training data, and improve the model, and
(c) repeating step (b) to further improve the model.

29. The method of claim 6 wherein a set of models of normal operations includes one or more Principle Component Analysis Models and/or one or more engineering models.

30. The method of claim 6 wherein the number of principle components is selected by the magnitude of total process variation represented by successive principle components.

31. The method of claim 6 wherein said principal component analysis models for different equipment groups include as inputs some process variable values measured by the same sensor.

32. The method of claim 10 wherein said inputs to the models include temperatures, and/or pressures, and/or flows, and/or analyzer readings, and/or vibrations, and/or electrical current, and/or signals to field actuators.

33. The method of claim 12 wherein override suppressors act automatically whenever a defined condition exists.

34. The method of claim 12 wherein the operator initiates the action of an override suppressor.

35. The method of claim 13 wherein said equipment groups include quick recycles in the same group.

36. The method of claim 15 wherein said training data includes historical data for the model of the processing unit.

37. The method of claim 16 wherein said transformed variables include reflux to feed ratio in distillation columns, log of composition in high purity distillation, pressure compensated temperature measurement, sidestream yield, flow to valve position, and reaction rate to exponential temperature change.

38. The method of claim 16 wherein some pairs of measurements for two variables are brought into time synchronization by one of the variables using a dynamic transfer function.

39. The method of claim 16 wherein variables of process measurements that are affected by operating point changes in process operations are converted to deviation variables.

40. The method of claim 16 wherein said model inputs are corrected for noise.

41. The method of claim 16 wherein the measurements of a variable are scaled.

42. The method of claim 16 wherein measurements are transformed to bring tern into time synchronization, with one of the other variables using a dynamic transfer function.

43. The method of claim 17 wherein principal components include some measurement pairs that are time synchronized to one of the variables using a dynamic filter.

44. The method of claim 17 wherein process variables affected by operating point changes in the process operations are convened to deviation variables.

45. The method of claim 21 wherein the eleven operational areas of the ethylene processing system include; charge gas compressor; drier, cold box, and methane booster; ethylene and propylene refrigeration; demethanizer; deethanizer; acetylene converter; C2 splitter; methanator and H2 drier; depropanizer; MAPD hydrofiner; and propylene rerun and fractionator.

46. The method of claim 27 wherein said transformed variables include reflux to feed ratio in distillation columns, log of composition in high purity distillation, pressure compensated temperature measurement, sidestream yield, flow to valve position, and reaction rate to exponential temperature change.

47. The method of claim 28 wherein said training data includes historical data for the model of the processing unit.

48. The method of claim 36 wherein the number of principal components is chosen such that coefficients of each principal component become about equal m size.

49. The method of claim 36 wherein the historical data periods selected for training and testing data sets are selected to increase cross correlation among inputs and/or increase the signal to noise ratio of the inputs in the data.

50. The method of claim 39 wherein a rolling average of inputs from recent operations is subtracted from the current value of the measurements.

51. The method of claim 40 wherein said model inputs are corrected by filtering or eliminating noisy measurements of variables.

52. The method of claim 41 wherein the measurements are scaled to the expected normal range of that variable.

53. The method of claim 49 wherein data from time periods of steady operations are eliminated from the training data.

54. The method of claim 49 wherein data from severe abnormal operations are eliminated from the training data.

55. The method of claim 49 wherein potential model inputs are deleted from the inputs used in the model.

56. A system for abnormal event detection (AED) for some process units of an ethylene processing system comprising:
(a) on-line data acquisition of measurements and control signals,
(b) a set of models including principal component models and/or engineering models included in the set describing operations of the process units of said ethylene processing system, wherein said ethylene process system has been divided into equipment groups, wherein said set of models includes at least a principal component model corresponding to an equipment group,
(c) a set of displays which indicate if the current operation differs from expected normal operations so as to indicate the presence of an abnormal condition in the process unit, and
(d) a set of displays which indicates the underlying cause of an abnormal condition in the ethylene processing system.

57. The system of claim 56 wherein said model for each process unit is either a principal components model or an engineering model.

58. The system of claim 56 wherein inputs to the system are measurements of the performance and/or physical state of the ethylene process, and/or control signals sent to process field devices from the control system, and/or external factors affecting the ethylene process.

59. The system of claim 56 wherein said models further comprises suppression calculations to eliminate unwanted notifications of known conditions.

60. The system of claim 56 wherein an ethylene processing system is partitioned into operational sections and the models are grouped into sets according to their associated operational section.

61. The system of claim 56 wherein the operator interface includes a continuous indication of the likelihood of an abnormality within each operational section of the ethylene processing system.

62. The system of claim 56 wherein the operator interface allows the operator to navigate to a display associated with the highest likelihood of an abnormal condition with a single mouse click.

63. The system of claim 57 wherein an ethylene processing system is partitioned into operational sections with a principal components model for each section.

64. The system of claim 57 wherein said principal components include process variables provided by online measurements.

65. The system of claim 57 wherein said model further comprises calculations to eliminate operator induced notifications and false positives.

66. The system of claim 57 wherein said model includes transformed variables.

67. The system of claim 58 wherein said inputs to the system include temperatures, and/or pressures, and/or flows, and/or analyzer readings, and/or vibrations, and/or electrical current, and/or signals to field actuators.

68. The system of claim 58 wherein said inputs to the system become transformed inputs to the models.

69. A system of claim 59 wherein override suppressors act automatically whenever a defined condition exists.

70. A system of claim 59 wherein the operator initiates the action of an override suppressor.

71. The system of claim 61 wherein the likelihood of an abnormality within an operational section is indicated to the operator with a trend of the highest likelihood of an abnormality.

72. The system of claim 61 wherein the operator is alerted whenever the likelihood of an abnormality exceeds a defined threshold.

73. The system of claim 62 wherein said displays include Pareto charts.

74. The system of claim 62 wherein, for a set of models, the Pareto charts list models in the order of magnitude of the likelihood of an abnormal condition as indicated by each model.

75. The system of claim 62 wherein said displays include X-Y plots.

76. The system of claim 63 wherein there are eleven operational sections.

77. The system of claim 63 wherein fuzzy Petri nets are used to convert outputs from models to the likelihood of an abnormal process operation and/or equipment problem.

78. The system of claim 66 wherein said transformed variables include reflux to total product flow in distillation columns, log of composition and overhead pressure in distillation columns, pressure compensated temperature measurements, flow to valve position and bed differential temperature and pressure.

79. The system of claim 66 wherein some measurement pairs are time synchronized to one of the variables using a dynamic filter.

80. The system of claim 66 wherein process measurement variables affected by operating point changes in the process operations are converted to deviation variables.

81. The system of claim 66 wherein the measurements and transforms of a variable are scaled prior to model identification.

82. The system of claim 66 wherein a number of principal components is selected by a magnitude of total process variation represented by successive components.

83. The system of claim 66 wherein noise is removed from the system inputs and/or the transformed variables.

84. The system of claim 66 wherein the measurements of a variable are scaled prior to model calculation.

85. The system of claim 73 wherein, for principle component analysis models, the Pareto charts show in order of magnitude the specific contribution of each input to the estimate of the likelihood of an abnormal condition.

86. The system of claim 75 wherein, two dimensional models are shown as X-Y plots.

87. The system of claim 75 wherein, the X-Y plot shows the estimate of the normal operating relationship as well as the confidence region around that estimate.

88. The system of claim 75 wherein the operator can recalibrate the X-Y plot on demand.

89. The system of claim 75 wherein time adjacent data sample points are connected.

90. The system of claim 75 wherein the normal process operating range of the X axis variable is indicated.

91. The system of claim 77 wherein the likelihood of abnormality indicated by models within a set are combined using fuzzy Petri nets to estimate the likelihood of an abnormality within an operational section.

92. The system of claim 80 wherein the measurements are scaled by the expected normal range of that transformed and/or deviation variable.

93. The system of claim 83 wherein noise is removed using digital filters.

94. The system of claim 83 wherein noise is removed using logic.

95. The system of claim 85 wherein the operator can navigate to time plots of inputs whose order is determined by each input's position on the Pareto chart.

* * * * *